United States Patent
Tsurumi

(10) Patent No.: US 8,350,929 B2
(45) Date of Patent: Jan. 8, 2013

(54) IMAGE PICKUP APPARATUS, CONTROLLING METHOD AND PROGRAM FOR THE SAME

(75) Inventor: Shingo Tsurumi, Saitama (JP)

(73) Assignee: Sony Corporation, Tokyo (JP)

( * ) Notice: Subject to any disclaimer, the term of this patent is extended or adjusted under 35 U.S.C. 154(b) by 517 days.

(21) Appl. No.: 12/524,734

(22) PCT Filed: Dec. 15, 2008

(86) PCT No.: PCT/JP2008/072742
§ 371 (c)(1),
(2), (4) Date: Jul. 28, 2009

(87) PCT Pub. No.: WO2009/084410
PCT Pub. Date: Jul. 9, 2009

(65) Prior Publication Data
US 2010/0118160 A1    May 13, 2010

(30) Foreign Application Priority Data

Dec. 27, 2007   (JP) ................................ 2007-337827

(51) Int. Cl.
H04N 5/262   (2006.01)
H04N 5/225   (2006.01)
H04N 5/228   (2006.01)
H04N 5/76    (2006.01)
H04N 5/222   (2006.01)
G06K 9/32    (2006.01)

(52) U.S. Cl. .................. 348/239; 348/218.1; 348/222.1; 348/231.99; 348/231.3; 348/333.05; 382/293; 382/294; 382/298

(58) Field of Classification Search .............. 348/36–39, 348/207.99, 207.1, 218.1, 222.1, 231.99–231.3, 348/240.99, 240.2, 239, 333.01–333.05, 348/333.11; 382/190, 206, 209, 254, 276, 382/284–289, 291, 293–296, 298–299; 358/530, 358/540; 345/619, 629–641
See application file for complete search history.

(56) References Cited

U.S. PATENT DOCUMENTS
5,469,274 A    11/1995 Iwasaki et al.
(Continued)

FOREIGN PATENT DOCUMENTS
EP    2 180 701 A1    4/2010
(Continued)

OTHER PUBLICATIONS

European Search Report issued Jul. 8, 2011, in Patent Application No. 08866956.9.

(Continued)

Primary Examiner — Jason Chan
Assistant Examiner — Michael Osinski
(74) Attorney, Agent, or Firm — Oblon, Spivak, McClelland, Maier & Neustadt, L.L.P.

(57) ABSTRACT

When picked up images picked up by an image pickup apparatus are accessed, the contents of the picked up images are grasped readily. A dynamic picture storage section 200 stores image data produced by an image pickup section 110. A metadata storage section 210 stores transformation information regarding a first picked up image and a second picked up image. An image memory 180 retains images as history images. An image transformation section 150 transforms the second picked up image based on the transformation information. An image synthesis section 170 synthesizes the transformed second picked up image with the history images to form a synthesized image. An operation acceptance section 160 accepts a designation operation which designates a display magnification of the second picked up image. A display region extraction section 190 determines a display region on the synthesized images retained in the image memory 180 based on the designated display magnification and extracts those images which are included in the display region. A display control section 240 successively displays the extracted images on a display section 250.

10 Claims, 51 Drawing Sheets

U.S. PATENT DOCUMENTS

| | | | |
|---|---|---|---|
| 5,649,032 A | 7/1997 | Burt et al. | |
| 5,657,402 A | 8/1997 | Bender et al. | |
| 5,706,416 A | 1/1998 | Mann et al. | |
| 5,920,657 A | 7/1999 | Bender et al. | |
| 5,982,951 A * | 11/1999 | Katayama et al. | 382/284 |
| 5,991,444 A | 11/1999 | Burt et al. | |
| 5,999,662 A | 12/1999 | Burt et al. | |
| 6,393,163 B1 | 5/2002 | Burt et al. | |
| 6,434,280 B1 * | 8/2002 | Peleg et al. | 382/299 |
| 6,895,126 B2 | 5/2005 | Di Bernardo et al. | |
| 7,327,494 B2 | 2/2008 | Aiso | |
| 2001/0005208 A1 | 6/2001 | Minami et al. | |
| 2002/0135672 A1 * | 9/2002 | Sezan et al. | 348/36 |
| 2003/0133020 A1 * | 7/2003 | Suh | 348/218.1 |
| 2004/0150657 A1 | 8/2004 | Wittenburg et al. | |
| 2004/0197075 A1 * | 10/2004 | Aiso | 386/46 |
| 2006/0109283 A1 | 5/2006 | Shipman et al. | |
| 2007/0008499 A1 | 1/2007 | Iketani et al. | |
| 2007/0058717 A1 * | 3/2007 | Chosak et al. | 375/240.08 |
| 2007/0103544 A1 | 5/2007 | Nakazawa | |
| 2007/0206678 A1 * | 9/2007 | Kondo | 375/240.17 |
| 2010/0097398 A1 | 4/2010 | Tsurumi | |

FOREIGN PATENT DOCUMENTS

| | | |
|---|---|---|
| EP | 2 222 080 A1 | 8/2010 |
| JP | 5 260264 | 10/1993 |
| JP | 6-98206 | 4/1994 |
| JP | 9 62861 | 3/1997 |
| JP | 11 120353 | 4/1999 |
| JP | 11 134352 | 5/1999 |
| JP | 2000 217061 | 8/2000 |
| JP | 2002 359798 | 12/2002 |
| JP | 2004 222025 | 8/2004 |
| JP | 2004 266670 | 9/2004 |
| JP | 2005 217874 | 8/2005 |
| JP | 2007 183588 | 7/2007 |
| WO | 2005 024723 | 3/2005 |
| WO | 2005 032125 | 4/2005 |
| WO | WO 2005/032125 A1 | 4/2005 |

OTHER PUBLICATIONS

U.S. Appl. No. 12/447,923, filed Apr. 30, 2009, Tsurumi.
U.S. Appl. No. 12/524,887, filed Jul. 29, 2009, Tsurumi.
U.S. Appl. No. 12/526,058, filed Aug. 6, 2009, Tsurumi.
U.S. Appl. No. 12/524,777, filed Jul. 28, 2009, Fukumoto, et al.
U.S. Appl. No. 12/524,757, filed Jul. 28, 2009, Tsurumi.
U.S. Appl. No. 12/524,383, filed Jul. 24, 2009, Wang, et al.
U.S. Appl. No. 12/565,499, filed Sep. 23, 2009, Tsurumi.
Office Action issued Jan. 25, 2012, in European Patent Application No. 08 866 956.9.
U.S. Appl. No. 13/486,209, filed Jun. 1, 2012, Tsurumi.

* cited by examiner

FIG. 4
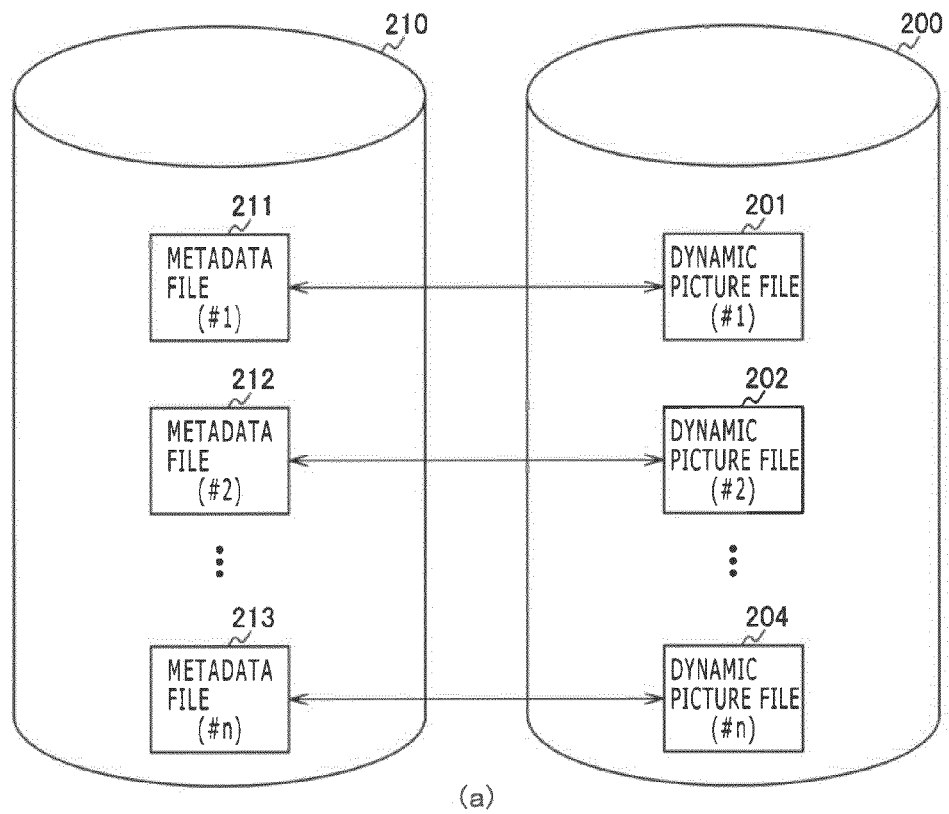
(a)
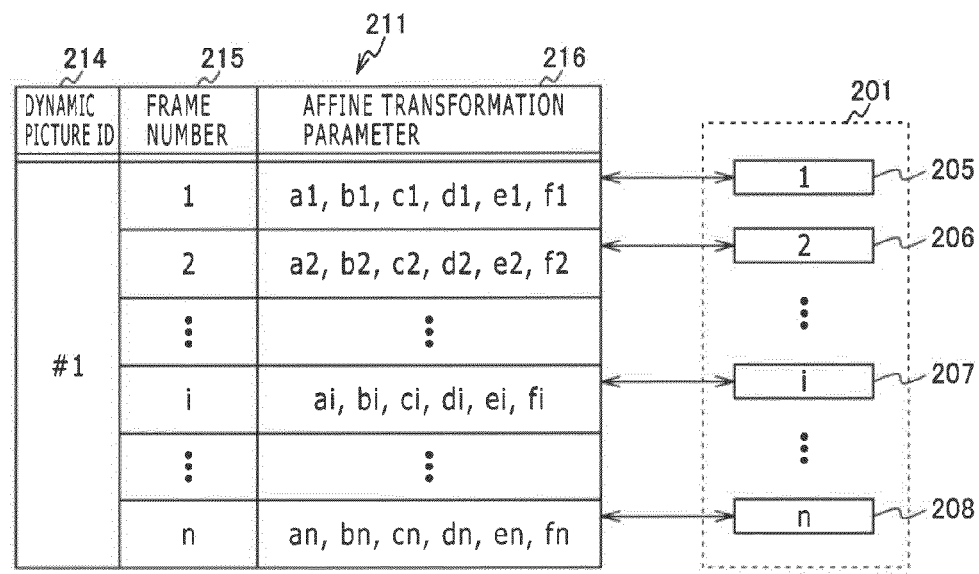
(b)

F I G. 5
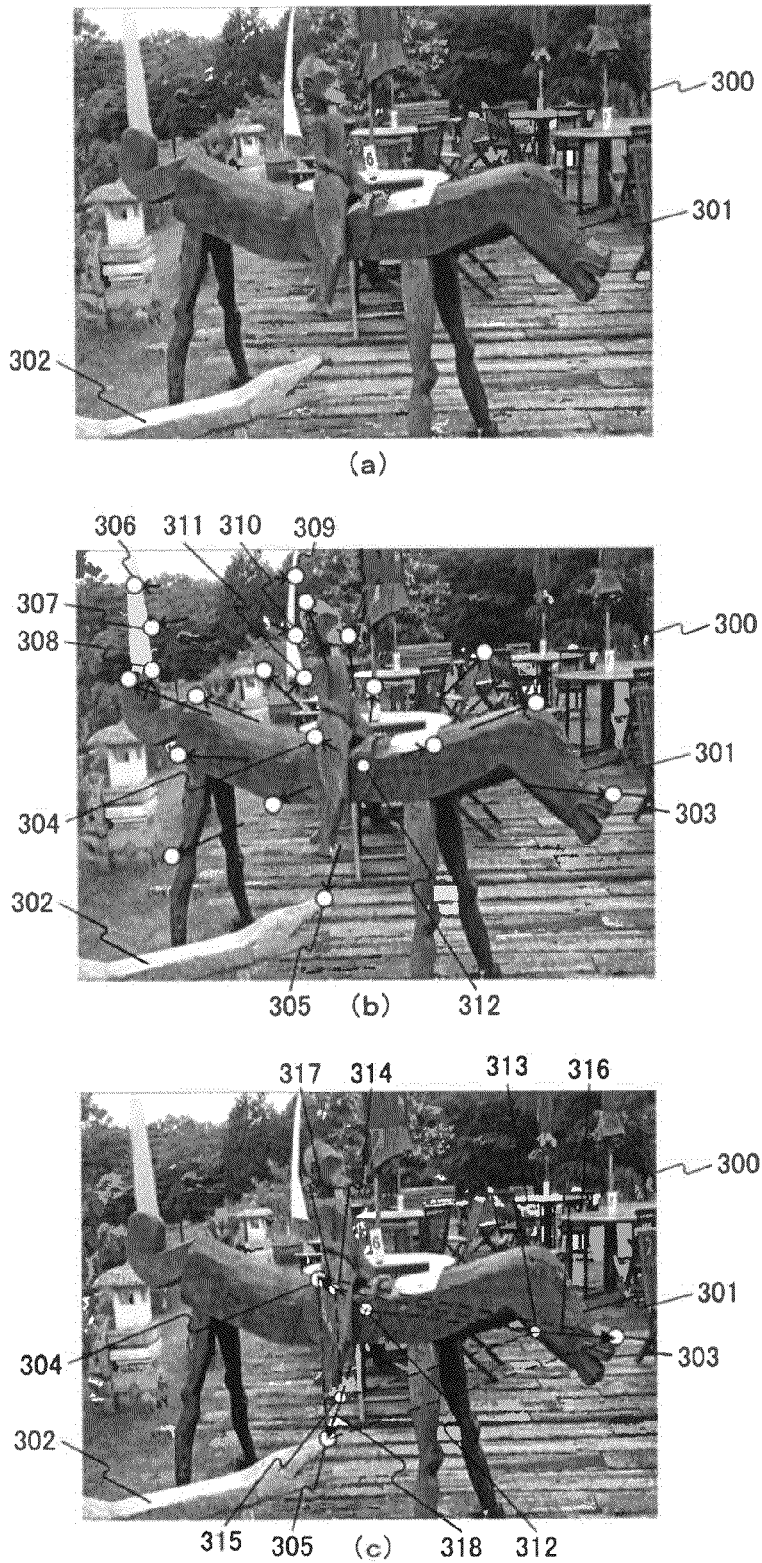

FIG.6
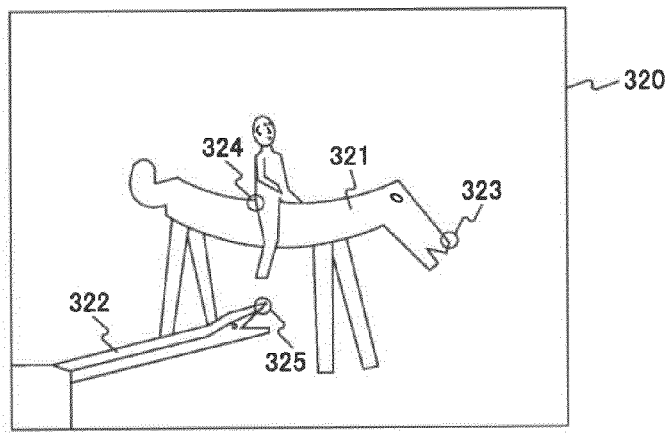
(a)
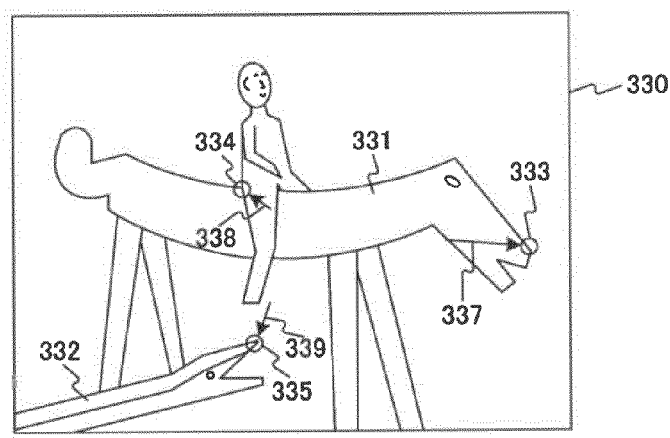
(b)
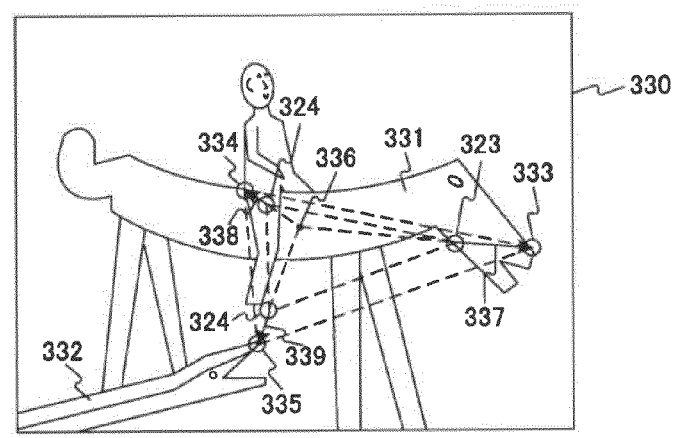
(c)

FIG. 8
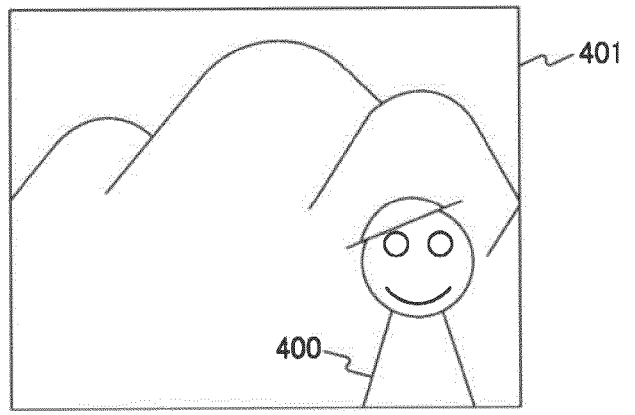
(a)
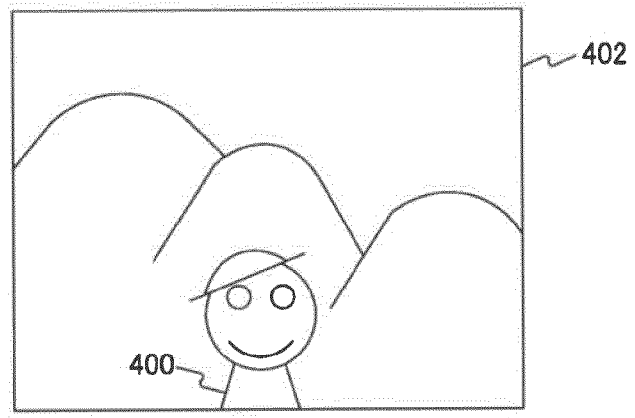
(b)
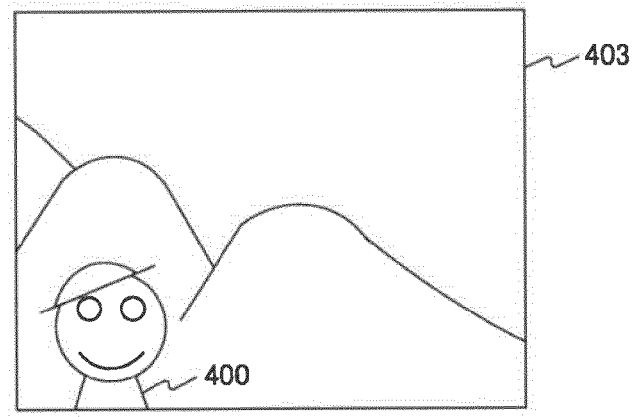
(c)

FIG. 11
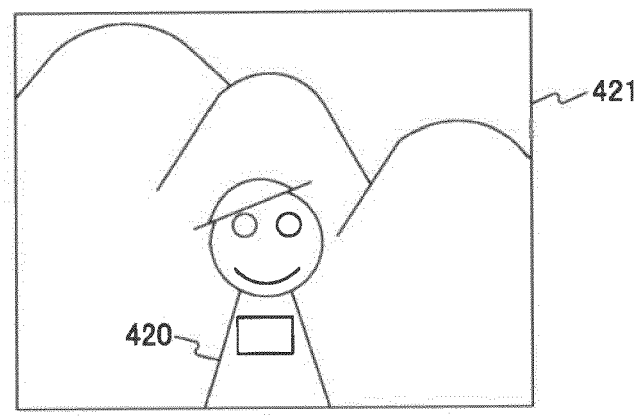
(a)
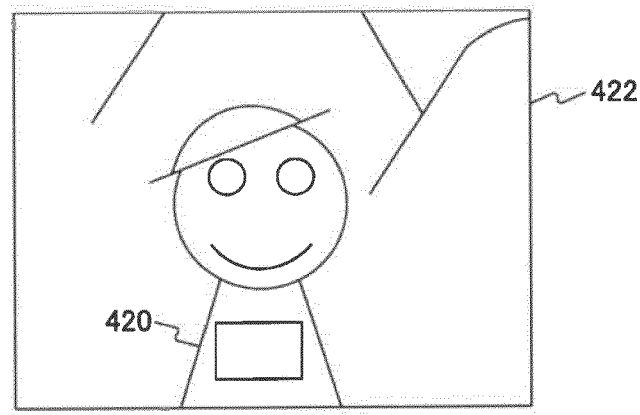
(b)
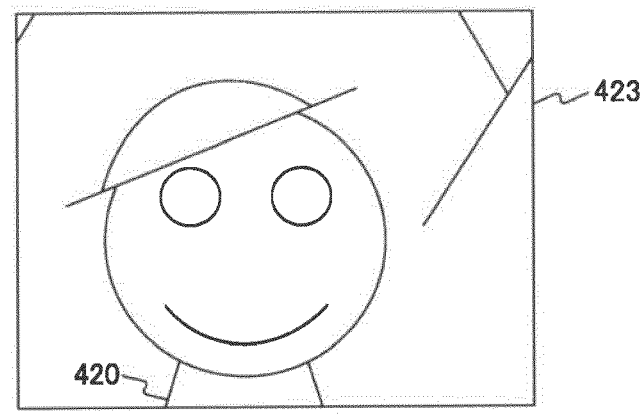
(c)

FIG.12
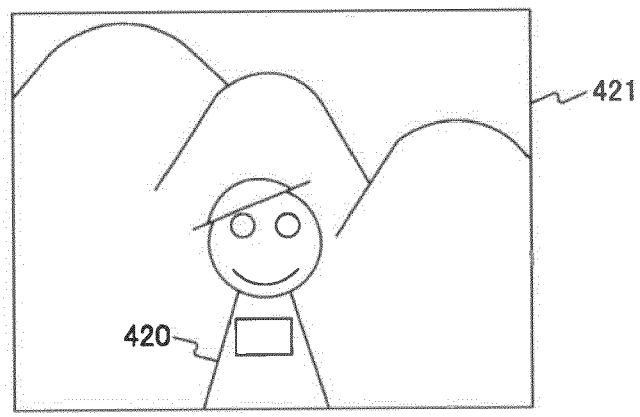
(a)
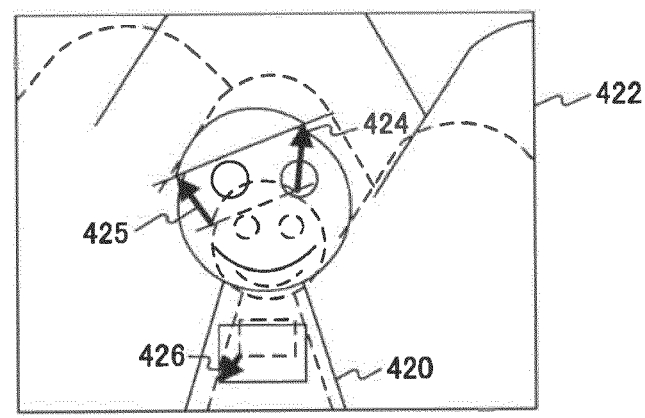
(b)
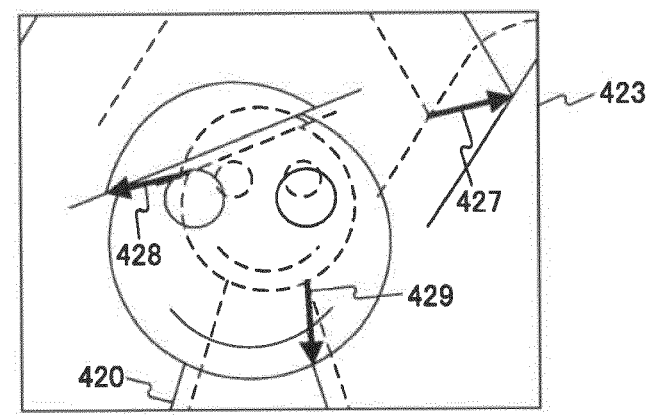
(c)

FIG.14
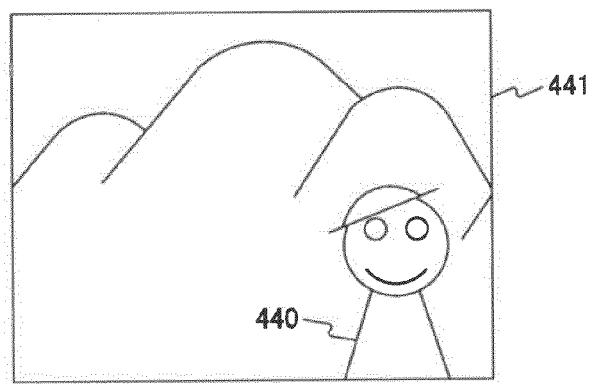
(a)
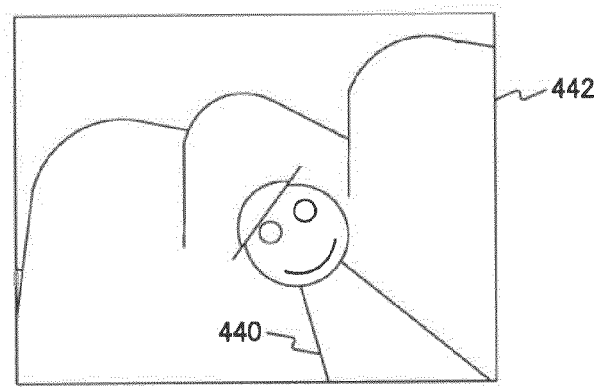
(b)
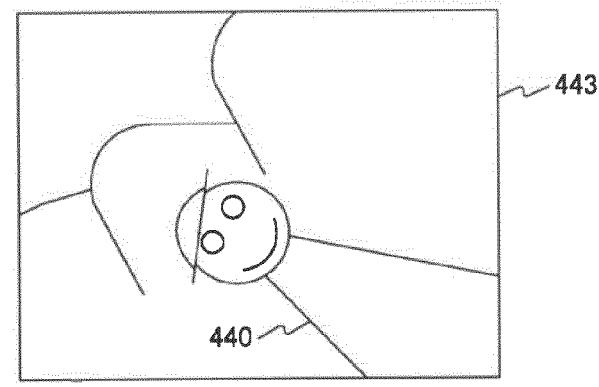
(c)

FIG.15
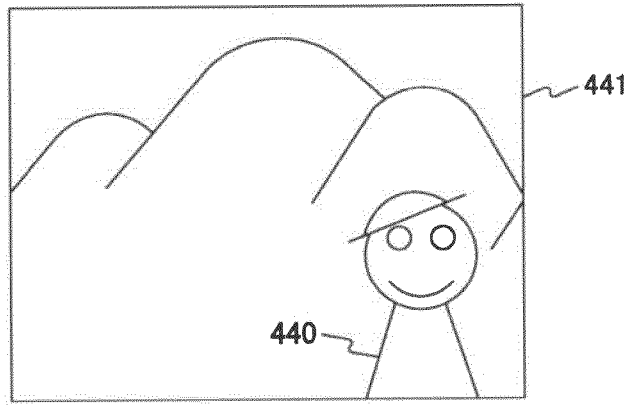
(a)
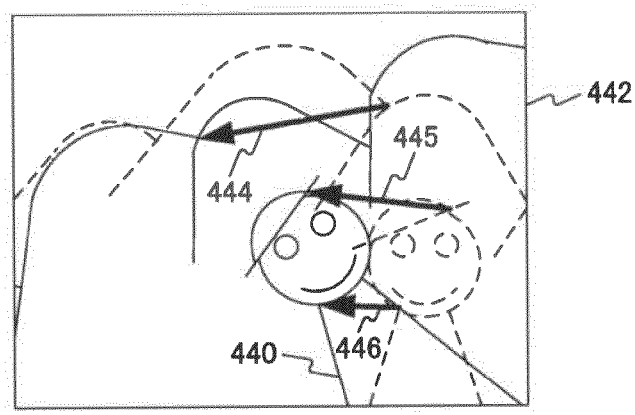
(b)
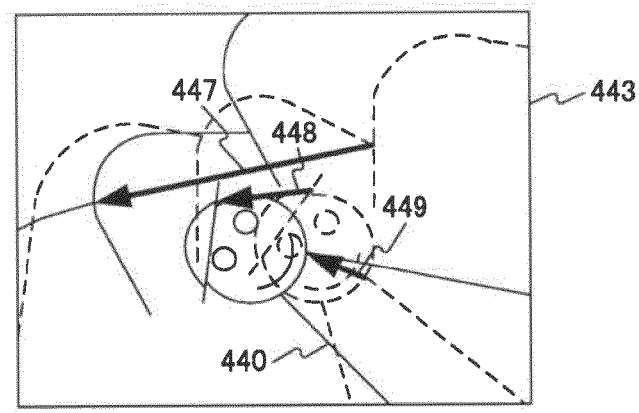
(c)

FIG. 18
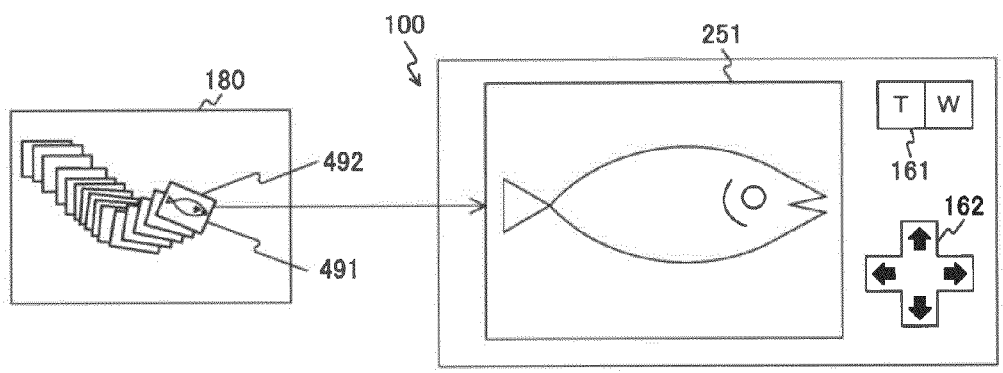
(a)
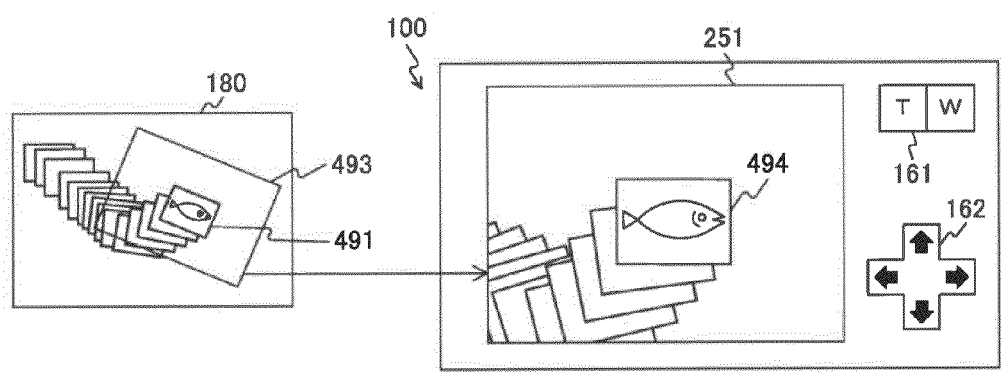
(b)
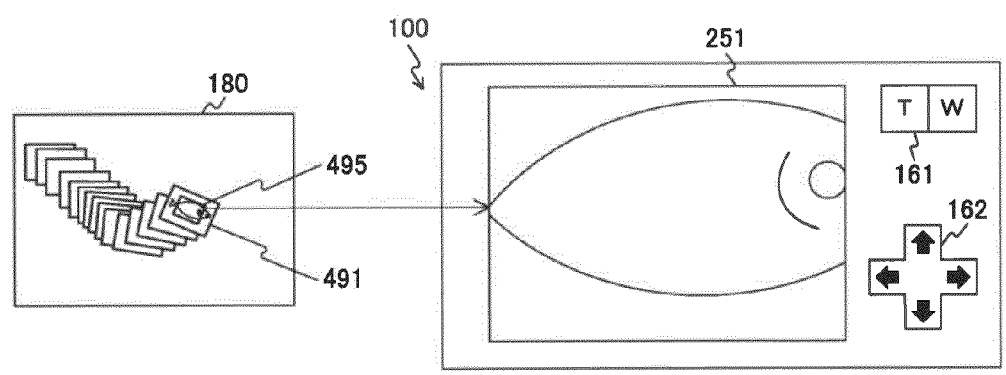
(c)

FIG.20
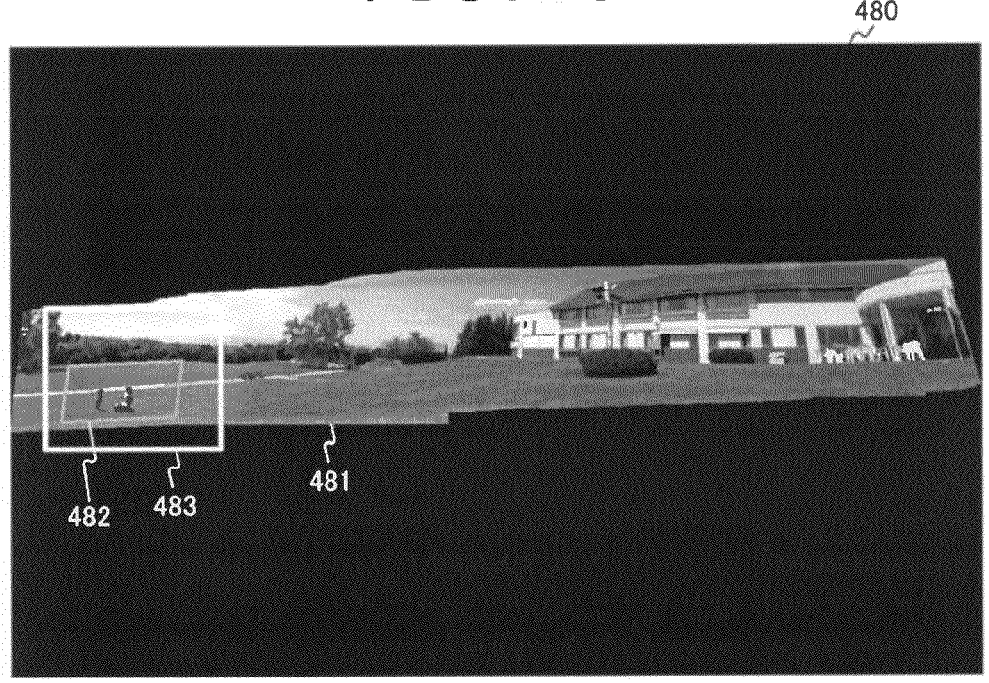
(a)
(b)

FIG.21
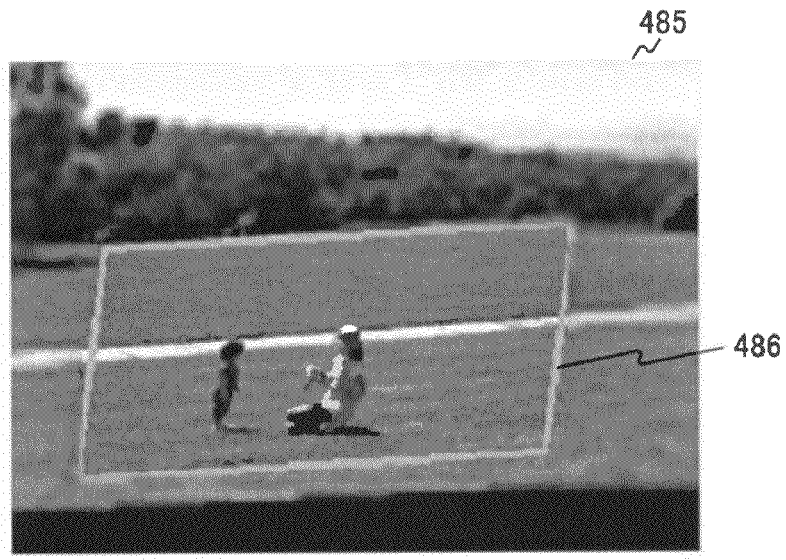
(a)
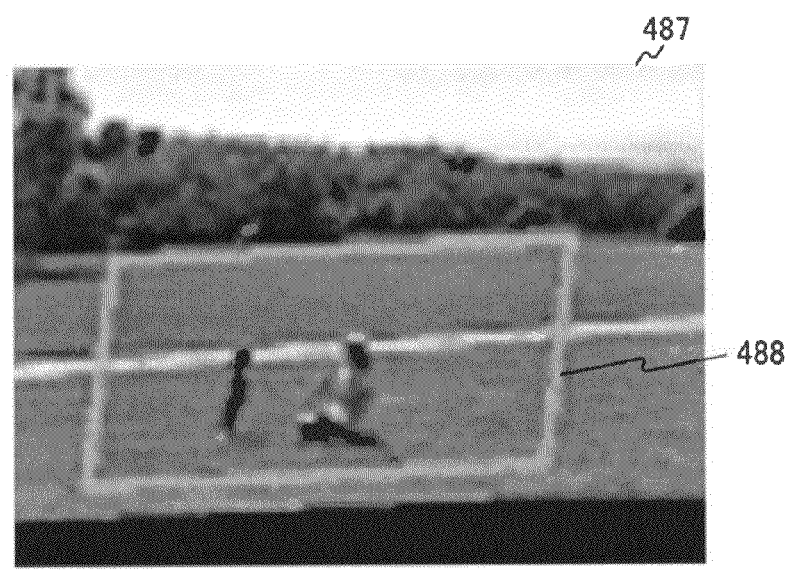
(b)

FIG.32
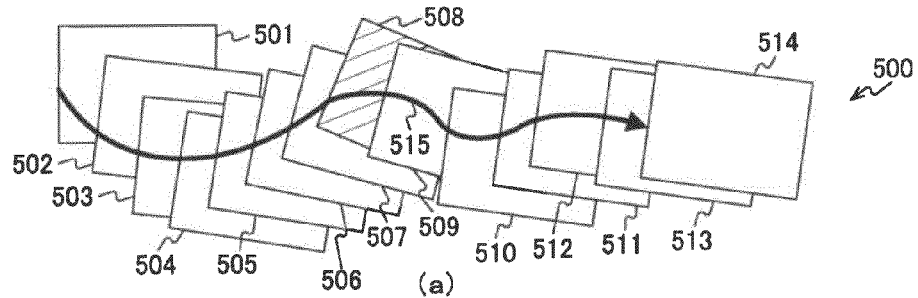
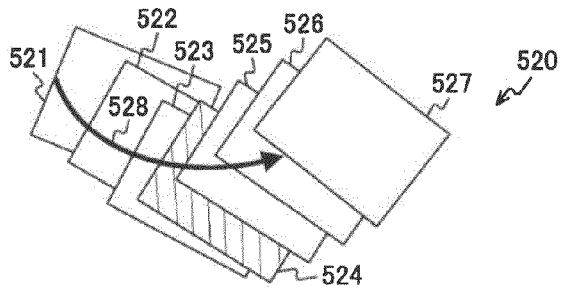
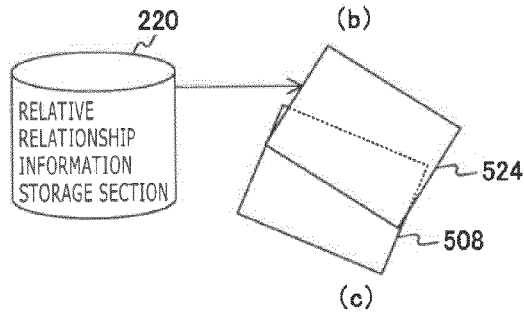
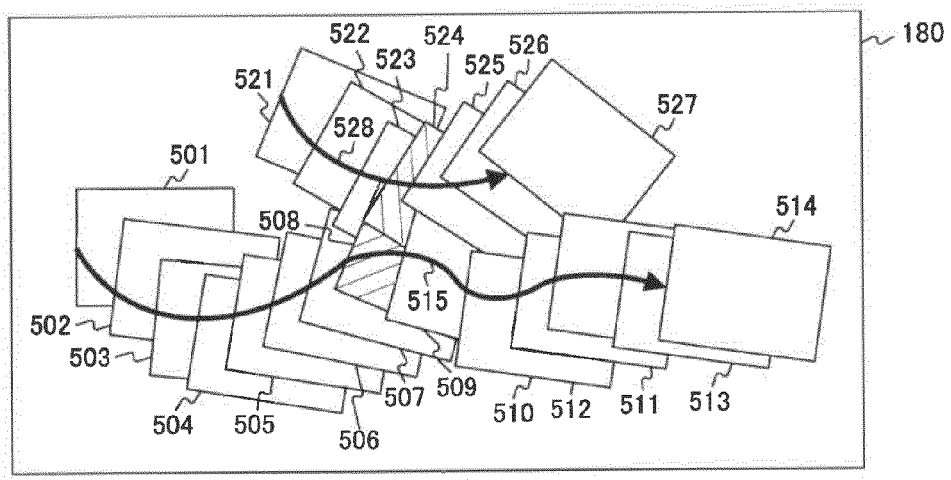

FIG.36
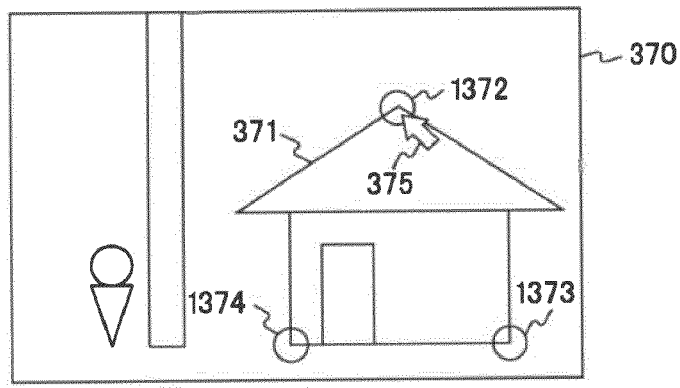
(a)
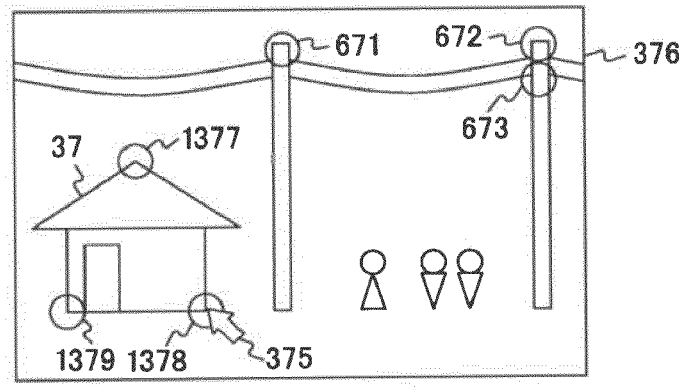
(b)
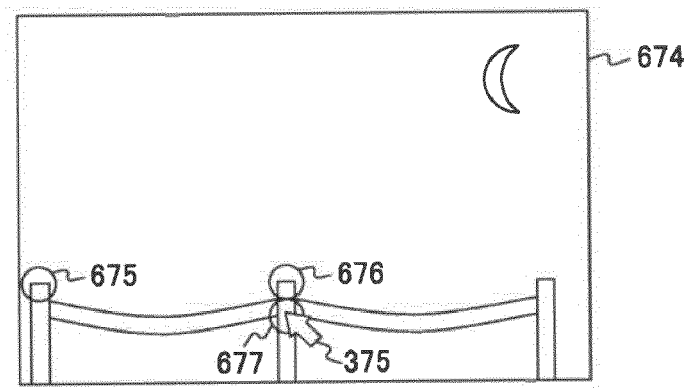
(c)

FIG.39
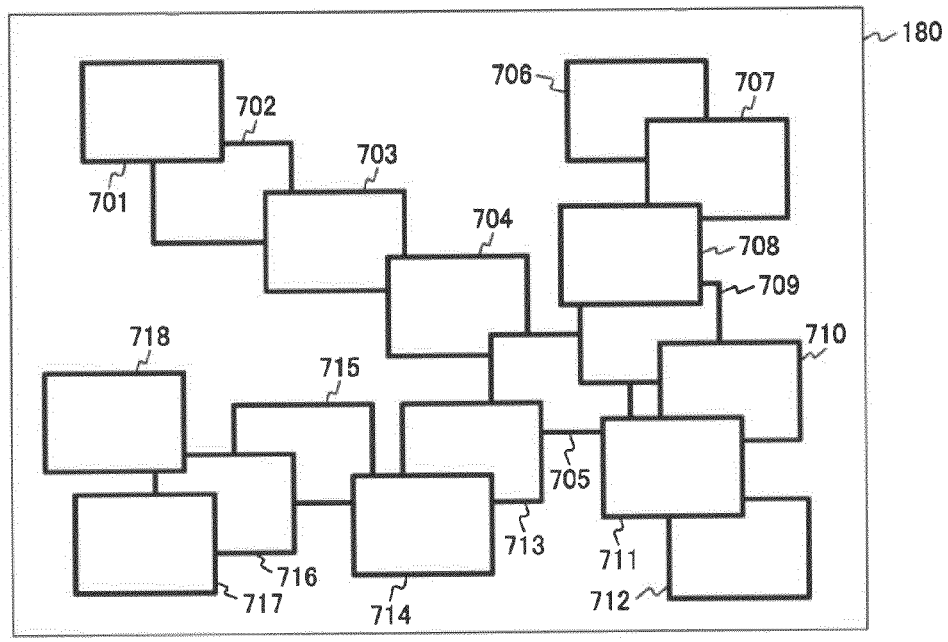
(a)
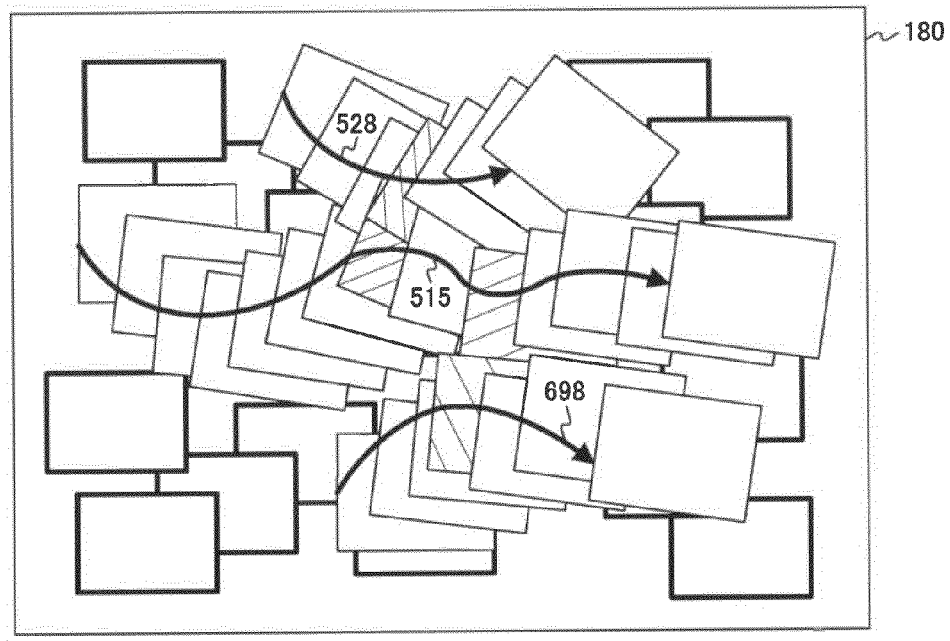
(b)

⇩ SIMD MATHEMATICAL OPERATION

827: [A1, A2, A3, A4] + 828: [B1, B2, B3, B4] = 829: [C1, C2, C3, C4]

(b)

FIG.47
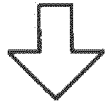
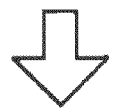
RESULT OUTPUT

FIG.50

VECTOR A = ( [-1] × [0,1,2,3]₈₄₁ + [0] × [1,2,3,4]₈₄₂ + [1] × [2,3,4,5]₈₄₃ )

VECTOR B = ( [-2] × [32,33,34,35]₈₄₄ + [0] × [33,34,35,36]₈₄₅ + [2] × [34,35,36,37]₈₄₆ )

VECTOR C = ( [-1] × [64,65,66,67]₈₄₇ + [0] × [65,66,67,68]₈₄₈ + [1] × [66,67,68,69]₈₄₉ )

VECTOR D = ( VECTOR A + VECTOR B ) + VECTOR C

IMAGE PICKUP APPARATUS, CONTROLLING METHOD AND PROGRAM FOR THE SAME

TECHNICAL FIELD

This invention relates to an image pickup apparatus, and particularly to an image pickup apparatus which can display a picked up image and a controlling method for the image pickup apparatus as well as a program for causing a computer to execute the method.

BACKGROUND ART

In recent years, image pickup apparatus such as a digital video camera and a digital still camera have been popularized. Further, an image pickup apparatus is available wherein a picked up image recorded by those image pickup apparatus can be displayed and reproduced on a display section such as a liquid crystal panel.

Further, an image pickup apparatus is available wherein the display magnification of a picked up image displayed on such a display section can be varied by a user operation. For example, an image reproduction apparatus has been proposed wherein, in a case wherein an image recorded is reproduced and displayed, a partial region of the image is displayed in an enlarged scale (for example, refer to Japanese Patent Laid-Open No. 2000-217061 (FIG. 4)).

According to the related art described above, since a partial region of a picked up image displayed on the display section can be displayed in an enlarged scale, the user can enlarge and watch a desired image portion. On the other hand, it is considered that, where the user wants to watch a picked up image displayed in the display section in a bird-eye view fashion, the picked up image is displayed in a reduced scale. For example, it is a possible idea to successively display still pictures recorded successively one by one in a reduced scale at a central portion of the display section. In this instance, since only a still picture which makes an object of display is displayed in a reduced state, the user cannot grasp a relationship of the still picture to the other still pictures and it is difficult to watch picked up images in a bird-eye view fashion. Therefore, it is a possible idea to display the still pictures in a reduced scale, for example, such that they are juxtaposed with each other in a time series on the display section. In this instance, although the still pictures are juxtaposed in a time series, there is the possibility that the user may not be able to grasp, for example, a relationship between adjacent ones of the still pictures and may not be able to watch the picked up images in a bird-eye view fashion.

Further, it is a possible idea to reproduce a picked up dynamic picture in a reduced scale in the proximity of the center of the display section. Also in this instance, there is the possibility that the user may not be able to grasp a relationship of one picked up image which forms the picked up dynamic picture and the other picked up images other than the picked up image and may not be able to watch the picked up dynamic picture in a bird-eye view fashion.

Therefore, it is considered that, for example, if still pictures or picked up dynamic pictures recorded successively can be watched in a bird-eye view fashion in relation to the other picked up images, then the user can readily grasp the contents of the picked up images.

It is an object of the present invention to make it possible to grasp, when picked up images picked up by an image pickup apparatus are accessed, the contents of the picked up images readily.

DISCLOSURE OF INVENTION

The present invention has been made to solve the subject described above, and according to a first aspect of the present invention, there are provided an image pickup apparatus including image pickup means for picking up an image pickup object to produce image data, transformation information calculation means for calculating, based on a first picked up image which is an image corresponding to the image data and a second picked up image positioned later than the first picked up image on a time axis upon image pickup of the image data, transformation information regarding the first picked up image and the second picked up image, image storage means for storing those images which are positioned prior to the second picked up image on the time axis as history images, image transformation means for transforming the second picked up image based on the calculated transformation information, image synthesis means for synthesizing the transformed second picked up image with the history images to form a synthesized image, operation acceptance means for accepting a designation operation for designating a display magnification of the second picked up image, and control means for determining a display region on the synthesized images stored in the image storage means based on the designated display magnification and causing the images included in the display region to be displayed successively, and a controlling method for the image pickup apparatus as well as a program for causing a computer to execute the method. This brings the following operation. In particular, the second picked up image is transformed based on the transformation information, and the transformed second picked up image is synthesized with the history images to form a synthesized image. If a designation operation which designates a display magnification for the second picked up image is accepted, then the display region for the synthesized image is determined based on the designated display magnification, and those images which are included in the display region are successively displayed.

Further, according to this first aspect, the control means may determine, when a designation operation which designates a display magnification for reducing the second picked up image is accepted by the operation acceptance means, the display region which at least includes the transformed second picked up image in the synthesized images stored in the image storage means and those images which are around the second picked up image. This brings the following operation. In particular, if a designation operation which designates a display magnification for reducing the second picked up image is accepted, then the display region which at least includes the transformed second picked up image and those images which are around the second picked up image is determined.

Further, according to this first aspect, the control means may determine the display region based on the calculated transformation information and the designated display magnification, and the image synthesis means may synthesize the second picked up image before transformed by the image transformation means by overwriting with the images included in the display region to form a display image. This brings the following operation. In particular, the display region is determined based on the transformation information and the designated display magnification, and the second picked up image before transformed is synthesized by overwriting with the images included in the display region to produce a display image.

Further, according to this first aspect, the control means may transform the images included in the display region in a direction opposite to the transformation direction of the second picked up image by the image transformation means based on the calculated transformation information, and the image synthesis means may synthesize the second picked up image before transformed by the image transformation means by overwriting with the images included in the display region after the transformation to form the display image. This brings the following operation. In particular, the images included in the display region are transformed in the direction opposite to the transformation direction of the second picked up image based on the transformation information, and the second picked up image before transformed is synthesized by overwriting with the images included in the display region after the transformation to form the display image.

Further, according to this first aspect, the image pickup means may pick up an image pickup object to produce image data of a dynamic picture, and the first picked up image and the second picked up image may be picked up images which form the dynamic picture. This brings the following operation. In particular, an image of an image pickup object is picked up to produce image data of a dynamic picture, and display images regarding picked up images which form a picked up dynamic picture according to the produced image data are successively displayed. Further, in this instance, the transformation information calculation means may include characteristic point extraction means for extracting characteristic points of the first picked up image and the second picked up image based on pixels which form the first picked up image and the second picked up image which form the image pickup dynamic picture, movement amount calculation means for calculating movement amounts regarding the first picked up image and the second picked up image based on the extracted characteristic points, and transformation parameter calculation means for calculating a predetermined transformation parameter based on the calculated movement amounts to calculate the transformation information. Further, in this instance, the characteristic point extraction means may be formed from a multi-core processor, and the multi-core processor may carry out parallel processing for the pixels which form the first picked up image and the second picked up image by SIMD mathematical operation to extract the characteristic amounts of the first picked up image and the second picked up image. Further, in this instance, the movement amount calculation means may be formed from a multi-core processor, and the multi-core processor may carry out parallel processing for the extracted characteristic points by SIMD mathematical operation to calculate the movement amounts of the first picked up image and the second picked up image.

Further, according to this first aspect, the operation acceptance means may accept a movement operation for moving the display region, and the control means moves the display region on the synthesized images stored in the image storage means based on the accepted movement operation. This brings the operation that, if a movement operation for moving the display region is accepted, then the display region of the synthesized images is moved based on the accepted movement operation.

Meanwhile, according to a second aspect of the present invention, there are provided an image pickup apparatus including image pickup means for picking up an image pickup object to produce image data, transformation information calculation means for calculating, based on a first picked up image which is an image corresponding to the image data and a second picked up image positioned later than the first picked up image on a time axis upon image pickup of the image data, transformation information regarding the first picked up image and the second picked up image, image storage means for storing those images which are positioned prior to the second picked up image on the time axis as history images, image transformation means for transforming the history images based on the calculated transformation information, image synthesis means for synthesizing the second picked up image with the transformed history images to form a synthesized image, operation acceptance means for accepting a designation operation for designating a display magnification of the second picked up image, and control means for determining a display region on the synthesized images stored in the image storage means based on the designated display magnification and causing the images included in the display region to be displayed successively, and a controlling method for the image pickup apparatus as well as a program for causing a computer to execute the method. This brings the following operation. In particular, the history images are transformed based on the transformation information, and the second image is synthesized with the transformed history images to form a synthesized image. If a designation operation which designates a display magnification for the second picked up image is accepted, then the display region on the synthesized images is determined based on the designated display magnification, and the images included in the display region are successively displayed.

According to the present invention, a superior effect that, when picked up images picked up by an image pickup apparatus are accessed, the contents of the picked up images can be grasped readily.

BRIEF DESCRIPTION OF DRAWINGS

FIG. 4 is views schematically showing files recorded in a dynamic picture storage section 200 and a metadata storage section 210 in the embodiment of the present invention.

FIG. 5 is views showing an example of images corresponding to frames which form a dynamic picture.

FIG. 6 is views showing images simplified by omitting the background and so forth from the images corresponding to the frames which form a dynamic picture.

FIG. 8 is views illustrating an example of transition of dynamic pictures picked up by the image pickup apparatus 100.

FIG. 11 is views illustrating an example of transition of dynamic pictures picked up by the image pickup apparatus 100.

FIG. 12 is views showing images corresponding to immediately preceding frames regarding the images shown in FIG. 11 in broken lines and illustrating an optical flow detected.

FIG. 14 is views illustrating an example of transition of dynamic pictures picked up by an image pickup apparatus 101.

FIG. 15 is views showing images corresponding to immediately preceding frames regarding the images shown in FIG. 14 in broken lines and illustrating an optical flow detected.

FIG. 18 is views schematically illustrating images stored in the image memory 180 and images displayed on the liquid crystal panel 251 where a dynamic picture is displayed with the display magnification thereof changed.

FIG. 20 is views showing an example of synthesis (image 480) in a case wherein a dynamic picture picked up by the image pickup apparatus 101 is reproduced and an image 484 before a current image 482 of the image 480 is affine-transformed.

FIG. 21 is views showing an image 485 where an image region surrounded by a framework 483 shown in FIG. 20 is displayed in an enlarged scale and an image 487 stored in a display memory 230 in a state wherein a current image after affine transformation is stored into an image memory 180.

FIG. 32 is views schematically illustrating an example of synthesis where two dynamic pictures are synthesized.

FIG. 36 is views showing images where coincident points included in images regarding three dynamic pictures are selected.

FIG. 39 is views showing an example in a case wherein a still picture and a plurality of dynamic pictures are synthesized.

FIG. 45 is views illustrating an outline of a mathematical operation method wherein processes for a plurality of data are carried out in accordance with individual instructions and an outline of SIMD mathematical operation wherein a process for a plurality of data is carried out in accordance with a single instruction.

FIG. 47 is a view schematically illustrating a data structure and a flow of processes for image data stored in a main memory 781 in the embodiment of the present invention where a filtering process is carried out using a Sobel filter 830.

FIG. 50 is views schematically illustrating a vector mathematical operation method for carrying out vector mathematical operation using an SIMD instruction regarding vector data 841 to 849 where a filtering process is carried out using the Sobel filter 830 in the embodiment of the present invention.

BEST MODE FOR CARRYING OUT THE INVENTION

In the following, an embodiment of the present invention is described in detail with reference to the drawings.

Figure 1:
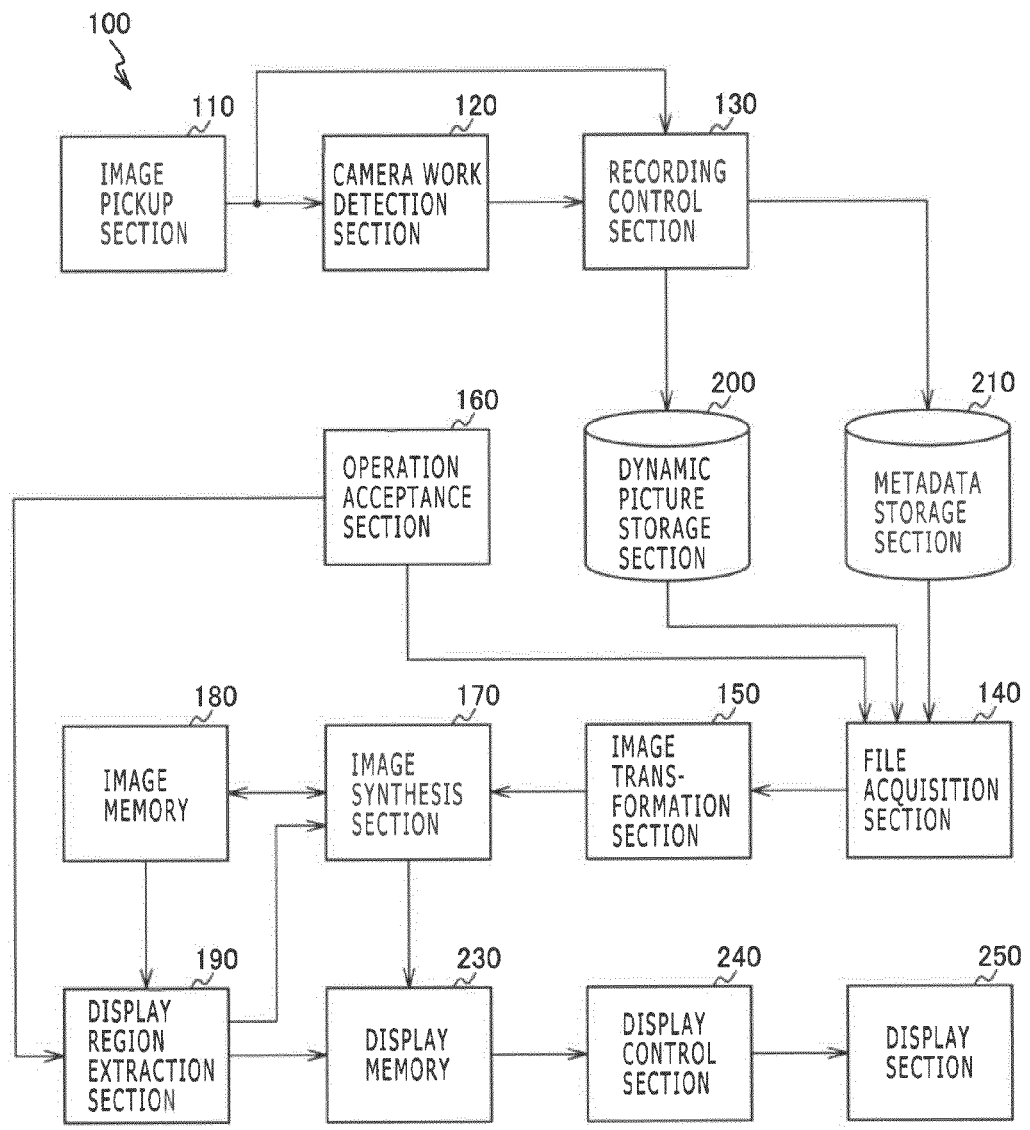
FIG. 1 is a block diagram showing an example of a functional configuration of an image pickup apparatus 100 according to an embodiment of the present invention.

FIG. 1 is a block diagram showing an example of a functional configuration of an image pickup apparatus 100 according to the embodiment of the present invention. The image pickup apparatus 100 includes an image pickup section 110, a camera work detection section 120, a recording control section 130, a file acquisition section 140, an image transformation section 150, an operation acceptance section 160, an image synthesis section 170, an image memory 180, a display region extraction section 190, a dynamic picture storage section 200, a metadata storage section 210, a display memory 230, a display control section 240, and a display section 250. The image pickup apparatus 100 can be implemented by a digital video camera which can extract characteristic amounts by an image analysis from, for example, a picked up dynamic picture and carry out various image processes using the extracted characteristic amounts.

The image pickup section 110 receives light from an image pickup object incident through an image pickup lens (not shown) and carries out photoelectric conversion to produce an image signal in response to the amount of the received light, and carries out various signal processes for the image signal. Then, the image signal for which the signal processes are carried out is outputted as a dynamic picture (picked up dynamic picture) to the camera work detection section 120 and the recording control section 130.

The camera work detection section 120 analyzes the dynamic pictures outputted from the image pickup section 110 to detect movement information (camera work) of the image pickup apparatus 100 upon image pickup and outputs affine transformation parameters (camera work parameters) calculated based on the movement information of the image pickup apparatus 100 to the recording control section 130. In particular, the camera work detection section 120 extracts characteristic points from each of images which form dynamic pictures and extract an optical flow (motion vector) regarding each of the characteristic points. Then, the camera work detection section 120 analyzes the extracted optical flows regarding the characteristic points to select those characteristic points which indicate a dominant movement and estimates the movement of the image pickup apparatus 100 based on the optical flows regarding the characteristic points which indicate the dominant movement. Here, the dominant movement signifies an orderly movement indicated by a comparatively great number of optical flows from among optical flows regarding a plurality of characteristic points. It is to be noted that the camera work detection section 120 is described in detail with reference to FIG. 3.

The recording control section 130 records dynamic pictures outputted from the image pickup section 110 as a dynamic picture file into the dynamic picture storage section 200 and records affine transformation parameters outputted from the camera work detection section 120 as a metadata file into the metadata storage section 210 in an associated relationship with corresponding dynamic pictures and frames.

The dynamic picture storage section 200 stores dynamic pictures outputted from the image pickup section 110 as a dynamic picture file under the control of the recording control section 130. Further, the dynamic picture storage section 200 supplies the dynamic picture file in accordance with a request from the file acquisition section 140 to the file acquisition section 140. It is to be noted that dynamic picture files stored in the dynamic picture storage section 200 are hereinafter described with reference to FIG. 4.

The metadata storage section 210 stores affine transformation parameters outputted from the camera work detection section 120 as a metadata file under the control of the recording control section 130. Further, the metadata storage section 210 supplies the metadata file to the file acquisition section 140 in accordance with a request from the file acquisition section 140. It is to be noted that metadata files stored in the metadata storage section 210 are hereinafter described in detail with reference to FIG. 4.

The file acquisition section 140 acquires at least one of the files stored in the dynamic picture storage section 200 or the metadata storage section 210 in response to an operation input accepted by the operation acceptance section 160, and supplies information of the acquired file or files to the individual sections. In particular, where an instruction operation to reproduce a dynamic picture is accepted by the operation acceptance section 160, the file acquisition section 140 acquires a dynamic picture file of an object of the instruction of reproduction from the dynamic picture storage section 200 and acquires a metadata file stored in the metadata storage section 210 in an associated relationship with the dynamic picture file, and then outputs the dynamic picture of the acquired dynamic picture file and affine transformation parameters of the acquired metadata file to the image transformation section 150.

The image transformation section 150 carries out affine transformation of images, which form dynamic pictures of a dynamic picture file outputted from the file acquisition section 140, for each frame using affine transformation data corresponding to the images, and outputs the affine-transformed images to the image synthesis section 170. It is to be noted that such image transformation is described in detail with reference to FIGS. 8 to 19 and so forth.

The operation acceptance section 160 includes various operation members and outputs, when it accepts an operation input from any of the operation members, the contents of the accepted operation input to the file acquisition section 140 or the display region extraction section 190. It is to be noted that those operation members are described in detail with reference to FIG. 2. Further, at least part of the operation acceptance section 160 and the display section 250 may be configured integrally as a touch panel.

The image synthesis section 170 synthesizes images by overwriting an image after affine transformation by the image transformation section 150 on synthesized images corresponding to frames up to the immediately preceding frame stored in the image memory 180 and stores the synthesized new synthesized image into the image memory 180. Further, the image synthesis section 170 synthesizes, based on the magnitude of the display region determined in response to the value of the display magnification, a current image before affine transformation by the image transformation section 150 by overwriting with a synthesized image stored in the display memory 230. It is to be noted that the synthesis of the current image in the display memory 230 is described in detail with reference to FIG. 19 and so forth. Further, such image synthesis is described in detail with reference to FIGS. 8 to 19 and so forth. Here, the image synthesis section 170 compresses an image after affine transformation by the image transformation section 150 and overwrites the compressed image on the synthesized image stored in the image memory 180 so that the current image overwritten on the synthesized image stored in the display memory 230 is made a picked up image of a resolution higher than that of the non-compressed image or compressed history images. Consequently, the history images when a synthesized image is outputted can be made compressed images so that the current image can be made a picked up image of a resolution higher than that of the non-compressed image or the compressed history images.

The image memory 180 is a work buffer for retaining a synthesized image synthesized by the image synthesis section 170 and supplies the retained synthesized image to the image synthesis section 170 or the display region extraction section 190. In other words, the image memory 180 is an image memory for retaining history images.

The display region extraction section 190 extracts, from a synthesized image retained in the image memory 180, an image existing in a range of a display region which is a region of an object of display and stores the extracted image into the display memory 230. It is to be noted that the extraction of an image included in the range of the display region is described in detail with reference to FIGS. 17 to 19 and so forth.

The display memory 230 is a displaying buffer for retaining an image extracted from the image memory 180 by the display region extraction section 190, and an image retained in the display memory 230 is displayed on the display section 250.

The display control section 240 controls the display section 250 to successively display synthesized images retained in the display memory 230 for each frame.

The display section 250 displays a current image or a synthesized image stored in the display memory 230 under the control of the display control section 240. For example, the display section 250 can be implemented by a display panel 251 as shown in FIG. 2.

Figure 2:
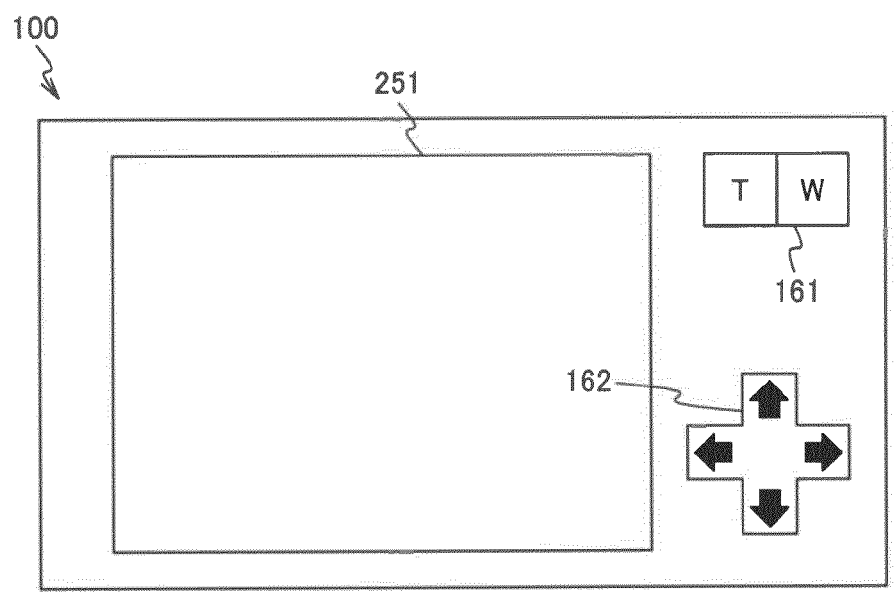
FIG. 2 is a view showing an appearance of the image pickup apparatus 100 according to the embodiment of the present invention.

FIG. 2 is a view showing an appearance of the image pickup apparatus 100 according to the embodiment of the present invention. In particular, FIG. 2 is a view showing a liquid crystal panel 251 and peripheral elements of the liquid crystal panel 251.

The image pickup apparatus 100 includes the liquid crystal panel 251, a zoom button 161 and a cross button 162. It is to be noted that the zoom button 161 and the cross button 162 correspond to the operation acceptance section 160 shown in FIG. 1. Further, the liquid crystal panel 251 corresponds to the display section 250 shown in FIG. 1. It is to be noted that, while other operation members such as a power supply switch and a picked up image recording instruction button are provided as the operation acceptance section 160 on the image pickup apparatus 100, illustration and description of them are omitted here.

The liquid crystal panel 251 is a liquid crystal panel which displays a picked up dynamic picture outputted from the image pickup section 110. It is to be noted that the liquid crystal panel 251 may be formed as a touch panel which displays various selection buttons such that, by touching a region of any of the selection buttons with a finger or the like, an operation input can be carried out.

The zoom button 161 is a button which is operated when the magnification of zooming is to be adjusted. In particular, a W (wide) button and T (tele) button shown in FIG. 2 are provided on the zoom button 161. Then, upon image pickup, in a state wherein the W button is depressed, the zoom lens moves to the wide end side (wide angle side), but in a state wherein the T button is depressed, the zoom lens moves to the tele end side (telephoto side). Further, upon dynamic picture reproduction, in a state wherein the W button is depressed, the dynamic pictures during reproduction are successively displayed in a reduced scale, but in another state wherein the T button is depressed, the dynamic pictures during reproduction are successively displayed in an enlarged scale.

The cross button 162 is a button which is operated in order to move the display region upon reproduction of a dynamic picture in an upward, downward, leftward or rightward direction. In particular, by depressing at least one of four arrow marks of the cross button 162, the display region can be moved in the direction indicated by the arrow mark.

Figure 3:
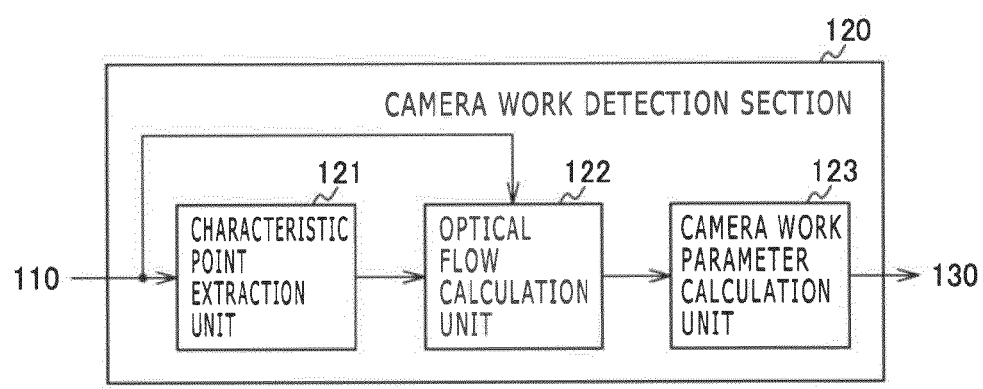
FIG. 3 is a block diagram showing an example of a functional configuration of a camera work detection section 120 in the embodiment of the present invention.

FIG. 3 is a block diagram showing an example of a functional configuration of the camera work detection section 120 in the embodiment of the present invention. The camera work detection section 120 includes a characteristic point extraction unit 121, an optical flow calculation unit 122 and a camera work parameter calculation unit 123.

The characteristic point extraction unit 121 extracts characteristic points from an image corresponding to a frame which forms a dynamic picture outputted from the image pickup section 110 and outputs the extracted characteristic points to the optical flow calculation unit 122. Here, the characteristic point extraction unit 121 extracts, regarding a frame at the top of frames which form a dynamic picture outputted from the image pickup section 110, characteristic points from an entire image, but, regarding frames other than the top frame, characteristic points from a regional portion picked up newly in comparison with an image corresponding to the immediately preceding frame. It is to be noted that, as a characteristic point, for example, a point at which the gradient is high on an edge in a vertical direction or a horizontal direction (the point is generally called "corner point." In the following description, the point is referred to as "corner point") can be extracted. This corner point is a characteristic point tough against calculation of an optical flow and can be determined using edge detection. It is to be noted that the extraction of a corner point is described in detail with reference to FIGS. 5 and 6. Further, in this example, while the characteristic point extraction unit 121 extracts, regarding the top frame, characteristic points from the entire image and, regarding the frames other than the top frame, characteristic points from a regional portion picked up newly in comparison with the immediately preceding image, also regarding the frames other than the top frame, characteristic points may be extracted from the entire image.

The optical flow calculation unit 122 calculates an optical flow for each characteristic point outputted from the characteristic point extraction unit 121 and outputs the optical flow determined by the calculation to the camera work parameter calculation unit 123. In particular, the optical flow calculation unit 122 compares two successive frames (current frame and immediately preceding frame) which form a dynamic picture outputted from the image pickup section 110 with each other to determine optical flows corresponding to individual characteristic points of the image corresponding to the immediately preceding frame as optical flows of the current frame. Further, an optical flow is determined for each of frames which form a dynamic picture. It is to be noted that, as a detection method for detecting an optical flow, such detection methods as a slope method and a block matching method can be used. It is to be noted that the calculation of an optical flow is described in detail with reference to FIGS. 5 and 6.

The camera work parameter calculation unit 123 uses optical flows corresponding to characteristic points outputted from the optical flow calculation unit 122 to carry out a camera work parameter calculation process of calculating camera work parameters, and outputs calculated camera work parameters to the recording control section 130. Here, in the embodiment of the present invention, images of a plurality of dynamic pictures of an object of reproduction are transformed and displayed in conformity with a movement of the image pickup apparatus 100. In order to carry out the transformation of the images, a movement of the image pickup apparatus 100 is extracted using the optical flows calculated by the optical flow calculation unit 122, and camera work parameters (transformation parameters) are calculated based on the extracted movement. It is to be noted that, in the embodiment of the present invention, an example wherein, as an image transformation method for transforming an image which forms a dynamic picture of an object reproduction, affine transformation is used is described. Further, an example wherein, as camera work parameters, affine transformation parameters corresponding to an inverse matrix to a matrix of affine transformation parameters calculated based on optical flows are used is described. In particular, in the embodiment of the present invention, the affine transform parameters to be used as transformation information are defined as affine transformation parameters which correspond not to an affine matrix which represents movements of characteristic points between successive images but to an affine matrix which represents, where one of successive images is determined as a reference image, to where an image next to the reference image moves. Further, although an example wherein affine transformation parameters are used as camera work parameters is described, some other image transformation method such as projection transformation may be used. It is to be noted that affine transformation parameters can be determined by calculation using vectors at three points. Meanwhile, projection transformation parameters can be determined by calculation using vectors at four points. Here, camera work parameters are transformation information for transforming, using at least one of picked up images which form a picked up dynamic picture as a reference, the other picked up images, and at least includes position information and posture information described in accordance with the coordinate system of the image pickup apparatus 100. In other words, camera work parameters include information relating to the position and the posture of the image pickup apparatus 100 where image pickup is carried out by an image pickup person. Further, a movement of the image pickup apparatus 100 by an operation of the image pickup person such as, for example, zoom-in, zoom-out, panning, tilting or rotation can be estimated based on affine transformation parameters determined by the camera work parameter calculation unit 123. It is to be noted that the calculation of an affine transformation parameter is described in detail with reference to FIGS. 5 and 6.

FIG. 4 is views schematically showing files recorded in the dynamic picture storage section 200 and the metadata storage section 210 in the embodiment of the present invention. In (a) of FIG. 4, dynamic picture files 201 to 204 stored in the dynamic picture storage section 200 and metadata files 211 to 213 stored in an associated relationship with the dynamic picture files 201 to 204 in the metadata storage section 210 are illustrated. Here, it is assumed that a dynamic picture ID which is identification information for identifying each of the dynamic picture files stored in the dynamic picture storage section 200 is applied to each dynamic picture file. For example, "#1" is applied to the dynamic picture file 201; "#2" is applied to the dynamic picture file 202; and "#n" is applied to the dynamic picture file 204.

(b) of FIG. 4 is a view schematically illustrating the dynamic picture file 201 stored in the dynamic picture storage section 200 and the metadata file 211 stored in an associated relationship with the dynamic picture file 201 in the metadata storage section 210. Here, the dynamic picture file 201 is a file of dynamic pictures formed from n frames, and the n frames are denoted as frames "1" 205 to "n" 208.

Meanwhile, a dynamic picture ID 214, a frame number 215 and an affine transformation parameter 216 are stored in an associated relationship with each other into the metadata file 211.

The dynamic picture ID 214 is a dynamic picture IC applied to a corresponding dynamic picture file, and, for example, "#1" applied to the dynamic picture file 201 is stored in the dynamic picture ID 214.

The frame number 215 is a serial number of each of frames which form a dynamic picture of a corresponding dynamic picture file, and, for example, "1" to "n" corresponding to the frames "1" 205 to "n" 208 which form a dynamic picture of the dynamic picture file 201 are placed in the frame number 215.

The affine transformation parameter 216 is an affine transformation parameter calculated for each frame of a dynamic picture corresponding to the frame number 215. It is to be noted that affine transform parameters 216 "a1, b1, c1, d1, e1, f1" corresponding to "1" of the frame number 215 are affine transform parameters of a unit matrix. Further, "am, bm, cm, dm, em, fm" of the affine transformation parameter 216 corresponding to "m (m is an integer equal to or higher than two)" of the frame number 215 are affine transformation parameters for the frame "m−1" immediately preceding to the frame "m." Now, a detection method of detecting an affine transformation parameter to be used for image transformation is described in detail with reference to the drawings.

(a) to (c) of FIG. 5 are views showing an example of images corresponding to frames which form a dynamic picture. (a) of FIG. 6 is a view showing an image simplified by omitting the background and so forth from an image corresponding to a frame preceding by one to a frame corresponding to an image 300 shown in FIG. 5. Meanwhile, (b) and (c) of FIG. 6 are views showing images simplified by omitting the background and so forth from the image 300 shown in FIG. 5.

The images 300, 320 and 330 shown in FIGS. 5 and 6 include images 301, 321 and 331 of a horse on which a person mounts and images 302, 322 and 332 of a snake lying in front of the images 301, 321 and 331 of the horse. Further, as shown in FIG. 5, a flag, chairs and so forth exist on the background of the images, and the flag is trailing by wind.

The image 320 shown in (a) of FIG. 6 is an image obtained by simplifying an image corresponding to a frame preceding by one to a frame corresponding to the image 300, 330 shown in (a) to (c) of FIG. 5 and (b) and (c) of FIG. 6. Further, the images 320 and 330 corresponding to two successive frames are images indicative of transition where the size of an image pickup object in a screen image gradually increases. In particular, upon image pickup of the images, a zoom-in operation which is an operation of gradually making the image pickup object in the screen image larger is carried out.

The embodiment of the present invention is described below taking a method wherein characteristic points are detected from an image which forms a dynamic picture and optical flows corresponding to the characteristic points are used to calculate affine transformation parameters as an example. Further, the present example is described in regard to a case wherein a corner point is used as a characteristic point.

Here, in (a) to (c) of FIG. 6, description is given taking a method wherein optical flows corresponding to three corner points detected from the images 320 and 330 are used to calculate affine transformation parameters as an example.

For example, it is assumed that, in the image 320 shown in (a) of FIG. 6, a corner point 323 in the proximity of the mouth of the image 321 of a horse, another corner point 324 in the proximity of the hip of the person of the image 321 of the horse and a further corner point 325 in the proximity of the mouth of the image 322 of the snake are detected. In this instance, from the image 330 shown in (b) of FIG. 6, optical flows 337, 338 and 339 for the corner points 323, 324 and 325 of the image 320 are detected by a slope method, a block matching method or the like. Then, based on the detected optical flows 337, 338 and 339, the corner points 333, 334 and 335 corresponding to the corner points 323, 324 and 325 of the image 320 are detected.

Here, for example, since the images 321 and 331 of the horse and the images 322 and 332 of the snake included in the images 320 and 330 shown in (a) and (b) of FIG. 6 do not move independently of a movement of the image pickup apparatus 100 since they are placed on the surface of the earth. Therefore, a movement of the image pickup apparatus 100 can be estimated accurately based on optical flows determined in regard to corner points detected from the images 321 and 331 of the horse or the images 322 and 332 of the snake. For example, as shown in (c) of FIG. 6, it can be estimated that the image 330 is an image obtained by expanding the image 320 with respect to the center provided at a point 336 based on three optical flows 337 to 339 detected in the image 330. Consequently, it can be decided that the movement of the image pickup apparatus 100 upon image pickup of the image 330 is a zoom-in operation centered at the point 336. In this manner, if corner points are detected with regard to a physical solid which does not move independently of a movement of the image pickup apparatus 100, then the movement of the image pickup apparatus 100 which has fixed regularity can be detected accurately based on optical flows determined with regard to the corner points. Therefore, affine transformation parameters can be determined by calculation using the optical flows determined with regard to the corner points.

However, it is considered that an image sometimes includes a physical solid which moves independently of the movement of the image pickup apparatus 100 like a flag trailing by wind. For example, the image 300 shown in FIG. 5 includes a flag which is trailing by wind. If corner points are detected from a physical solid which moves independently of the movement of the image pickup apparatus 100 like a flag trailing by wind in this manner and optical flows determined with regard to the corner points are used to estimate the movement of the image pickup apparatus 100, then the movement of the image pickup apparatus 100 cannot be estimated accurately.

For example, each optical flow detected from the image 300 shown in (b) of FIG. 5 is indicated by an arrow mark, and a corner point detected from the optical flow is indicated by a round mark with a blank inside at an end of the arrow mark. Here, corner points 303 to 305 are corner points corresponding to the corner points 333 to 335 shown in (b) and (c) of FIG. 6. Meanwhile, corner points 306 to 311 are corner points detected with regard to the flag which exists on the background with respect to the image 301 of the horse. Then, since the flag is trailing by wind, a movement of the flag by an influence of the wind is detected as an optical flow. In particular, the optical flows corresponding to the corner points 306 to 311 are detected in regard to the flag which moves independently of the movement of the image pickup apparatus 100. Therefore, if three optical flows used for calculation of affine transformation parameters include an optical flow corresponding to at least one corner point from among the corner points 306 to 311, then an accurate movement of the image pickup apparatus 100 cannot be detected. In this instance, accurate affine transformation parameters cannot be calculated.

As described above, for example, optical flows regarding a physical solid which moves independently of the movement of the image pickup apparatus 100 (optical flows corresponding to the corner points 306 to 311 shown in (b) of FIG. 5) and optical flows having fixed regularity in a relation to the movement of the image pickup apparatus 100 (optical flows other than the optical flows corresponding to the corner points 306 to 311 shown in (b) of FIG. 5) are sometimes detected from picked up images.

Therefore, in the embodiment of the present invention, an example wherein an affine transformation parameter calculation process for calculating affine transformation parameters based on three optical flows is carried out several times to determine a plurality of affine transformation parameters and optimum affine transformation parameters are selected from among the plural affine transformation parameters is described. It is to be noted that, in this example, it is assumed that the size of a moving physical solid included in each of images which form a dynamic picture is comparatively small with respect to the area of the images.

Here, the affine transformation is described briefly. Where the position of a source of movement on a two-dimensional system is represented by (x, y) and the position of a destination of the movement after the affine transformation on the two-dimensional system is represented by (x', y'), the determinant of the affine transformation can be represented by the following expression 1:

[Expression 1]

$$[x'\ y'\ 1] = [x\ y\ 1] \begin{bmatrix} a & d & 0 \\ b & e & 0 \\ c & f & 1 \end{bmatrix} \qquad \text{(expression 1)}$$

Here, a to f are affine transformation parameters. Further, the affine matrix AM depending upon the affine transformation parameters can be determined by the following expression. Further, a zoom component XZ in the X direction, a zoom component YZ in the Y direction, a translation component XT in the X direction, a translation component YT in the Y direction and a rotation component R can be individually determined by the following expressions. It is to be noted that, in the case of a unit matrix, a=e=1, b=c=d=f=0.

[Expression 2]

$$AM = \begin{bmatrix} a & b & c \\ d & e & f \end{bmatrix}$$

$$XZ = \sqrt{a^2 + d^2}$$

$$YZ = \sqrt{b^2 + e^2}$$

$$XT = c$$

$$YT = f$$

$$R = \tan^{-1}\left[\frac{d}{a}\right]$$

Now, a calculation method of an affine transformation parameter is described.

First, three characteristic points are selected from among characteristic points in which optical flows are detected in an image corresponding to a current frame which is one of frames which form a dynamic picture. For example, three corner points are selected at random from among corner points (indicated by a round mark with a blank inside) detected from the image 300 shown in (b) of FIG. 5. It is to be noted that, where a projection transformation parameter is used as a camera work parameter, four characteristic points are selected at random.

Then, affine transformation parameters are calculated using three optical flows corresponding to the selected three characteristic points. For example, affine transformation parameters are calculated using optical flows (indicated by arrow marks connected to round marks with a blank inside) corresponding to three corner points selected from among the corner points (indicated by round marks with a blank inside) of the image 300 shown in (b) of FIG. 5. The affine transformation parameters can be determined using the expression 1.

Then, based on the determined affine transformation parameters, a score of the affine transformation parameters is calculated. In particular, the position of destinations of the movement of all characteristic points of an image corresponding to a frame immediately preceding to the current frame is determined using the determined affine transformation parameters. Then, the positions of the characteristic points determined using the affine transformation parameters and the positions of the characteristic points detected from the current frame are compared with each other to calculate a difference value of the positions of the two characteristic points corresponding to each other for each characteristic point. As the difference value, for example, the absolute distance between the positions of the two characteristic points corresponding to each other is calculated. Then, the calculated difference value and a threshold value set in advance are compared with each other for each characteristic point to determine the number of those characteristic points whose difference value is lower than the threshold value as a score of the affine transformation parameters. In this manner, a process of selecting three characteristic points at random from among characteristic points whose optical flow is detected and calculating the score of the affine transformation parameters based on the optical flows corresponding to these characteristic points in this manner is repeated by a predetermined number of times to calculate a plurality of scores of the affine transformation parameters. The predetermined number of times may be set suitably in response to the type of an image of an object of comparison, the processing capacity of the image pickup apparatus 100 and so forth, or a fixed value may be used. As the predetermined number of times, for example, approximately 20 times may be set taking the processing capacity of the image pickup apparatus 100 into consideration.

For example, a case is considered wherein three corner points other than the corner points 306 to 311 are selected from among corner points detected from the image 300 shown in (b) of FIG. 5. If affine transformation parameters are calculated using three optical flows corresponding to the three corner points selected in this manner, then since the three optical flows have fixed regularity as described hereinabove, affine transformation parameters with which an image corresponding to the immediately preceding frame is transformed in accordance with a fixed rule are determined. Therefore, a difference value determined with regard to the corner points other than the corner points 306 to 311 between the position of a corner point determined using the affine transformation parameters and the position of a corner point detected from the current frame has a comparatively low value. Therefore, the score of the affine transformation parameters has a comparatively high value.

On the other hand, another case is considered wherein three corner points including at least one of the corner points 306 to 311 are selected from among the corner points detected from the image 300 shown in (b) of FIG. 5. If affine transformation parameters are calculated using three optical flows corresponding to the three corner points selected in this manner, then since the three optical flows include an optical flow which does not have the fixed regularity, affine transformation parameters with which the image corresponding to the immediately preceding frame is transformed in accordance with the fixed rule are determined. Therefore, the difference value determined between the position of a corner point determined using the affine transformation parameters and the position of a corner point detected from the current frame exhibits a comparatively high value at an arbitrary corner point. Therefore, the score of the affine transformation parameters exhibits a low value.

Then, the affine transformation parameter which exhibits the highest value of the score among the scores of the determined plural affine transformation parameters is selected as a representative affine transformation parameter. Then, an inverse matrix to a matrix of the selected representative affine transformation parameters is calculated, and affine transformation parameters of the inverse matrix are recorded in an associated relationship with the current frame into the metadata storage section 210. Consequently, when an image which forms a dynamic picture is affine transformed, it can be affine transformed using optimum affine transformation parameters.

As described above, even where each of images which form a dynamic picture includes a physical solid which is moving (moving physical solid) such as a person or a car, where the size of the moving physical solid with respect to the area of the image is comparatively small, a movement of the image pickup apparatus 100 can be extracted without being influenced by the moving physical solid.

Further, by extracting a movement of the image pickup apparatus 100, it is possible to estimate a movement considered to be caused intentionally by an image pickup person such as zoom-in, zoom-out, panning, tilting or rotation.

Now, operation of the image pickup apparatus 100 according to the embodiment of the present invention is described with reference to the drawings.

Figure 7:
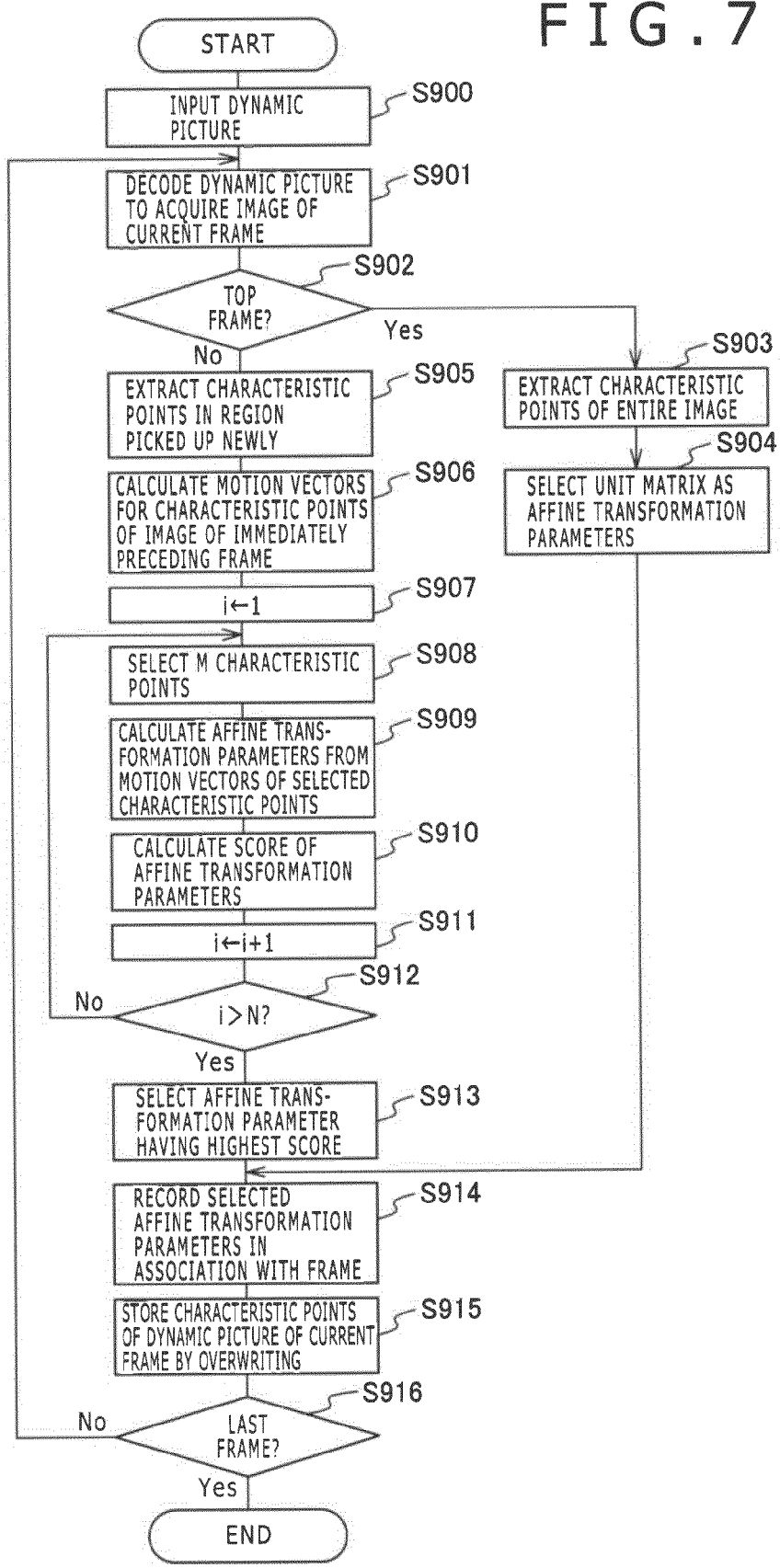
FIG. 7 is a flow chart illustrating a processing procedure of an affine transformation parameter detection process by the image pickup apparatus 100 in the embodiment of the present invention.

FIG. 7 is a flow chart illustrating a processing procedure of an affine transformation parameter detection process by the image pickup apparatus 100 according to the embodiment of the present invention.

First, a dynamic picture is inputted from the image pickup section 110 (step S900). Then, the dynamic picture outputted from the image pickup section 110 is decoded, and images of one frame are acquired in an order of a time series (step S901). Then, it is decided whether or not the acquired one frame is the top frame of the dynamic picture outputted from the image pickup section 110 (step S902). If the acquired one frame is the top frame (step S902), then characteristic points are extracted from the entire images corresponding to the top frame (step S903). For example, a plurality of corner points of the images are extracted as seen in (b) of FIG. 5. Then, affine transformation parameters of a unit matrix are selected as affine transformation parameters (step S904), where after the processing advances to step S914.

On the other hand, if the acquired one frame is not the top frame (step S902), then characteristic points are extracted from a region picked up newly with reference to an image corresponding to the immediately preceding frame (step S905). In particular, since characteristic points extracted already from the images corresponding to the immediately preceding frames can be determined from the optical flows corresponding to the characteristic points, they are not extracted from the images corresponding to the current frame.

Then, optical flows regarding the characteristic points extracted from the images corresponding to the immediately preceding frame are calculated (step S906). In particular, optical flows regarding the corner points are calculated as seen in (b) of FIG. 5.

Thereafter, the variable i is initialized to "1" (step S907). Then, M characteristic points are selected from among the characteristic points with regard to which the optical flows are detected (step S908). For example, where affine transformation parameters are used as camera work parameters, three characteristic points are selected at random. On the other hand, if projection transformation parameters are used as camera work parameters, four characteristic points are selected at random. Then, affine transformation parameters are calculated based on the M optical flows calculated corresponding to the selected M characteristic points (step S909).

Then, the score of the affine transformation parameters is calculated based on the affine transformation parameters determined by the calculation (step S910). In particular, the affine transformation parameters determined by the calculation are used to determine the position of the destination of movement of all characteristic points in the images corresponding to the immediately preceding frame. Then, the positions of the characteristic points determined using the affine transformation parameters and the positions of the characteristic points of the images corresponding to the current frame determined upon the calculation of the optical flows at step S906 are compared with each other to calculate the difference value between the positions of each two corresponding characteristic points for each characteristic point. As the difference value, for example, the absolute distance between each two corresponding positions is calculated. Then, the calculated difference values and a threshold value set in advance are compared with each other for each characteristic point, and the number of those characteristic points whose difference value is lower than the threshold value is determined as a score of the affine transformation parameters.

Then, "1" is added to the variable i (step S911), and it is decided whether or not the variable i is higher than a constant N (step S912). If the variable i is lower than the constant N (step S912), then the processing returns to step S908 to repeat the score calculation process of affine transformation parameters (steps S908 to S910). For example, 20 can be used as the constant N.

On the other hand, if the variable i is higher than the constant N (step S912), then those affine transformation parameters whose score has the highest value from among the determined scores of the affine transformation parameters are selected as representative affine transformation parameters (step S913). Then, the affine transformation parameters of an inverse matrix to the matrix of the selected representative affine transformation parameters are recorded in an associated relationship with the current frame into the metadata storage section 210 (step S914). It is to be noted that, if the current frame is the top frame, the affine transformation parameters of the selected unit matrix are recorded in an associated relationship with the top frame into the metadata storage section 210. Then, the images corresponding to the current frame and the characteristic points of the images are stored by overwriting (step S915).

Then, it is decided whether or not the current frame is the last frame of the dynamic picture outputted from the image pickup section 110 (step S916). If the current frame is not the last frame, (step S916), then the processing returns to step S901 to repeat the affine transformation parameter detection process (steps S901 to S915). On the other hand, if the current frame is the last frame (step S916), then the affine transformation parameter detection process is ended.

While, in the description of the embodiment of the present invention, an example wherein affine transformation parameters are detected based on optical flows detected from images which form a dynamic picture is described as detection of camera work parameters, a sensor such as an acceleration sensor or a gyro sensor, or the zoom button 161 which is used when a zooming operation is to be carried out may be used such that the amount of movement of the image pickup apparatus 100 upon image pickup is detected and camera work parameters are determined based on the amount of movement of the image pickup apparatus 100. Further, camera work parameters may be determined based on motion vectors determined for camera shake correction. Furthermore, camera work parameters may be determined based on combined information of information detected by a sensing device such as an acceleration sensor or a gyro sensor and motion vectors determined for camera shake correction. It is to be noted that, the amount of movement of the image pickup apparatus 100 detected upon image pickup can be used to decide whether or not camera work parameters determined by the camera work parameter calculation unit 123 are correct. Further, the camera work parameter calculation unit 123 may detect a plurality of camera work parameters such that one of the plural camera work parameters is used based on the amount of movement of the image pickup apparatus 100 detected upon image pickup.

Now, a case wherein affine transformation parameters calculated by the camera work detection section 120 are used to synthesize images which form a dynamic picture is described in detail with reference to the drawings. It is to be noted that the images shown in FIGS. 8 to 16 are simplified for description and the amount of movement between two successive frames is illustrated in an exaggerated manner.

First, a case wherein, upon image pickup of the image pickup apparatus 100, although the magnification is not varied, the direction of the lens of the image pickup apparatus 100 is moved in one of the upward, downward, leftward and rightward directions from the center provided by the position of the image pickup apparatus 100 is described.

FIG. 8 is views illustrating an example of transition of a dynamic picture picked up by the image pickup apparatus 100. FIG. 8 is views showing images 401 to 403 corresponding to successive frames included in a dynamic picture where an image of a person 400 is picked up on the background of mountains. In this example, a case is illustrated wherein the image pickup person carries out image pickup while the direction of the lens of the image pickup apparatus 100 is moved rightwardly and upwardly. In this instance, the person 400 included in the dynamic picture picked up by the image pickup apparatus 100 moves from the right side to the left side and moves to the lower side on the images which form the dynamic picture.

Figure 9:
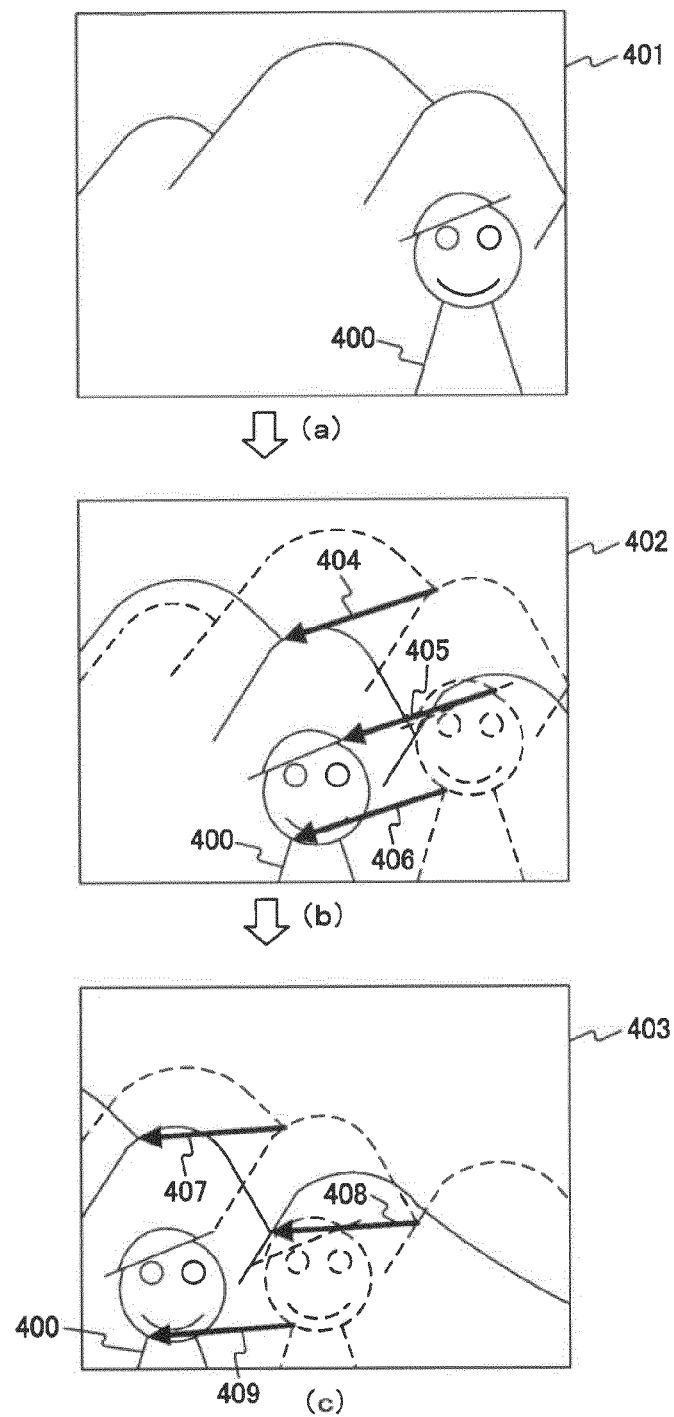
FIG. 9 is views showing images corresponding to immediately preceding frames regarding the images shown in FIG. 8 in broken lines and illustrating an optical flow detected.

FIG. 9 is views wherein, in the images shown in FIG. 8, an image corresponding to an immediately preceding frame is indicated by broken lines and which illustrates an example of optical flows detected. An image 401 shown in (a) of FIG. 9 is the same as the image 401 shown in (a) of FIG. 8. Meanwhile, solid line portions of an image 402 shown in (b) of FIG. 9 are the same as those of the image 402 shown in (b) of FIG. 8, and broken line portions of the image 402 shown in (b) of FIG. 9 are the same as the solid line portions of the image 401 shown in (a) of FIG. 9. Further, arrow marks 404 to 406 on the image 402 shown in (b) of FIG. 9 illustrate an example of optical flows detected from the image 402. Similarly, solid line portions of an image 403 shown in (c) of FIG. 9 are the same as the solid line portions of the image 403 shown in (c) of FIG. 8, and broken line portions of the image 403 shown in (c) of FIG. 9 are the same as the solid line portions of the image 402 shown in (b) of FIG. 9. Further, arrow marks 407 to 409 on the image 403 shown in (c) of FIG. 9 illustrate an example of optical flows detected from the image 403.

As shown in (b) and (c) of FIG. 9, the person 400 and the mountains of the background included in the image move in conformity with the movement of the image pickup apparatus 100. Based on optical flows detected from the movement, affine transformation parameters can be determined for each frame.

Figure 10:
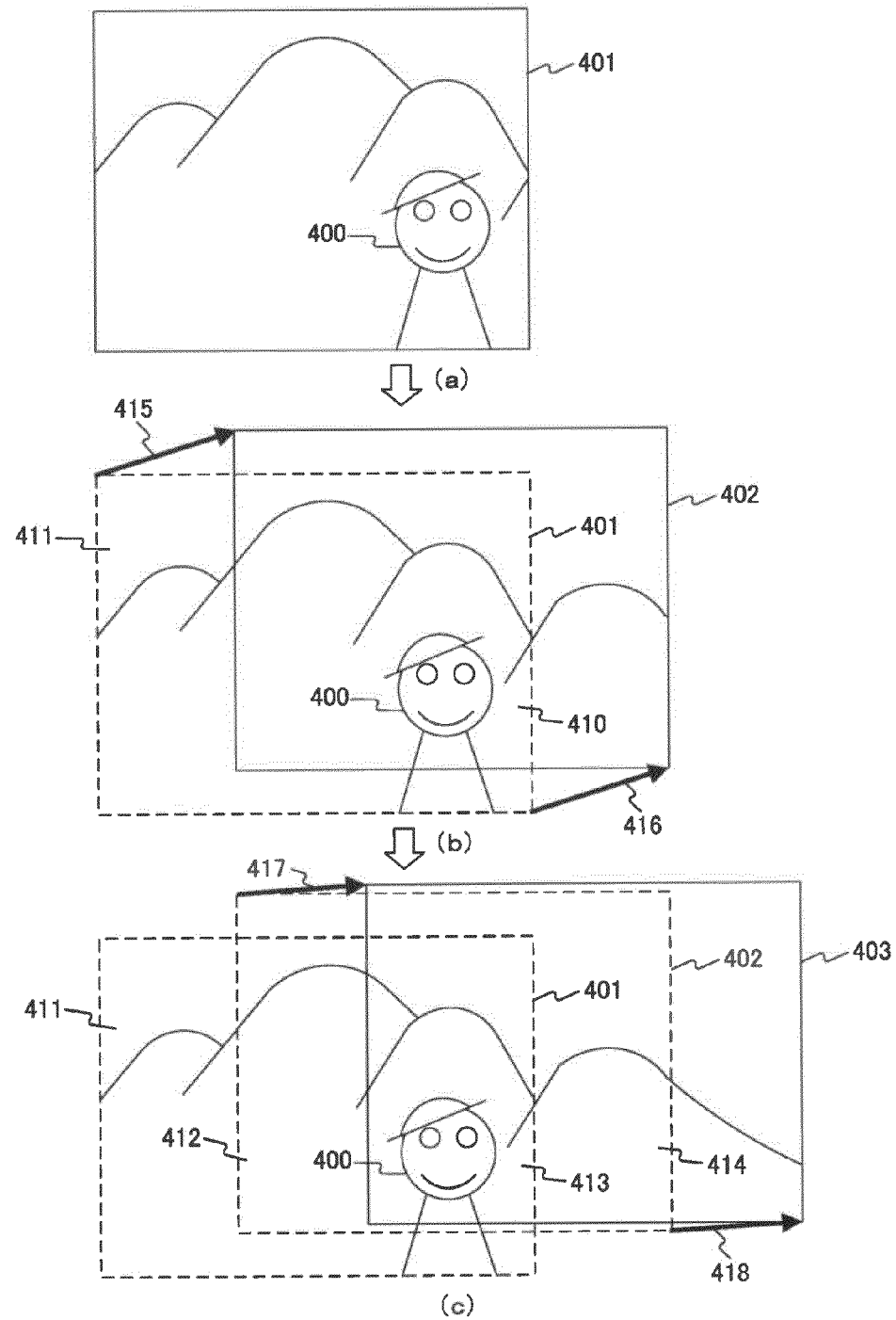
FIG. 10 is views illustrating an example of display images in a case wherein a dynamic picture including images 401 to 403 shown in FIG. 8 is reproduced.

FIG. 10 is views illustrating an example of image synthesis where dynamic pictures including the images 401 to 403 shown in FIG. 8 are reproduced while synthesized. It is to be noted that, since, in the embodiment of the present invention, images which form two dynamic pictures are synthesized, as the reproduction time goes by, the image displayed on the display section 250 becomes greater than an ordinary image. Therefore, the image displayed first is displayed in a small size in comparison with the size of the display region of the display section 250. It is to be noted that the size, position and so forth of the image to be displayed first may be designated by the user.

As shown in (a) of FIG. 10, only the image 401 corresponding to the first frame is displayed first. Here, where the matrix (matrix of 3 rows×3 columns) of affine transformation parameters corresponding to the image 401 is represented by A1, the value of A1 is determined, and the image 401 is affine transformed with the determined matrix of A1 with reference to the position and the magnitude of the image 401 of the top frame. Here, since A is a unit matrix, the position and the magnitude of the image 401 are not transformed. Then, where an image 402 corresponding to the next frame is to be displayed, the image 402 is affine transformed using affine transformation parameters associated with this frame. In particular, where the matrix of affine transformation parameters corresponding to the image 402 is represented by A2 and the matrix of the affine transformation parameters corresponding to the image 401 is represented by A1, the value of A1×A2 is determined, and the image 402 is affine transformed based on the determined matrix of A1×A2 with reference to the position and the size of the image 401 of the top frame. In the image shown in (b) of FIG. 10, only the position of the image 402 is transformed. Then, the image 402 affine transformed with the affine transformation parameters is overwritten such that it overlaps with the image 401 corresponding to the immediately preceding frame. In particular, in a region 410 which overlaps with the image 402, the image 402 is overwritten. Further, in the region of the image 401 which does not overlap with the image 402, the image of the image 401 is synthesized. In particular, where the image 402 corresponding to the second frame is displayed, an image in which the entire portion of the image 402 and the portion of the image 401 corresponding to a region 411 are synthesized is displayed as shown in (b) of FIG. 10. Further, it is possible to cause an image framework representing that the image therein is the latest image from within the displayed image to be displayed around the image corresponding to the current frame. In (b) of FIG. 10, an image framework is displayed on the image 402. Further, affine transformation parameters obtained by affine transformation of the image 402 are stored into the image transformation section 150.

Then, where the image 403 corresponding to the succeeding frame is to be displayed, affine transformation parameters associated with this frame are used to affine transform the image 403. In particular, the image 403 is affine transformed with the affine transformation parameters determined using the matrix of the affine transformation parameters corresponding to the image 403 and the matrix of the affine transformation parameters corresponding to the image 402 used for the immediately preceding affine transformation. In particular, where the matrix of the affine transformation parameters corresponding to the image 403 is represented by A3 and the matrix of the affine transformation parameters corresponding to the image 402 is represented by A2 while the matrix of the affine transformation parameters corresponding to the image 401 is represented by A1, the value of A1×A2×A3 is determined, and the image 403 is affine transformed with the determined matrix of A1×A2×A3 with reference to the position and the size of the image 401 of the top frame. In the image shown in (c) of FIG. 10, only the position of the image 403 is transformed. Then, the image 403 affine transformed with the affine transformation parameters is overwritten in such a manner as to overlap with the synthesized image of the images 401 and 402 corresponding to the preceding frames. In particular, in regions 413 and 414 in the region of the synthesized image of the images 401 and 402 which overlaps with the image 403, the image of the image 403 is overwritten. On the other hand, in the regions 411 and 412 in the region of the synthesized image of the images 401 and 402 which does not overlap with the image 403, the synthesized image of the images 401 and 402 is synthesized. In particular, where the image 403 corresponding to the third frame is to be displayed, an image wherein the entire portion of the image 403, the portion of the image 401 corresponding to the region 411 and the portion of the image 402 which corresponds to the region 412 are synthesized is displayed as shown in (c) of FIG. 10. Further, where an image framework representing that the image therein is the latest image in the displayed images is to be displayed around the image corresponding to the current frame, the image framework is displayed on the image 403 shown in (c) of FIG. 10. Further, the affine transformation parameters obtained by the affine transformation of the image 403 are stored into the image transformation section 150. In other words, the affine transformation parameters determined by multiplication of the matrices of the affine transformation parameters corresponding to the images 402 and 403 are stored into the image transformation section 150. In the manner, when an image corresponding to a current frame is to be affine transformed, it is affine transformed with the affine transformation parameters determined using the matrix of the affine transformation parameters corresponding to the current frame and the matrices of the affine transformation parameters corresponding to the frames up to the immediately preceding frame. The affine transformation parameters determined upon this affine transformation are stored into the image transformation section 150 and used for next affine transformation. This similarly applies also to the cases of FIGS. 13 and 16.

Now, a case wherein the magnification is varied upon image pickup of the image pickup apparatus 100 although the direction of the lens of the image pickup apparatus 100 is not moved is described.

FIG. 11 is views illustrating an example of transition of dynamic pictures picked up by the image pickup apparatus 100. FIG. 11 is views showing images 421 to 423 corresponding to successive frames included in the dynamic picture where an image of a person 420 is picked up on the background of mountains. In the present example, a case wherein the image pickup person carries out image pickup while successively raising the magnification of the lens of the image pickup apparatus 100 is described. In this instance, the person 420 included in the dynamic picture picked up by the image pickup apparatus 100 gradually becomes larger in the images which form the dynamic picture. It is to be noted that, although the position of the image pickup apparatus 100 sometimes moves a little when the magnification is raised, in the present example, description is given without taking the movement of the position of the image pickup apparatus 100 into consideration.

FIG. 12 is views wherein an image corresponding to an immediately preceding frame in the images shown in FIG. 11 is indicated by broken lines and an example of optical flows detected is shown. An image 421 shown in (a) of FIG. 12 is the same as the image 421 shown in (a) of FIG. 11. Meanwhile, solid line portions of an image 422 shown in (b) of FIG. 12 are the same as those of the image 422 shown in (b) of FIG. 11 while broken line portions of the image 422 shown in (b) of FIG. 12 are the same as the solid line portions of the image 421 shown in (a) of FIG. 11. Further, arrow marks 424 to 426 on the image 422 shown in (b) of FIG. 12 indicate an example of optical flows detected from the image 422. Similarly, solid line portions of an image 423 shown in (c) of FIG. 12 are the same as those of the image 423 shown in (c) of FIG. 11 while broken line portions of the image 423 shown in (c) of FIG. 12 are the same as the solid line portions of the image 422 shown in (b) of FIG. 11. Further, arrow marks 427 to 429 on the image 423 shown in (c) of FIG. 12 indicate an example of optical flows detected from the image 423.

As shown in (b) and (c) of FIG. 12, the size of the person 420 and the mountains of the background included in the image varies in accordance with the variation of the magnification. Affine transformation parameters can be determined for each frame based on optical flows detected by the variation.

Figure 13:
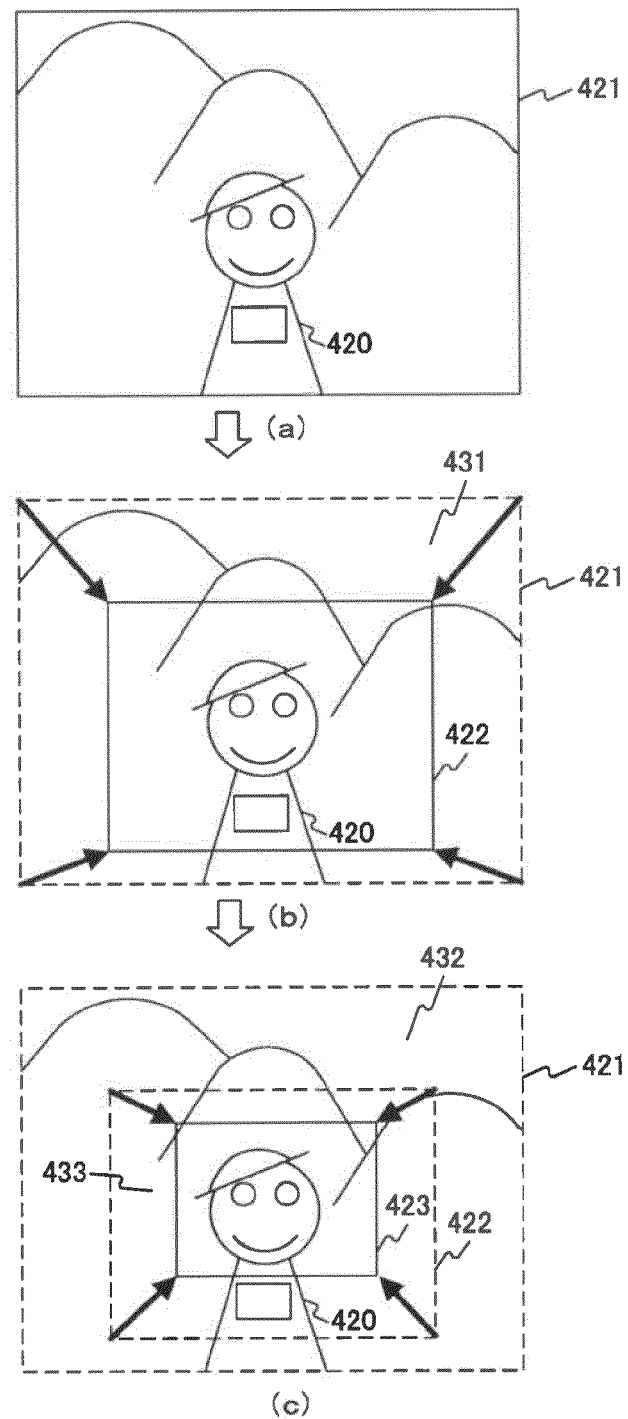
FIG. 13 is views illustrating an example of display images in a case wherein a dynamic picture including images 421 to 423 shown in FIG. 11 is reproduced.

FIG. 13 is views illustrating an example of display in a case wherein the dynamic picture including the images 421 to 423 shown in FIG. 11 is reproduced.

As shown in (a) of FIG. 13, only the image 421 corresponding to the top frame is displayed first. Then, where the image 422 corresponding to the succeeding frame is to be displayed, the image 422 is affine transformed using affine transformation parameters associated with this frame. In the case of the image shown in (b) of FIG. 13, only the size of the image 422 is transformed. Then, the image 422 affine transformed with the affine transformation parameters is overwritten in such a manner as to overlap with the image 421 corresponding to the immediately preceding frame. In particular, in a region in the region of the image 421 which overlaps with the image 422, the image of the image 422 is overwritten. In this instance, since the image 421 overlaps with the overall region of the image 422, the entire image 422 is overwritten on the image 421. On the other hand, a region 431 in the region of the image 421 which does not overlap with the image 422, the image of the image 421 is synthesized. In particular, when the image 422 corresponding to the second frame is to be displayed, an image wherein the entire portion of the image 422 and the portion of the image 421 which corresponds to the region 431 are synthesized is displayed as shown in (b) of FIG. 13. Further, an image framework indicating that the image therein is the latest image from within the display images can be displayed around the image corresponding to the current frame. In (b) of FIG. 13, the image framework is displayed on the image 422. Further, the affine transformation parameters obtained by affine transformation of the image 422 are stored into the image transformation section 150.

Thereafter, where the image 423 corresponding to the next frame is to be displayed, the image 423 is affine transformed using the affine transformation parameters associated with this frame. In particular, the image 423 is affine transformed with affine transformation parameters determined by multiplication of the matrix of the affine transformation parameters corresponding to the image 423 and the matrix of the affine transformation parameters corresponding to the image 422 used for the immediately preceding affine transformation. In the image shown in (c) of FIG. 13, only the size of the image 423 is transformed. Then, the affine transformed image 423 is overwritten so as to overlap with the synthesized image of the images 421 and 422 corresponding to the preceding frames. In particular, in a region in the region of the synthesized image of the images 421 and 422 which overlaps with the image 423, the image of the image 423 is overwritten. In this instance, since the image 423 overlaps with the entire region of the images 421 and 422, the entire image of the image 423 is overwritten on the synthesized image of the images 421 and 422. On the other hand, in regions 432 and 433 in the region of the synthesized image of the images 421 and 422 which do not overlap with the image 423, the synthesized image of the images 421 and 422 is synthesized. In particular, where the image 423 corresponding to the third frame is to be displayed, an image wherein the entire portion of the image 423, the portion of the image 421 which corresponds to the region 432 and the portion of the image 422 which corresponds to the region 433 are synthesized is displayed as shown in (c) of FIG. 13. On the other hand, where an image framework representing that the image therein is the latest image from among the displayed images is to be displayed around the image corresponding to the current frame, the image framework is displayed on the image 423 shown in (c) of FIG. 13. Further, the affine transformation parameters used in the affine transformation of the image 423 are stored into the image transformation section 150. In other words, the affine transformation parameters determined using the affine transformation parameters corresponding to the images 422 and 423 are stored into the image transformation section 150.

Now, a case wherein, upon image pickup of the image pickup apparatus 100, the image pickup apparatus 100 is rotated around the image pickup direction although the direction or the magnification of the lens of the image pickup apparatus 100 is not varied is described.

FIG. 14 is views illustrating an example of transition of dynamic pictures picked up by the image pickup apparatus 100. FIG. 14 is views showing images 441 to 443 corresponding to successive frames included in the dynamic pictures where an image of a person 440 is picked up on the background of mountains. In this example, a case wherein the image pickup person carries out image pickup while rotating the image pickup apparatus 100 around the image pickup direction is illustrated. In this instance, the person 440 included in the dynamic pictures picked up by the image pickup apparatus 100 successively rotates on the images which form the dynamic pictures. It is to be noted that, although the position of the image pickup apparatus 100 sometimes moves a little by the rotation of the image pickup apparatus 100, this example is described without taking the movement of the position of the image pickup apparatus 100 into consideration.

FIG. 15 is views wherein an image corresponding to an immediately preceding frame in the images shown in FIG. 14 is indicated by broken lines and an example of optical flows detected is illustrated. An image 441 shown in (a) of FIG. 15 is the same as the image 441 shown in (a) of FIG. 14. Meanwhile, solid line portions of an image 442 shown in (b) of FIG. 15 are the same as those of the image 442 shown in (b) of FIG. 14 while broken line portions of the image 442 shown in (b) of FIG. 15 are the same as the solid line portions of the image 441 shown in (a) of FIG. 14. Further, arrow marks 444 to 446 on the image 442 shown in (b) of FIG. 15 indicate an example of optical flows detected from the image 442. Similarly, solid line portions of an image 443 shown in (c) of FIG. 15 are the same as those of the image 443 shown in (c) of FIG. 14 while broken line portions of the image 443 shown in (c) of FIG. 15 are the same as the solid line portions of the image 442 shown in (b) of FIG. 14. Further, arrow marks 447 to 449 on the image 443 shown in (c) of FIG. 15 indicate an example of optical flows detected from the image 443.

As shown in (b) and (c) of FIG. 15, the person 440 and the mountains of the background included in the images rotationally move in conformity with the rotation of the image pickup apparatus 100. Affine transformation parameters can be determined for each frame based on optical flows detected by the rotational movement.

Figure 16:
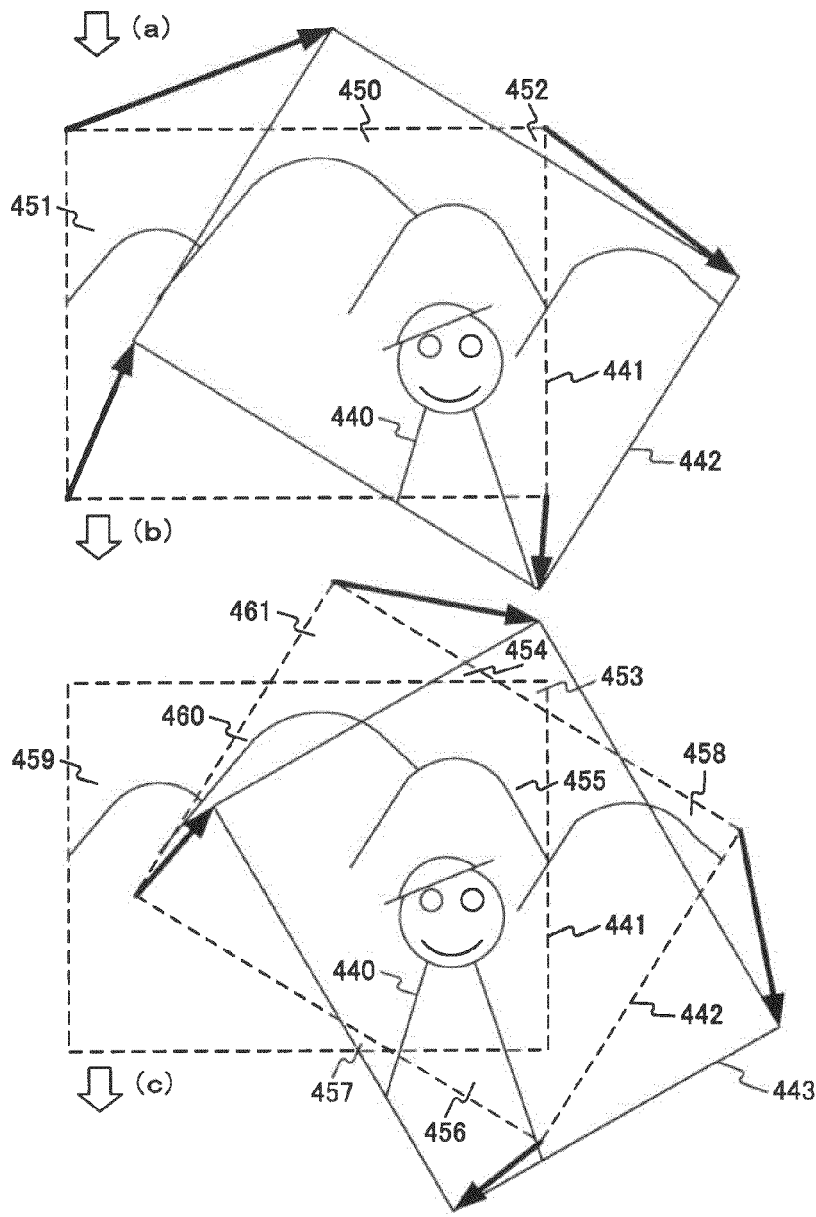
FIG. 16 is views illustrating an example of display images in a case wherein a dynamic picture including images 441 to 443 shown in FIG. 14 is reproduced.

FIG. 16 is views showing an example of display in a case wherein dynamic pictures including the images 441 to 443 shown in FIG. 14 are reproduced.

As shown in (a) of FIG. 16, only an image 441 corresponding to the top frame is displayed first. Then, where an image 442 corresponding to the next frame is to be displayed, the image 442 is affine transformed using affine transformation parameters associated with this frame. In the image shown in (b) of FIG. 16, only the angle of the image 442 is transformed. Then, the image 442 affine transformed with the affine transformation parameters is overwritten so as to overlap with the image 441 corresponding to the immediately preceding frame. In particular, in a region 450 in the region of the image 441 which overlaps with the image 442, the image of the image 442 is overwritten. Meanwhile, in regions 451 and 452 in the region of the image 441 which do not overlap with the image 442, the image of the image 441 is synthesized. In particular, where the image 442 corresponding to the second frame is to be displayed, as shown in (b) of FIG. 16, an image wherein the entire portion of the image 442 and portions of the image 441 which correspond to the regions 451 and 452 are synthesized is displayed. Further, it is possible to display an image framework, which represents that the image therein is the latest image from among the displayed images, around the image corresponding to the current frame. In (b) of FIG. 16, the image framework is displayed on the image 442. Further, the affine transformation parameters obtained by the affine transformation of the image 442 are stored into the image transformation section 150.

Then, where an image 443 corresponding to the next frame is to be displayed, the image 443 is affine transformed using the affine transformation parameters associated with this frame. In other words, the image 443 is affine transformed using the matrix of the affine transformation parameters corresponding to the image 443 and the matrix of the affine transformation parameters corresponding to the image 442 used in the immediately preceding affine transformation. In the image shown in (c) of FIG. 16, only the angle of the image 443 is transformed. Then, the affine transformed image 443 is overwritten so as to overlap with the synthesized image of the images 441 and 442 corresponding to the preceding frames. In particular, in regions 453 to 457 in the region of the synthesized image of the images 441 and 442 which overlap with the image 443, the image of the image 443 is overwritten. On the other hand, in regions 458 to 461 in the region of the synthesized image of the images 441 and 442 which do not overlap with the image 443, the synthesized image of the images 441 and 442 is further synthesized. In particular, where the image 443 corresponding to the third frame is to be displayed, an image wherein the entire portion of the image 443, the portion of the image 441 which corresponds to the region 459 and portions of the image 442 which correspond to the regions 458 and 460 is displayed as shown in (c) of FIG. 16 is displayed. On the other hand, where an image framework representing that the image therein is the latest image from among the displayed images is to be displayed around the image corresponding to the current frame, the image framework is displayed on the image 443 shown in (c) of FIG. 16. Further, the affine transformation parameters used in the affine transformation of the image 443 are stored into the image transformation section 150. In other words, the affine transformation parameters determined using the affine transformation parameters corresponding to the images 442 and 443 are stored into the image transformation section 150.

Now, a method of extracting a synthesized image to be displayed on the display section 250 is described in detail with reference to the drawings.

Figure 17:
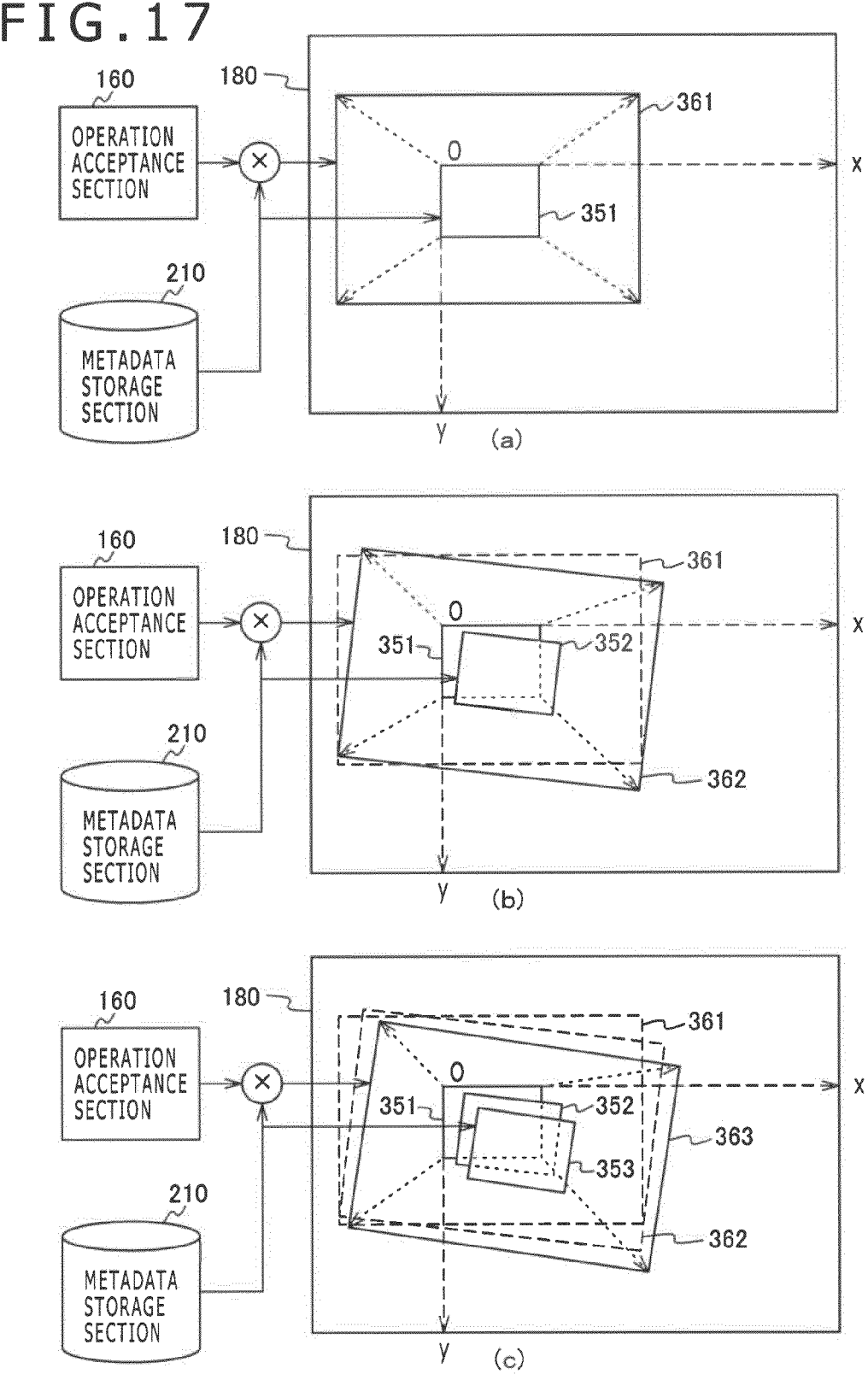
FIG. 17 is views schematically illustrating a relationship between frames of a dynamic picture file stored in the dynamic picture storage section 200 in the embodiment of the present invention and display regions.

FIG. 17 is views schematically illustrating a relationship between frames of dynamic image files stored in the dynamic picture storage section 200 in the embodiment of the present invention and the display region. Here, only the image memory 180, metadata storage section 210, and operation acceptance section 160 are displayed, but illustration of the components other than them is omitted. Further, description is given taking a case wherein a synthesized image is produced in the image memory 180 using the affine transformation parameters 216 stored in the metadata file 211 in regard to the frames "1" to "3" which form the dynamic picture file 201 shown in (b) of FIG. 4 as an example.

(a) of FIG. 17 illustrates a case wherein a frame 1 (205) which is the first frame from among frames which form the dynamic picture file 201 illustrated in (b) of FIG. 4 is stored into the image memory 180. For example, as shown in (a) of FIG. 17, an image 351 corresponding to the frame 1 (205) of the dynamic picture file 201 is stored into the image memory 180. Here, as the position of the image memory 180 into which the image 351 corresponding to the first frame is stored, the position at which the image 351 is to be stored can be determined based on calculation of the size of the synthesized images of the frames "1" to "n" carried out, for example, using the affine transformation parameters 216 regarding the dynamic picture file 201 stored in the metadata file 211. It is to be noted that, in this example, the following description is given assuming that the position of the left top of the image 351 disposed on the image memory 180 is determined as the origin, the horizontal direction (axis of abscissa) is the x axis and the vertical direction (axis of ordinate) is the y axis.

As shown in (a) of FIG. 17, the display region where the image 351 is disposed on the image memory 180 is determined as a display region 361. The display region 361 is determined in response to the value of a display magnification accepted by the operation acceptance section 160 based on the position and the size at and with which the image 351 is stored. For example, upon ordinary reproduction, since a display magnification for reproducing only a current image is designated, the display region 361 has a size equal to that of the image 351. On the other hand, for example, where the display magnification of "0.5 times" for zooming out a current image is designated, the display region 361 has a size equal to twice that of the image 351 and is centered at the image 351. It is to be noted that the position of the display region 361 for the image 351 can be determined based on affine transformation parameters. In particular, where the display magnification of "0.5 times" that with which the current image is zoomed out is designated, those affine transformation parameters with which the zoom components in the x direction and the y direction are doubled are used to set the display region. Also in regard to a case wherein the display region is moved in parallel or is rotated with respect to the current image, the position and the range of the display region can be determined using affine transformation parameters. It is to be noted that, in this example, although the display region is transformed together with the transformation of a current image, since affine transformation parameters corresponding to the frame 1 (205) are parameters of a unit matrix, the display region 361 corresponding to the frame 1 (205) is determined with only the display magnification destination from the operation acceptance section 160 taken into consideration.

(b) of FIG. 17 illustrates a case wherein the frame (206) from among the frames which form the dynamic picture file 201 illustrated in (b) of FIG. 4 is stored into the image memory 180. In this instance, an image 352 corresponding to the frame 2 (206) is transformed in an associated relationship with "1" and "2" of the frame number 215 using the affine transformation parameter 216 stored in the metadata file 211 and is synthesized by overwriting with the image 351 as described hereinabove, and affine transformation is carried out also with regard to the display region. In particular, the image 352 corresponding to the frame 2 (206) is transformed using the affine transformation parameters 216 stored in the metadata file 211 in an associated relationship with "1" and "2" of the frame number 215 with reference to the position and the size of the image 351. Then, the position and the size of the image 352 are transformed using affine transformation parameters determined in response to the value of the display magnification accepted by the operation acceptance section 160, and a region determined based on the position and the size after the transformation makes a display region 362. In particular, where the matrices of affine transformation parameters corresponding to "1" and "2" of the frame number 215 are represented by A1 and A2 and the matrix of affine transformation parameters determined in response to the value of the display magnification accepted by the operation acceptance section 160 is represented by B (for example, a matrix with reference to a current image), the value of A1×A2×B is determined, and the display region 362 is determined by the determined matrix of A1×A2×B with reference to the position and the size of the image 351.

(c) of FIG. 17 illustrates a case wherein the frame 3 from among the frames which form the dynamic picture file 201 shown in (b) of FIG. 4 is stored into the image memory 180. Also in this case, an image 353 corresponding to the frame 3 is transformed using the affine transformation parameters 216 stored in the metadata file 211 in an associated relationship with "1" to "3" of the frame number 215 and is synthesized by overwriting with the images 351 and 352 as described hereinabove, and also with regard to the display region, affine transformation is carried out to determine a display region 363 for the image 353. In particular, where the matrices of affine transformation parameters corresponding to "1" to "3" of the frame number 215 are represented by A1 to A3, respectively, and the matrix of affine transformation parameters determined in response to the value of the display magnification accepted by the operation acceptance section 160 is represented by B, the value of A1×A2×A3×B is determined, and the display region 363 is determined by the matrix of A1×A2×A3'B determined with reference to the position and the size of the image 351.

FIG. 18 is views schematically illustrating images stored in the image memory 180 and images displayed on the liquid crystal panel 251 where a dynamic picture is displayed with the display magnification thereof changed. (a) of FIG. 18 illustrates a case wherein only a current image of the liquid crystal panel 251 is displayed, and (b) of FIG. 18 illustrates a case wherein a dynamic image to be displayed on the liquid crystal panel 251 is reduced in the scale (zoomed out) while (c) of FIG. 18 illustrates a case wherein a dynamic image to be displayed on the liquid crystal panel 251 is increased in the scale (zoomed in). In this instance, a case wherein a fish is included in the object of the current image is illustrated.

First, when an instruction to reproduce a dynamic picture is issued, a current image 491 and a display region 492 are set equal to each other as shown in (a) of FIG. 18, and a synthesized image included in the range of the display region 492 is extracted from the image memory 180 and displayed on the liquid crystal panel 251. In other words, only a current image is successively displayed on the liquid crystal panel 251.

On the other hand, in a state wherein the W button is depressed upon dynamic picture reproduction, a display region 493 on the image memory 180 is expanded in response to the depression time period of the W button as shown in (b) of FIG. 18, and synthesized images included in the display region 493 are successively displayed on the liquid crystal panel 251. Meanwhile, in a state wherein the T button is depressed upon dynamic picture reproduction, a display region 495 on the image memory 180 is reduced in response to the depression time period of the T button, and a synthesized image included in the display region 495 is successively displayed on the liquid crystal panel 251. It is to be noted that such expansion and reduction processes are carried out by the display region extraction section 190 such that the current image 491 is positioned at the center. In particular, the position and the size of the current image 491 are transformed using affine transformation parameters determined in response to the value of the display magnification accepted by the operation acceptance section 160 described hereinabove, and the display region is determined based on the position and the size after the transformation. In the example of (b) of FIG. 18, since an operation input to lower the display magnification, a zoom component of affine transformation parameters is determined in response to the reduction of the display magnification, while, in the example of (c) of FIG. 18, since an operation input to raise the display magnification is carried out, a zoom component of affine transformation parameters is determined in response to the increase of the display magnification. In this manner, an image or images including a current image can be displayed in an enlarged or reduced scale only by changing the size of the display region. It is to be noted that it is possible to move the display region upwardly, downwardly, leftwardly or rightwardly by an operation of the cross button 162.

As described above, by displaying an image existing in a range of a display region disposed on the image memory 180, synthesized images during reproduction can be successively displayed. Here, when a current image is affine transformed and synthesized into the image memory 180, conversion of the picture quality such as a resolution conversion process, a compression process and so forth for conversion into a lower resolution is sometimes carried out. Therefore, where the display magnification is to be raised to display the current image in an enlarged scale, the synthesized image including the current image may possibly become blur. Therefore, in the embodiment of the present invention, with regard to the current image being currently reproduced, an image before synthesized into the image memory 180 is used to display a synthesized image. In the following, this displaying method is described in detail with reference to the drawings.

Figure 19:
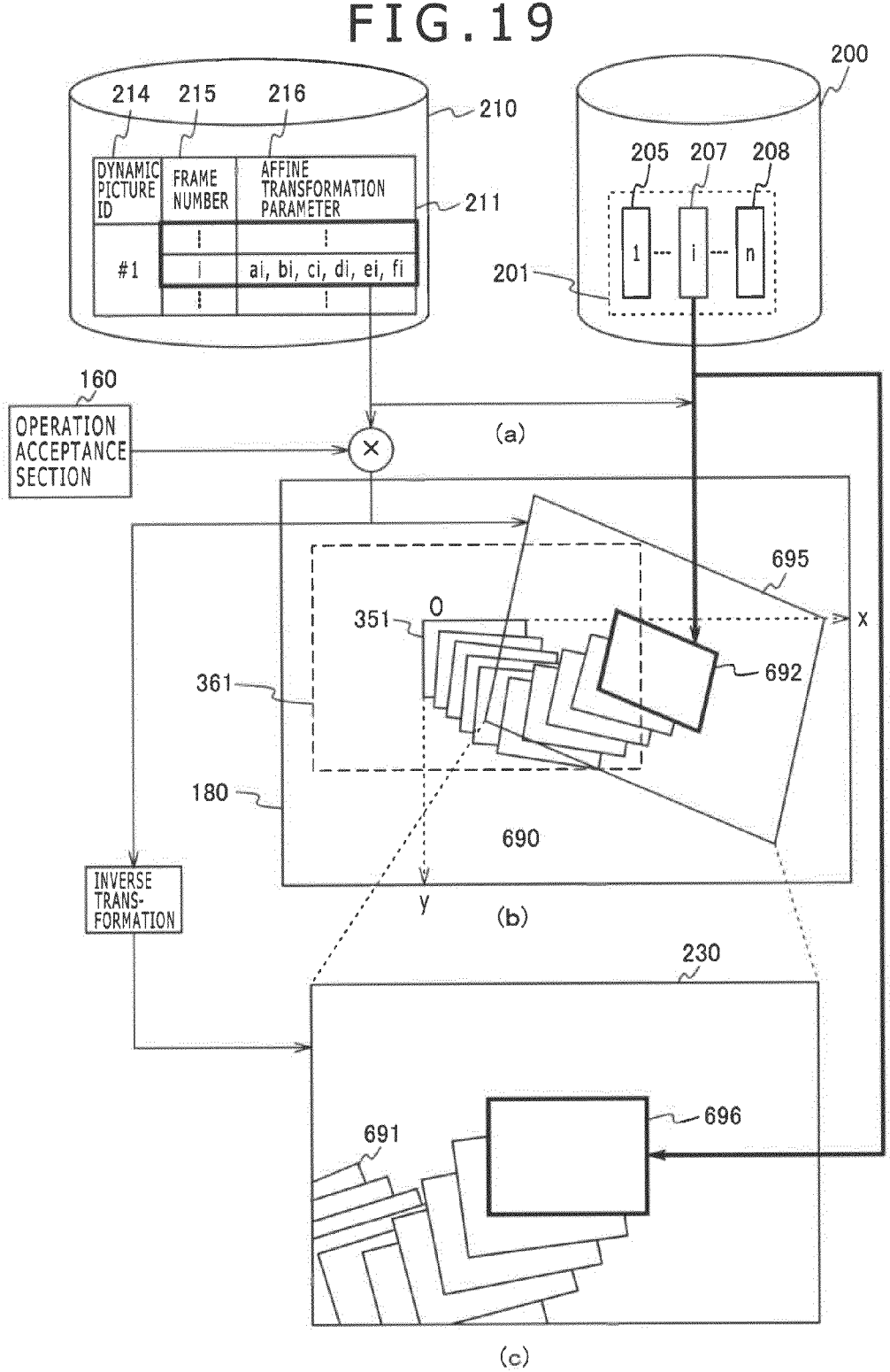
FIG. 19 is views schematically illustrating a flow of frames of the dynamic picture file stored in the dynamic picture storage section 200 in the embodiment of the present invention.

FIG. 19 is a view schematically illustrating a flow of frames of a dynamic picture file stored in the dynamic picture storage section 200 in the embodiment of the present invention. Here, only a relationship of the operation acceptance section 160, dynamic picture storage section 200, metadata storage section 210, image memory 180 and display memory 230 is illustrated while illustration of the other configuration is omitted.

(a) of FIG. 19 shows the dynamic picture file 201 and the metadata file 211 shown in (b) of FIG. 4 in a simplified form. In the following, an example wherein images corresponding to a frame i (207) which forms the dynamic picture file 201 is displayed is described. In other words, it is assumed that, with regard to the images which correspond to the frames 1 to "i−1" which form the dynamic picture file 201, a synthesized image is produced already.

(b) of FIG. 19 schematically shows the image memory 180 in which a synthesized image in which the images corresponding to the frames which form the dynamic picture file 201 are synthesized is stored. As shown in (b) of FIG. 17, an image 351 corresponding to a frame 1 (205) which forms the dynamic picture file 201 is first stored into the image memory 180. It is to be noted that the image 361 shown in (a) of FIG. 17 is indicated by broken lines. Then, after the image 351 is stored into the image memory 180, the images corresponding to the frames 2 to "i−1" which form the dynamic picture file 201 are successively affine transformed using the values of the affine transformation parameter 216 stored in the metadata file 211 in an associated relationship with the frames 2 to "i−1," and the affine transformed images are successively stored by overwriting into the image memory 180. Here, the size of the display region is determined in response to an operation input (depression of the W button or the T button) for display magnification destination from the operation acceptance section 160 and is calculated by affine transformation in response to the current image. Then, an image existing in the calculated display region is extracted for each frame from the synthesized images stored in the image memory 180 by the display region extraction section 190.

In the state wherein the synthesized image of the images corresponding to the frames 1 to "i−1" is stored in the image memory 180, the image corresponding to the frame i (207) which forms the dynamic picture file 201 is affine transformed using the affine transformation parameters 216 stored in the metadata file 211 in an associated relationship with the frames 1 to i, and an affine transformed current image 692 is stored by overwriting into the image memory 180. In particular, an image corresponding to the frame i (207) is transformed into the image 692 using the affine transformation parameters 216 stored in the metadata file 211 in an associated relationship with "1" to "i" of the frame number 215 with reference to the image 351 which is a current image, and the image 692 is stored into the image memory 180. Then, as regards a display region 695 which corresponds to the frame i (207), the position and the size of the image 692 are transformed using affine transformation parameters determined in response to the value of the display magnification accepted by the operation acceptance section 160. This determination of the display region is carried out by the display region extraction section 190. Then, images existing in the display region 695 are extracted from the synthesized image stored in the image memory 180 by the display region extraction section 190, and the extracted images are stored, for example, into the display memory 230 as illustrated in (c) of FIG. 19.

(c) of FIG. 19 schematically illustrates the display memory 230 in which the images extracted by the display region extraction section 190 are stored. Here, the images (images other than the current image 696) stored in the display memory 230 are images transformed from an image extracted by the display region extraction section 190 (image existing in the range of the display region 695) using an inverse matrix to a matrix according to the affine transformation parameters used for the transformation of the display region 695. In particular, the shape of the display region disposed on the image memory 180 sometimes has a shape of a parallelogram as a result of affine transformation or the like. In order to cause the synthesized image in the affine transformed display region to be displayed on the display section 250, the synthesized image in the display region is transformed using an inverse matrix to a matrix according to affine transformation parameters used upon affine transformation of the current image at present. For example, where matrices of affine parameters stored in the metadata file 211 in an associated relationship with "1" to "i" of the frame number 215 are represented by A1, . . . , Ai and a matrix of affine transformation parameters for determination of the display region 695 (for example, a matrix with reference to the current image) is represented by B, Inv(A1× . . . ×Ai×B) is used as a matrix for transforming the synthesized image in the display region. Consequently, for example, as shown (c) of FIG. 19, it is possible to transform an image transformed in a parallelogram into a rectangle to be displayed on the display section 250. Further, for the current image 696 corresponding to the current frame from among the images extracted by the display region extraction section 190, an image in a non-affine transformed form acquired from the dynamic picture storage section 200 is used in place of the image extracted from the image memory 180 by the display region extraction section 190. Here, the position and the size to and with which the image 696 is stored in the display memory 230 are determined depending upon the display magnification from the operation acceptance section 160.

As shown in (c) of FIG. 19, the images extracted by the display region extraction section 190 are stored into the display memory 230, and an image acquired from the dynamic picture storage section 200 is stored by overwriting on the images extracted by the display region extraction section 190 into the display memory 230. Consequently, the synthesized image affine transformed once can be displayed after it is returned into a state wherein it is not affine transformed with an inverse matrix. Meanwhile, as regards the current image, a comparatively clean current image can be displayed by using an image in a state before the image is subjected to such processing as reduction and stored into the image memory 180 after affine transformation. Further, also in a case wherein expansion or the like is carried out by an operation of the user, the current image can be displayed in a clean state.

As described above, since, for the current image, an image affine transformed after acquired from the dynamic picture storage section 200 can be used in place of a synthesized image stored in the image memory 180, a comparatively clean image can be viewed. This example of synthesis is described in detail with reference to FIGS. 20 and 21.

(a) of FIG. 20 is a view showing an example of synthesis in a case wherein a dynamic picture picked up by the image pickup apparatus 100 is reproduced. In this example, a synthesized image formed from a dynamic picture where an image of a parent and a child who are playing in an open space of a lawn on which a large building stands is picked up while the image pickup apparatus 100 is moved principally in the leftward and rightward direction is shown as an image 480 in a state wherein the synthesized image is affine transformed with an inverse matrix. Here, in the image 480, an image 481 synthesized from images corresponding to claims which form the dynamic picture is formed in a panorama fashion. Further, an image corresponding to the current frame in the image 480 is a current image 482.

Here, a case wherein an image region surrounded by a framework 483 is displayed in an enlarged scale is described. Where an image displayed on the display section 250 is to be displayed in an enlarged or reduced scale, the user can designate a desired display magnification by operating the zoom button 161. For example, where an image region surrounded by the framework 483 is to be displayed in an enlarged scale where the image 480 is displayed on the display section 250 as shown in (a) of FIG. 20, the image region surrounded by the framework 483 can be displayed in an enlarged scale by the user operating the zoom button 161 to designate a display magnification and operating the cross button 162 to designate a position.

(b) of FIG. 20 is a view showing an image 484 in a state before the current image 482 in the image 480 is affine transformed.

(a) of FIG. 21 is a view showing an image 485 in a case wherein the image region surrounded by the framework 483 shown in (a) of FIG. 20 is displayed in an enlarged scale. The image 485 shown in (a) of FIG. 21 is an image synthesized in the display memory 230 in a state before the current image after affine transformation is stored into the image memory 180. In this manner, in the region of a current image 486, a comparatively definite image in a state before stored into the image memory 180 is displayed in the region of the current image 486. Therefore, where the current image 486 and the region other than this region are compared with each other, the current image 486 which is cleaner than that in the other region can be observed. Meanwhile, an image 487 shown in (b) of FIG. 21 is an image stored in the display memory 230 in a state wherein the current image after affine transformation is stored in the image memory 180. Where the image 487 is displayed in this manner, also in the region of a current image 488, an image of a degree similar to that of an image in the other region is displayed. In particular, with the embodiment of the present invention, when images are synthesized and displayed, although a history image stored in the display memory 230 is sometimes compressed, for an image at present (current image), a non-compressed image or an image of a resolution higher than that of a history image can be used, and therefore, image synthesis display of high picture quality can be implemented. It is to be noted that, in the present example, for explanation, in order to illustrate a state before an image of an object of display is affine transformed with an inverse matrix, although the current image is not rectangular, it is possible to set the current image to a rectangular shape by carrying out affine transformation with the inverse matrix described above.

In the following, operation of the image pickup apparatus 100 according to the embodiment of the present invention is described with reference to the drawings.

Figure 22:
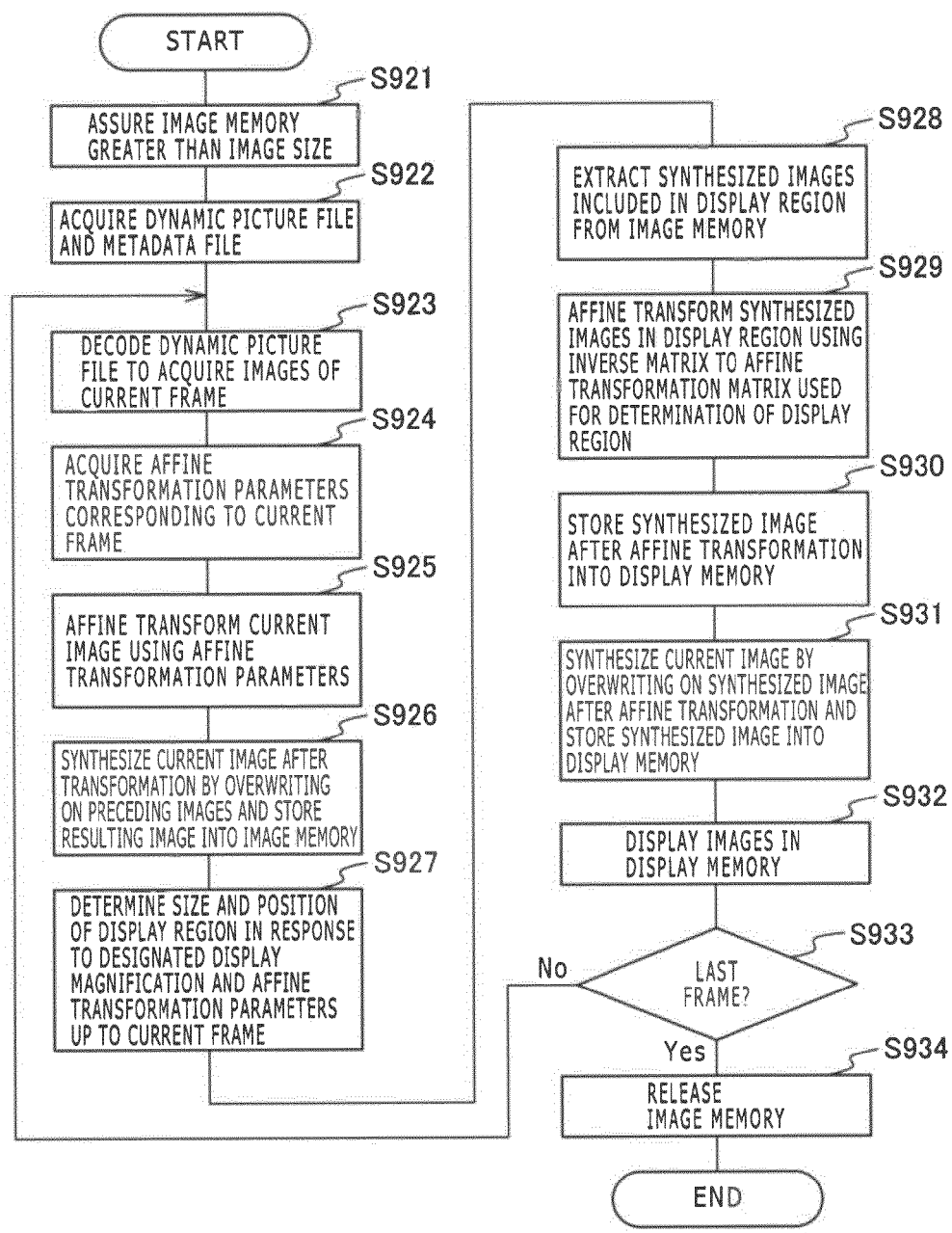
FIG. 22 is a flow chart illustrating a processing procedure of a dynamic picture reproduction process by the image pickup apparatus 100 according to the embodiment of the present invention.

FIG. 22 is a flow chart illustrating a processing procedure of a dynamic picture reproduction process by the image pickup apparatus 100 according to the embodiment of the present invention. This example indicates a case wherein a dynamic picture to be reproduced is selected by the user.

First, a work buffer having a capacity greater than the size of an image which forms a dynamic picture is assured in the image memory 180 (step S921). Then, the file acquisition section 140 acquires a dynamic picture file selected by the operation acceptance section 160 from the dynamic picture storage section 200 and acquires a metadata file associated with the dynamic picture file from the metadata storage section 210 (step S922).

Then, the file acquisition section 140 decodes the dynamic picture file and acquires a current frame which is one frame which forms the dynamic picture file (step S923). Then, the file acquisition section 140 acquires affine transformation parameters corresponding to the acquired current frame from the metadata file (step S924). Here, where the current frame is the top frame, affine transformation parameters of a unit matrix are acquired.

Then, the image transformation section 150 uses the affine transformation parameters to affine transform an image corresponding to the current frame (step S925). It is to be noted that, where the current frame is the top frame, then since it is affine transformed using a unit matrix, an actual image is not transformed.

Then, the image synthesis section 170 synthesizes the image corresponding to the affine transformed current frame by overwriting with synthesized images of images corresponding to frames preceding to the current frame and stores the image in which the image corresponding to the current frame is synthesized into the image memory 180 (step S926).

Thereafter, the display region extraction section 190 uses the affine transformation parameters of the frames from the first frame to the current frame and the affine transformation parameter corresponding to the display magnification to determine the position and the size of the display region (step S927). Then, the display region extraction section 190 extracts synthesized images included in the display region from the image memory 180 (step S928). Then, the display region extraction section 190 affine transforms the synthesized images extracted from the image memory 180 using an inverse matrix to a matrix of the affine transformation parameters used for the determination of the display region (step S929).

Thereafter, the display region extraction section 190 stores the synthesized image extracted from the image memory 180 and affine transformed into the display memory 230 (step S930). Then, the image synthesis section 170 synthesizes the current image by overwriting with the synthesized image stored in the display memory 230 (step S931). Then, the display control section 240 controls the display section 250 to display the synthesized image stored in the display memory 230 (step S932).

Then, it is decided whether or not the current frame is the last frame among the frames which form the selected dynamic picture file (step S933). If the current frame is not the last frame (step S933), then the processing returns to step S923 to repeat the dynamic picture synthesis reproduction process (steps S923 to S932). On the other hand, if the current frame is the last frame (step S933), then the assured work buffer is released (step S934), and the dynamic picture reproduction process is ended.

In the foregoing, an example is described wherein affine transformation is successively applied to a current image corresponding to a current frame to produce synthesized images and successively store the synthesized images into an image memory and then a display region which is a region of an object of display is extracted from the synthesized image of the image memory to reproduce the dynamic picture. Here, a dynamic picture reproduction method wherein affine transformation is applied in a reverse direction to the direction of affine transformation parameters to synthesized images corresponding to preceding frames to reproduce a dynamic picture while a current image corresponding to a current frame is fixed to a central portion or the like of the display section 250 is described in detail with reference to the drawings.

Figure 24:
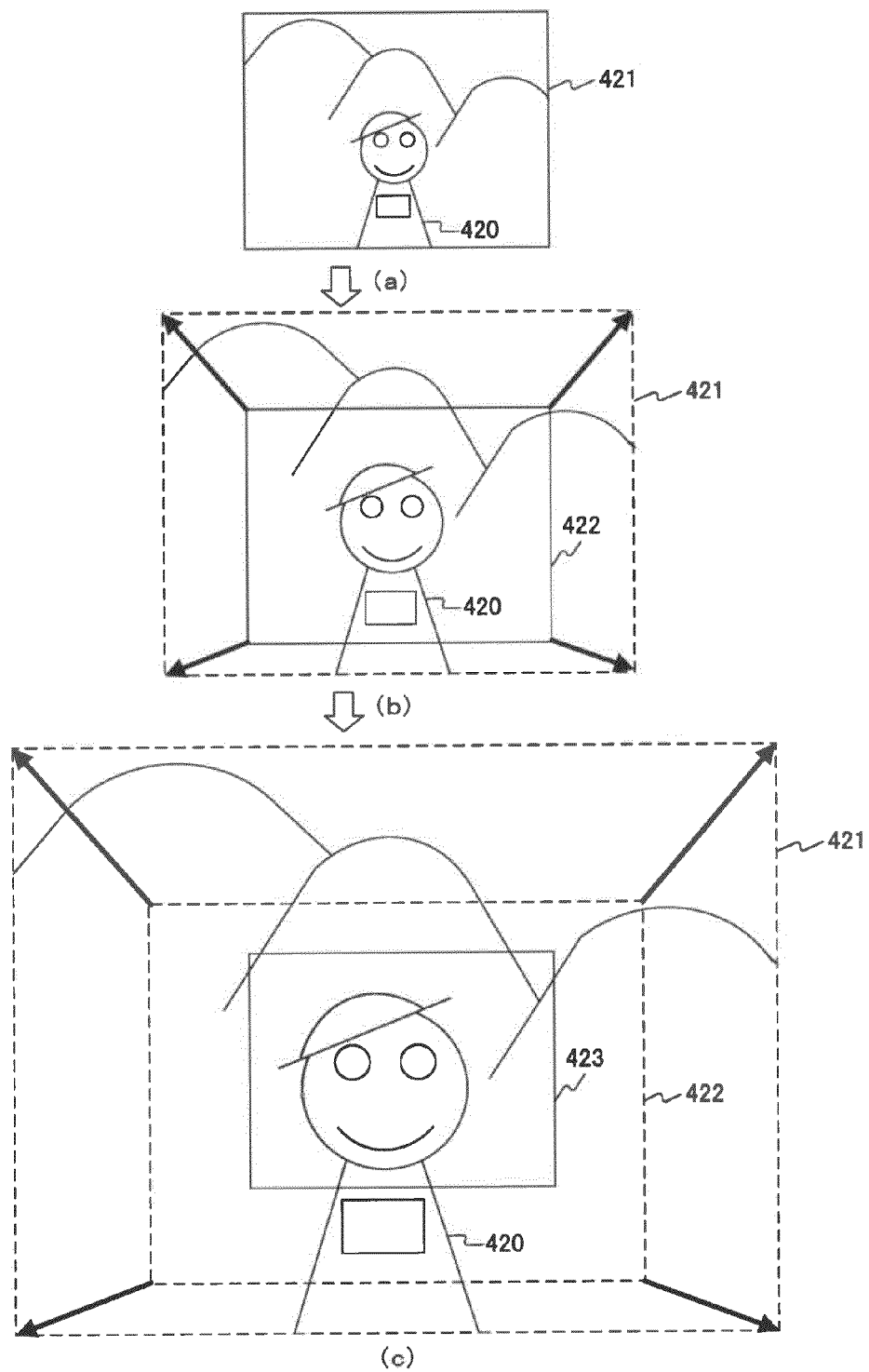
FIG. 24 is a view showing an example of display in a case wherein a dynamic picture including images 421 to 423 shown in FIG. 11 is reproduced.
Figure 25:
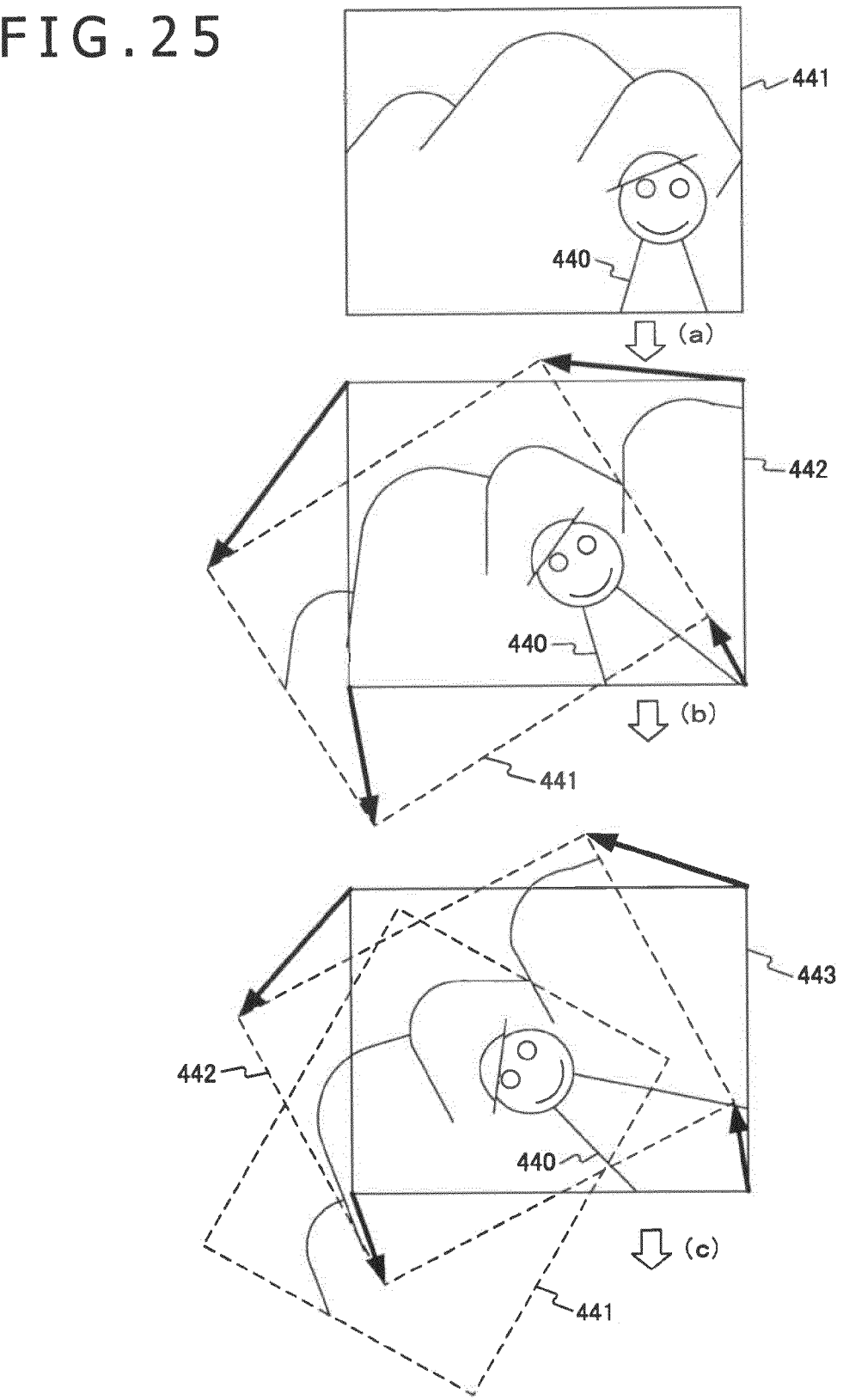
FIG. 25 is views showing an example of display in a case wherein a dynamic picture including images 441 to 443 shown in FIG. 14 is reproduced.

First, a case wherein the images 401 to 403, 421 to 423 and 441 to 443 shown in FIGS. 8 to 16 are used to synthesize and reproduce a dynamic picture is described in detail with reference to the drawings. It is to be noted that the images shown in FIGS. 23 to 25 are simplified for description and the amount of movement between two successive frames is illustrated in an exaggerated manner similarly as in FIGS. 8 to 16.

First, a case wherein, upon image pickup of the image pickup apparatus 100, the direction of the lens of the image pickup apparatus 100 is moved in one of the upward, downward, leftward and rightward directions with reference to the center at the position of the image pickup apparatus 100 although the magnification is not varied is described.

Figure 23:
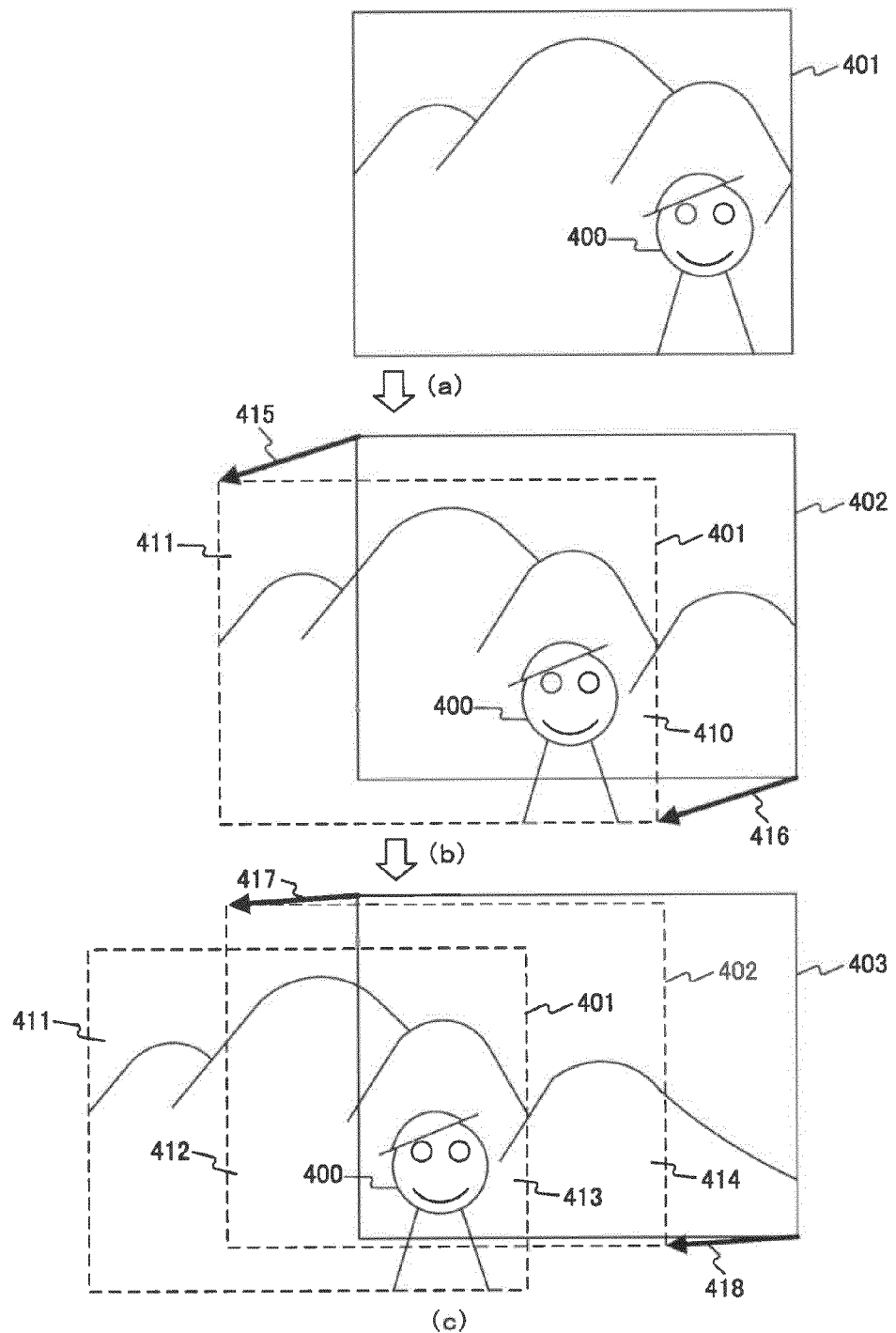
FIG. 23 is views showing an example of display in a case wherein a dynamic picture which includes the images 401 to 403 shown in FIG. 8 is reproduced.

FIG. 23 is views showing an example of display in a case wherein a dynamic picture which includes the images 401 to 403 shown in FIG. 8 is reproduced. In the display example shown in FIG. 10, an image formed by synthesizing, while a synthesized image (first, one image) corresponding to each of frames preceding to a current frame is fixed, an affine transformed image corresponding to a current frame by overwriting on the synthesized image is displayed. In contrast, in the display example shown in FIG. 23, an image formed by synthesizing an image corresponding to a current frame by overwriting with a synthesized image which is formed by affine transformation of a synthesized image corresponding to each of frames preceding to a current frame in a direction opposite to the direction of the affine transformation parameters while the position of the image corresponding to the current frame is fixed. In particular, while the display examples shown in FIG. 10 and FIG. 23 are different in an image to be displayed at a fixed position and an image which makes an object of affine transformation, they are common in the other points. Therefore, portions common to those of FIG. 10 are described with common reference characters applied thereto.

As shown in (a) of FIG. 23, only the image 401 corresponding to the top frame is displayed first. Here, since the image 401 is the top frame, no preceding frame exists. Then, where the image 402 corresponding to a next frame is to be displayed, affine transformation parameters associated with this frame are used to affine transform the image 401 which is the immediately preceding frame. In particular, where the matrix of affine transformation parameters corresponding to the image 402 is represented by A2 and the matrix of the affine transformation parameters corresponding to the image 401 is represented by A1, the value of In (A1×A2) is determined, and the image 401 is affine transformed based on the determined matrix of Inv(A1×A2). Here, InvA (A is a matrix) represents an inverse matrix to A. In the image shown in (b) of FIG. 23, only the position of the image 401 is transformed. Then, the image 402 corresponding to the current frame is overwritten with the affine transformed image 401 such that it overlaps with the image 402. It is to be noted that description of the synthesized image formed by overwriting the image 402 on the image 401 is omitted here because it is same as the synthesized image shown in (b) of FIG. 10.

Thereafter, when the image 403 corresponding to the next frame is to be displayed, affine transformation parameters associated with this frame are used to affine transform a synthesized image of the image 401 corresponding to the preceding frame and the image 402 in a direction opposite to the direction of the affine transformation parameters. In particular, where the matrix of the affine transformation parameters corresponding to the image 403 is represented by A3 and the matrix of the affine transformation parameters corresponding to the image 402 is represented by A2 while the matrix of the affine transformation parameters corresponding to the image 401 is represented by A1, the value of Inv(A1×A2×A3) is determined, and the synthesized image of the images 401 and 402 is affine transformed with the matrix of Inv(A1×A2×A3). In the image shown in (c) of FIG. 23, only the position of the synthesized image of the image 401 and the image 402 is transformed. Then, the image 403 corresponding to the current frame is overwritten in such a manner as to overlap with the affine transformed synthesized image of the images 401 and 402. It is to be noted that description of the synthesized image formed by overwriting the image 403 on the images 401 and 402 is omitted here because it is same as the synthesized image shown in (c) of FIG. 10.

Now, a case wherein, upon image pickup of the image pickup apparatus 100, the magnification is varied while the direction of the lens of the image pickup apparatus 100 is not moved is described.

FIG. 24 is a view showing an example of display in a case wherein a dynamic picture including images 421 to 423 shown in FIG. 11 is reproduced. The differences between the display examples shown in FIGS. 13 and 24 are similar to the differences between the display examples shown in FIGS. 10 and 23, and although they are different in an image displayed at a fixed position and an image which makes an object of affine transformation, they are common in the other portions. Therefore, elements common to those of FIG. 13 are described with common reference characters applied thereto.

As shown in (a) of FIG. 24, only the image 421 corresponding to the top frame is displayed first. Then, where the image 422 corresponding to the next frame is to be displayed, affine transformation parameters associated with this frame are used to affine transform the image 421 which is the immediately preceding image in a direction opposite to the direction of the affine transformation parameter. In the image shown in (b) of FIG. 24, only the size of the image 421 is transformed. Then, the image 422 corresponding to the current frame is overwritten in an overlapping relationship with the affine transformed image 421. It is to be noted that description of the synthesized image formed by overwriting the image 422 on the image 421 is omitted here since, although it is different in terms of the size, it is same in terms of the other points as the synthesized image shown in (b) of FIG. 13.

Then, when the image 423 corresponding to the next frame is to be displayed, affine transformation parameters associated with this frame are used to affine transform the synthesized image of the image 421 and the image 422 in a direction opposite to the direction of the affine transformation parameters. In the image shown in (c) of FIG. 24, only the size of the synthesized image of the images 421 and 422 is transformed. Then, the image 423 corresponding to the current frame is overwritten so as to overlap with the affine transformed synthesized image of the images 421 and 422. It is to be noted that, although the synthesized image formed by overwriting the image 423 on the synthesized image of the images 421 and 422 is different in size, it is same in terms of the other points as the synthesized image shown in (c) of FIG. 13, and therefore, description of it is omitted here.

Now, a case is described wherein, upon image pickup of the image pickup apparatus 100, the image pickup apparatus 100 is rotated around the image pickup direction although the direction and the magnification of the lens of the image pickup apparatus 100 are not varied.

FIG. 25 is views showing an example of display in a case wherein a dynamic picture including images 441 to 443 shown in FIG. 14 is reproduced. The differences between the display examples shown in FIG. 16 and FIG. 25 are similar to those between the display examples shown in FIG. 10 and FIG. 23, and although the display examples are different in an image displayed at a fixed position and an image which makes an object of affine transformation, they are common in the other portions. Therefore, common elements to those of FIG. 16 are described with common reference numerals applied thereto.

As shown in (a) of FIG. 25, only the image 441 corresponding to the top frame is displayed first. Then, where the image 442 corresponding to the next frame is to be displayed, affine transformation parameters associated with this frame are used to affine transform the image 441 which is the immediately preceding image in a direction opposite to the direction of the affine transformation parameters. In the image shown in (b) of FIG. 25, only the angle of the image 441 is transformed. Then, the image 442 corresponding to the current frame is overwritten so as to overlap with the affine transformed image 441. It is to be noted that description of the synthesized image formed by overwriting the image 442 on the image 441 is omitted here because, although it is different in angle, it is the same in the other points as the synthesized image shown in (b) of FIG. 16.

Then, where the image 443 corresponding to the next frame is to be displayed, affine transformation parameters associated with this frame are used to affine transform the synthesized image of the image 441 and the image 442 corresponding to the preceding frame in a direction opposite to the direction of the affine transformation parameters. In the image shown in (c) of FIG. 25, only the angle of the synthesized image of the images 441 and 442 is transformed. Then, the image 443 corresponding to the current frame is overwritten in such a manner as to overlap on the affine transformed synthesized image of the images 441 and 442. It is to be noted that description of the synthesized image obtained by overwriting the image 443 on the images 441 and 442 is omitted here because, although it is different in angle, it is the same in the other points as the synthesized image shown in (c) of FIG. 16.

Now, a method of extracting a synthesized image to be displayed on the display section 250 is described in detail with reference to the drawings.

Figure 26:
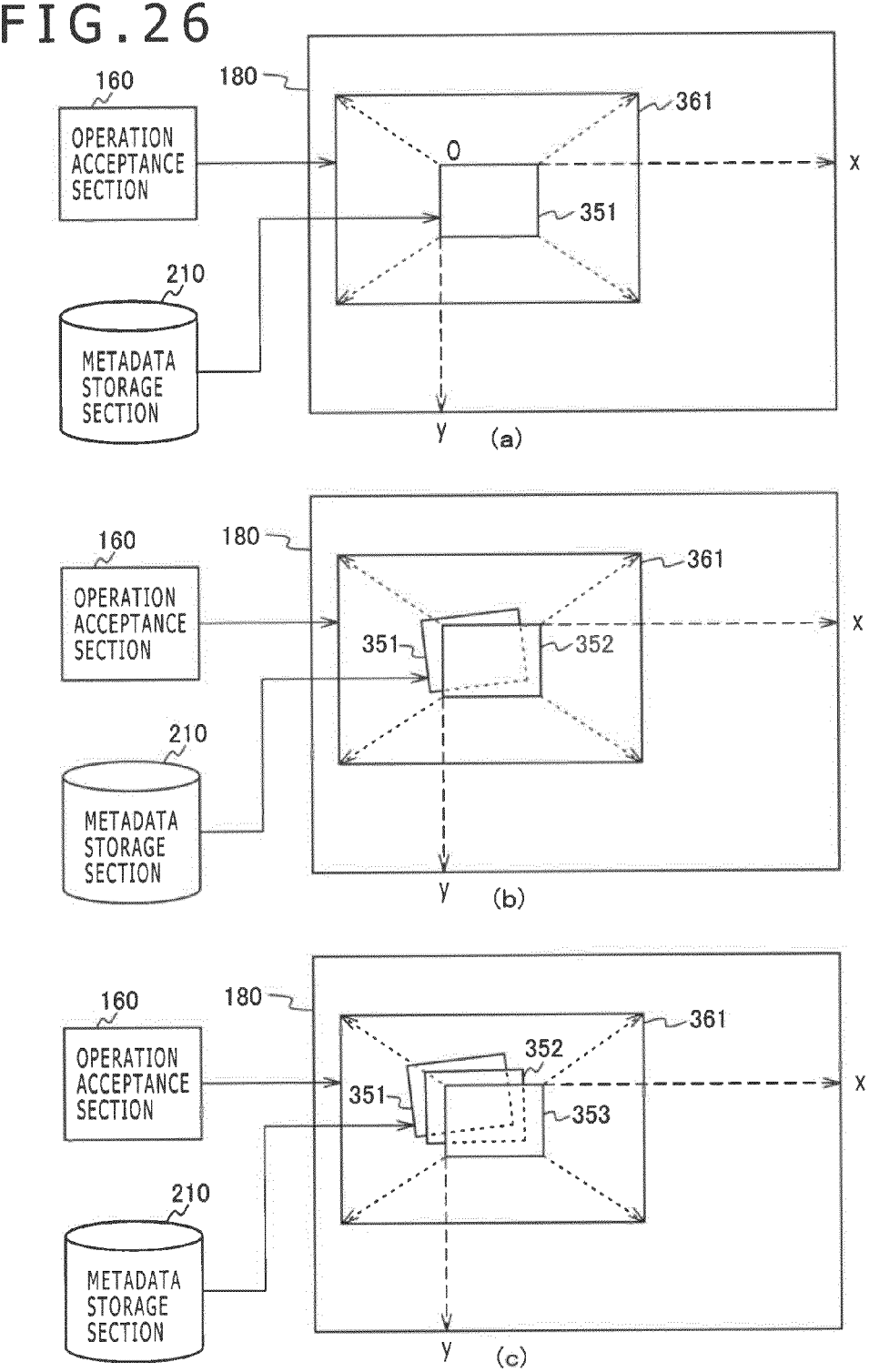
FIG. 26 is views schematically illustrating a relationship between frames of a dynamic picture file stored in the dynamic picture storage section 200 in the embodiment of the present invention and display regions.

FIG. 26 is views schematically illustrating a relationship between frames of dynamic image files stored in the dynamic picture storage section 200 in the embodiment of the present invention and the display region. Here, only the image memory 180, metadata storage section 210, and operation acceptance section 160 are displayed, but illustration of the components other than them is omitted. Further, in FIG. 26, similar to FIG. 17, description is given taking a case wherein a synthesized image is produced in the image memory 180 using the affine transformation parameters 216 stored in the metadata file 211 in regard to the frames "1" to "3" which form the dynamic picture file 201 shown in (b) of FIG. 4 as an example.

Here, in FIG. 17, the example has been described wherein affine transformation is successively applied to a current image corresponding to a current frame to form a synthesized image to be successively stored into the image memory 180 and, from among such synthesized images of the image memory 180, synthesized images included in the range of a display region transformed in response to the current image are extracted. In FIG. 26, an example is illustrated wherein affine transformation is applied, to a synthesized image corresponding to each of preceding frames, in a direction opposite to the direction of affine parameters to fix a current image corresponding to a current frame to a particular position of the display section 250 without transforming the display region in response to the current image. In this instance, the image transformation section 150 applies affine transformation to synthesized images corresponding to frames up to the immediately preceding frame stored in the image memory 180, and the image synthesis section 170 overwrites the current image on the synthesized images after the affine transformation to synthesize an image and stores the thus synthesized new synthesized image into the image memory 180. It is to be noted that like elements to those of FIG. 17 are denoted by like reference characters. In this manner, a current image can be fixed to a particular position of the display section 250 without transforming the display region in response to the current image. Further, for the current image, an image before affine transformed after acquired from the dynamic picture storage section 200 can be used in place of a synthesized image stored in the image memory 180 as described hereinabove with reference to FIG. 19.

While the foregoing description is given taking a case wherein images which form one dynamic picture are synthesized with each other as an example, in the following description, examples of synthesis in a case wherein images of two dynamic pictures are synthesized are described in detail with reference to the drawings.

Figure 27:
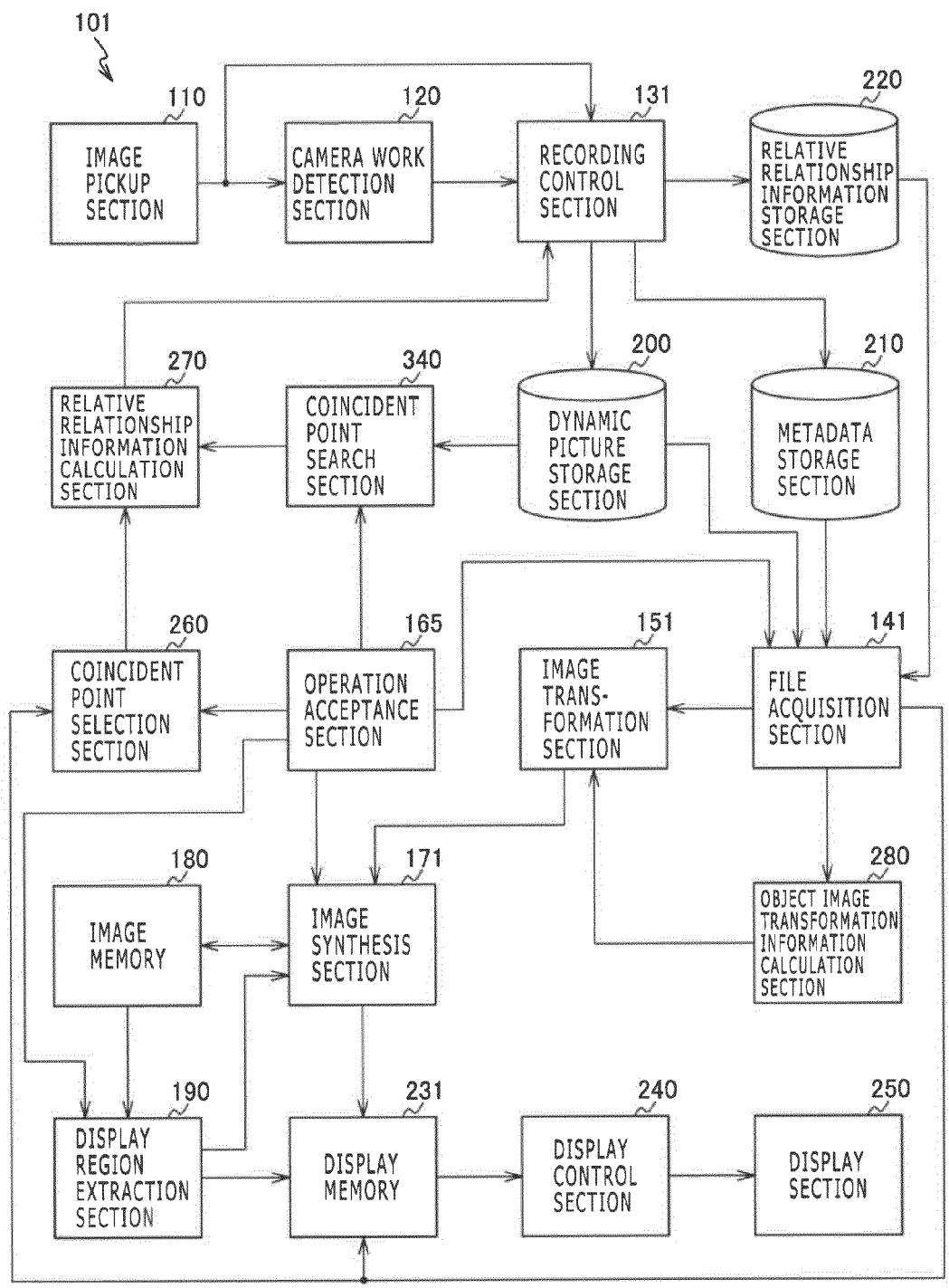
FIG. 27 is a block diagram showing an example of a functional configuration of an image pickup apparatus 101 according to the embodiment of the present invention.

FIG. 27 is a block diagram showing an example of a functional configuration of an image pickup apparatus 101 according to another embodiment of the present invention. Here, the image pickup apparatus 101 is a partial modification to the image pickup apparatus 100 shown in FIG. 1 and includes an image pickup section 110, a camera work detection section 120, a recording control section 131, a file acquisition section 141, an image transformation section 151, an operation acceptance section 165, an image synthesis section 171, an image memory 180, a display region extraction section 190, a dynamic picture storage section 200, a metadata storage section 210, a relative relationship information storage section 220, a display memory 231, a display control section 240, a display section 250, a coincident point selection section 260, a relative relationship information calculation section 270, an object image transformation information calculation section 280 and a coincident point search section 340. It is to be noted that description of the configuration of the image pickup section 110, camera work detection section 120, image memory 180, display region extraction section 190, metadata storage section 210, display control section 240 and display section 250 is omitted because it is similar to that of the image pickup apparatus 100 shown in FIG. 1. Further, in the following, description is given principally of differences from the image pickup apparatus 100 shown in FIG. 1.

The recording control section 131 records dynamic pictures outputted from the image pickup section 110 as a dynamic picture file into the dynamic picture storage section 200 and records affine transformation parameters outputted from the camera work detection section 120 as a metadata file into the metadata storage section 210 in an associated relationship with corresponding dynamic pictures and frames. Further, the recording control section 131 records the affine transformation parameters outputted from the relative relationship information calculation section 270 into the relative relationship information storage section 220 in an associated relationship with dynamic pictures and frames corresponding to the affine transformation parameters.

The dynamic picture storage section 200 stores dynamic pictures outputted from the image pickup section 110 as a dynamic picture file under the control of the recording control section 131. Further, the dynamic picture storage section 200 supplies the dynamic picture file in accordance with a request from the file acquisition section 141 to the file acquisition section 141 and supplies at least two dynamic picture files in accordance with a request from the coincident point search section 340 to the coincident point search section 340.

The relative relationship information storage section 220 stores affine transformation parameters outputted from the relative relationship information calculation section 270 and corresponding dynamic pictures and frames in an associated relationship with each other as a relative relationship metadata file under the control of the recording control section 131. Further, the relative relationship information storage section 220 supplies a relative relationship metadata file to the file acquisition section 141 in accordance with a request from the file acquisition section 141. It is to be noted that a relative relationship metadata file stored in the relative relationship information storage section 220 is hereinafter described in detail with reference to FIGS. 29 and 35.

The file acquisition section 141 acquires at least one or a plurality of dynamic picture files stored in the dynamic picture storage section 200, a metadata file stored in an associated relationship with each of the dynamic picture files in the metadata storage section 210 and a relative relationship metadata file stored in an associated relationship commonly with the dynamic picture files in the relative relationship information storage section 220 and supplies information of the acquired files to the individual sections in response to an operation input accepted by the operation acceptance section 165. In particular, when an operation input for ordinary dynamic picture reproduction is accepted by the operation acceptance section 165, the file acquisition section 141 acquires one or a plurality of dynamic picture files stored in the dynamic picture storage section 200 and successively outputs dynamic pictures of the acquired dynamic picture files to the coincident point selection section 260 and the display memory 231. When the ordinary dynamic picture reproduction is being carried out, if an operation input for stopping of the dynamic picture reproduction is accepted by the operation acceptance section 165, the file acquisition section 141 stops the outputting of dynamic pictures. Further, where an instruction operation which designates synthesis reproduction of one or a plurality of dynamic pictures is accepted by the operation acceptance section 165, the file acquisition section 141 acquires the designated dynamic picture file or files stored in the dynamic picture storage section 200, metadata files stored in an associated relationship individually with the dynamic picture files in the metadata storage section 210 and a relative relationship metadata file stored in an associated relationship commonly with the dynamic picture files in the relative relationship information storage section 220, and outputs dynamic pictures of the acquired dynamic picture file or files and affine transformation parameters of the metadata file or files to the image transformation section 151. Further, the file acquisition section 141 outputs the contents of the acquired metadata files and relative relationship metadata files to the object image transformation information calculation section 280.

The image transformation section 151 carries out affine transformation of images for each frame, which form a dynamic picture of a dynamic picture file outputted from the file acquisition section 141, using affine transformation parameters corresponding to the images, and outputs the affine-transformed images to the image synthesis section 171. Here, where synthesis of a plurality of dynamic pictures is designated, the image transformation section 151 determines one of the plural dynamic pictures of an object of reproduction as a reference dynamic picture and carries out affine transformation of the reference dynamic picture for each frame using affine transformation parameters corresponding to the images which form the reference dynamic picture. Meanwhile, as regards the other dynamic pictures than the reference dynamic picture from among the plural dynamic pictures which are an object of reproduction, the image transformation section 151 carries out affine transformation for each frame using object image transformation information (affine transformation parameters) calculated by the object image transformation information calculation section 280 and affine transformation parameters corresponding to the images which form the dynamic picture. It is to be noted that a transformation method for the other dynamic pictures is hereinafter described in detail with reference to FIGS. 32, 38 and so forth.

The operation acceptance section 165 includes various kinds of operation members and outputs, when an operation input is accepted from any of the operation members, the contents of the accepted operation input to the file acquisition section 141, coincident point selection section 260, image synthesis section 171, display region extraction section 190 or coincident point search section 340. It is to be noted that such operation members are similar to those described hereinabove with reference to FIG. 2.

The coincident point selection section 260 selects, when an operation input of a designation operation of designating a coincident point is accepted by the operation acceptance section 165, a coincident point of images which form a dynamic picture of a dynamic picture file outputted from the file acquisition section 141. Where at least three coincident points are selected with regard to one image, the coincident point selection section 260 outputs the positions and the selection order of the selected coincident points and the images of an object of selection to the relative relationship information calculation section 270. The selection operation of coincident points may be carried out simultaneously for a plurality of images or may be carried out successively for each one dynamic picture.

The coincident point search section 340 searches, where an instruction operation which designates production of relative relationship information regarding at least two dynamic pictures in a plurality of dynamic picture files stored in the dynamic picture storage section 200 is accepted by the operation acceptance section 165, for at least three coincident points regarding the images which form the designated plural dynamic pictures, and outputs the images including the positions of the searched out coincident points to the relative relationship information calculation section 270. The search for coincident points can be implemented, for example, by using a technique for general object recognition or the like (for example, refer to Japanese Patent Laid-Open No. 2002-65399) by which an article included in an image can be recognized irrespective of the size of the image. Further, the coincident point search section 340 is described in detail with reference to FIG. 28.

The relative relationship information calculation section 270 calculates, based on at least two images and at least three coincident points of the images outputted from the coincident point selection section 260 or the coincident point search section 340, affine transformation parameters as relative relationship information regarding the images, and outputs the calculated affine transformation parameters and a dynamic picture ID and frame numbers of the images used for the calculation of the affine transformation parameters to the recording control section 131. It is to be noted that the calculation of the affine transformation parameters regarding the images are described in detail with reference to FIGS. 30 and 31. Further, while, in the embodiment of the present invention, an example wherein affine transformation parameters are used as relative relationship information is described, some other image transformation information such as projection transformation parameters may be used. It is to be noted that the affine transformation parameters can be determined by calculation using vectors at three points, and projection transformation parameters can be determined by calculation using vectors at four points.

When an instruction to synthesize and reproduce a plurality of dynamic pictures is received, where at least one image which forms one dynamic picture from among a plurality of dynamic pictures of an object of reproduction is determined as a reference image and the images which form the other dynamic pictures are determined as object images, the object image transformation information calculation section 280 calculates, based on affine transformation parameters of a metadata file and a relative relationship metadata file outputted from the file acquisition section 141, object image transformation information to be used for transformation of the object images. Then, the object image transformation information calculation section 280 outputs the calculated object image transformation information to the image transformation section 151. As a reference image for one dynamic picture, for example, an image corresponding to a top frame among images which form one dynamic picture can be used. Further, the object image transformation information is, for example, affine transformation parameters used for transformation of object image with respect to the reference image. It is to be noted that the calculation of the object image transformation information is described in detail with reference to FIG. 32 and so forth.

The image synthesis section 171 synthesizes images by overwriting an image after affine transformation by the image transformation section 151 on a synthesized image corresponding to frames up to the immediately preceding frame retained in the image memory 180 and stores the synthesized new synthesized image into the image memory 180. Further, where an instruction to synthesize and reproduce a plurality of dynamic pictures is received, the image synthesis section 171 synthesizes images by overwriting the images affine-transformed by the image transformation section 151 with reference to the reference image on the synthesized images corresponding to the frames up to the immediately preceding frame stored in the image memory 180, and stores the synthesized new synthesized image into the image memory 180. It is to be noted that the image synthesis section 171 synthesizes the current image before the affine transformation by the image transformation section 151 on the synthesized image stored in the display memory 231 based on the size of the display region determined in response to the value of the display magnification. Here, the size of the current image synthesized in the display memory 231 is determined based on the value of the display magnification. It is to be noted that the reproduction starting position of a plurality of dynamic pictures may be determined individually in response to an operation input from the operation acceptance section 165. It is to be noted that such image synthesis is described in detail with reference to FIGS. 32 to 34 and so forth.

The display memory 231 is a displaying buffer for retaining an image extracted from the image memory 180 by the display region extraction section 190, and an image retained in the image memory 180 is displayed on the display section 250.

Figure 28:
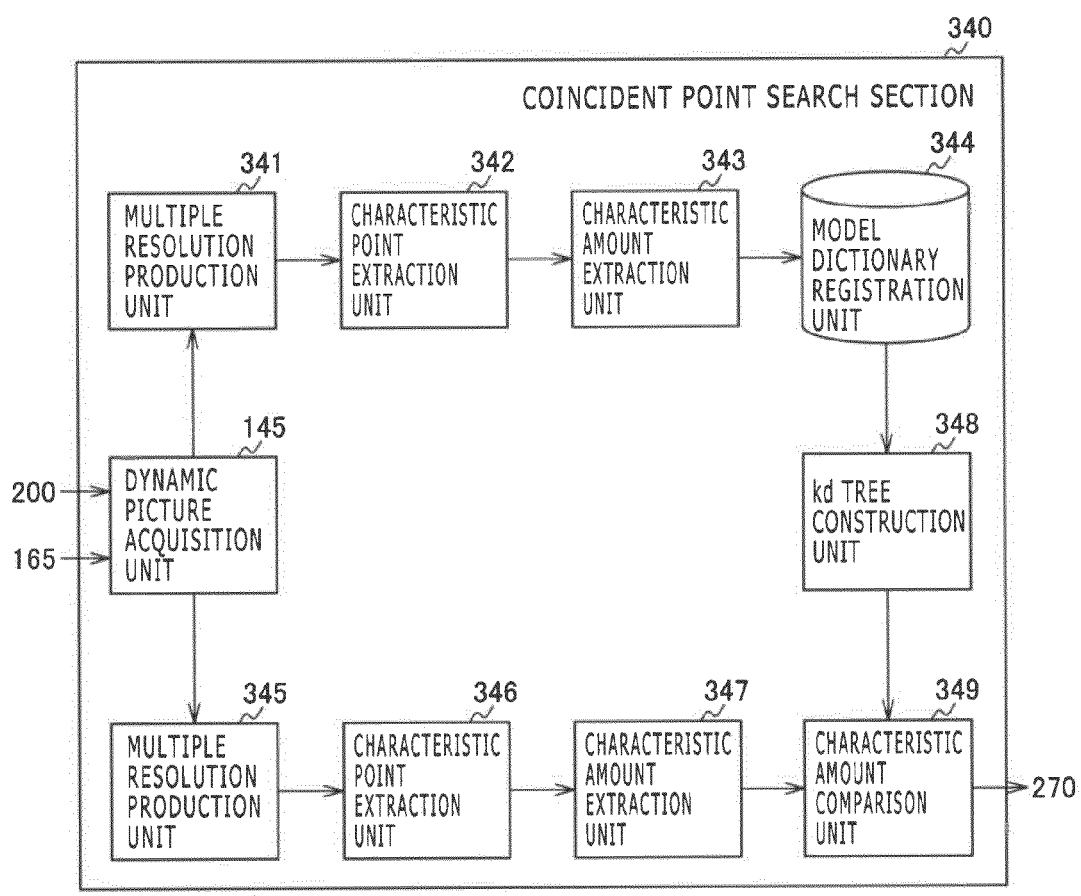
FIG. 28 is a block diagram showing an example of a functional configuration of a coincident point search section 340 in the embodiment of the present invention.

FIG. 28 is a block diagram showing an example of a functional configuration of the coincident point search section 340 in the embodiment of the present invention. The coincident point search section 340 includes a dynamic picture acquisition unit 145, a multiple resolution production unit 341, a characteristic point extraction unit 342, a characteristic amount extraction unit 343, a model dictionary registration unit 344, a multiple resolution production unit 345, a characteristic point extraction unit 346, a characteristic amount extraction unit 347, a kd tree construction unit 348, and a characteristic amount comparison unit 349. And, the coincident point search section 340 calculates a partial coincidence degree between frames which form a plurality of dynamic pictures and automatically associates the plural dynamic pictures with each other based on the calculated coincidence degree.

The dynamic picture acquisition unit 145 acquires two dynamic picture files stored in the dynamic picture storage section 200 in response to an operation input for dynamic picture acquisition from the operation acceptance section 165, and outputs images which form one of the acquired dynamic picture files for each frame to the multiple resolution production unit 341. Further, the dynamic picture acquisition unit 145 outputs images which form the other dynamic picture files for each frame to the multiple resolution production unit 345.

The multiple resolution production unit 341 lowers the resolution of an image outputted from the dynamic picture acquisition unit 145 at a ratio determined in advance to produce a multiple resolution image formed from images of a plurality of different resolutions with finer accuracy than upon recognition, and outputs the produced multiple resolution image to the characteristic point extraction unit 342.

The characteristic point extraction unit 342 extracts characteristic points from images of different resolutions of a multiple resolution image outputted from the multiple resolution production unit 341 and outputs the extracted characteristic points to the characteristic amount extraction unit 343. For the extraction method of characteristic points, for example, a method similar to a characteristic point extraction method by the characteristic point extraction unit 121 shown in FIG. 3 can be used.

The characteristic amount extraction unit 343 extracts at least two local characteristic amounts at characteristic points outputted from the characteristic point extraction unit 342 and registers the extracted characteristic amounts into the model dictionary registration unit 344. Here, the two local characteristic amounts extracted by the characteristic amount extraction unit 343 include a direction histogram of the concentration gradient in the proximity of the characteristic point extracted as a first type characteristic amount and a dimension degeneration concentration gradient vector extracted as a second type characteristic amount.

The model dictionary registration unit 344 registers characteristic amounts outputted from the characteristic amount extraction unit 343 and supplies the registered characteristic amounts to the kd tree construction unit 348.

The multiple resolution production unit 345 lowers the resolution of an image outputted from the dynamic picture acquisition unit 145 at a ratio determined in advance to produce a multiple resolution image formed from a plurality of images of different resolutions with accuracy rougher than that upon learning and outputs the produced multiple resolution image to the characteristic point extraction unit 346.

The characteristic point extraction unit 346 extracts characteristic points from each of images of different resolutions of a multiple resolution image outputted from the multiple resolution production unit 345 and outputs the extracted characteristic points to the characteristic amount extraction unit 347. For this extraction method of characteristic points, for example, a method similar to that of the characteristic point extraction unit 342 can be used.

The characteristic amount extraction unit 347 extracts at least two local characteristic amounts at characteristic points outputted from the characteristic point extraction unit 346 and outputs the extracted characteristic amounts to the characteristic amount comparison unit 349. For the characteristic amount extraction, for example, a method similar to that of the characteristic amount extraction unit 343 can be used.

The kd tree construction unit 348 constructs a kd tree for use for comparison of characteristic amounts by the characteristic amount comparison unit 349 based on characteristic amounts registered in the model dictionary registration unit 344, and outputs the constructed kd tree to the characteristic amount comparison unit 349. Here, where characteristic amounts are to be compared by the characteristic amount comparison unit 349, the characteristic amount comparison unit 349 compares characteristic point characteristic amounts extracted from the characteristic amount extraction unit 347 and characteristic point characteristic amounts registered in the model dictionary registration unit 344 with each other to search for a combination of a characteristic point characteristic amount extracted from the characteristic amount extraction unit 347 and a similar characteristic point characteristic amount registered in the model dictionary registration unit 344. The simplest method as the characteristic amount comparison method is the total inspection. In particular, a method of carrying out calculation of the characteristic amount similarity degree of each of characteristic point characteristic amounts extracted from the characteristic amount extraction unit 347 to the characteristic point characteristic amounts registered in the model dictionary registration unit 344 and selecting, based on the calculated similarity degrees, a combination of similar characteristic point characteristic amounts is the simplest method. However, the method by the total search requires long processing time. Therefore, in the embodiment of the present invention, in order to search for data at a high speed from a large amount of data group, an example which uses a tree search method which uses a data structure called kd tree (J. H. Friedman, J. L. Bentley and R. A. Finkel: "An algorithm for finding best matches in logarithmic expected time," ACM Transaction on Mathematical Software, Vol. 3, No. 3, pp. 209-226, September 1977) is described. The kd tree is a tree which has a k-dimensional tree structure. It is to be noted that, in the embodiment of the present invention, a 36d tree (k=36) of characteristic amounts of the type 1 and an 18d tree (k=18) of characteristic amounts of the type 2 are constructed. In each leaf (terminal node) of the constructed tree, one characteristic point characteristic amount is retained together with information of a label or the like for reference with regard to of which characteristic point the characteristic amount is, from which one of the scales the characteristic point is extracted, of which one of images of a multiple resolution image group the scales are and of which frame the multiple resolution image group is.

The characteristic amount comparison unit 349 compares characteristic point characteristic amounts extracted from the characteristic amount extraction unit 347 with characteristic point characteristic amounts represented as a Kd tree constructed by the kd tree construction unit 348 with each other to carry out k-NN (k Nearest Neighbor) search to calculate the similarity degree to search for a combination of similar characteristic point characteristic amounts and outputs the position of the characteristic point corresponding to the searched out combination of the characteristic point characteristic amounts as a coincident point to the relative relationship information calculation section 270. Here, characteristic amounts regarding one or a plurality of dynamic pictures may be registered in advance in the model dictionary registration unit 344 such that the dynamic picture acquisition unit 145 successively acquires other dynamic picture files stored in the dynamic picture storage section 200 to successively search for a coincident point between the registered dynamic pictures and the other dynamic pictures. Or, the coincident point search section 340 may successively acquire the dynamic picture files stored in the dynamic picture storage section 200 to automatically and successively search for a coincident point regarding the dynamic picture files stored in the dynamic picture storage section 200. It is to be noted that the coincident point of an object of the search is described in detail with reference to FIG. 31.

Figure 29:
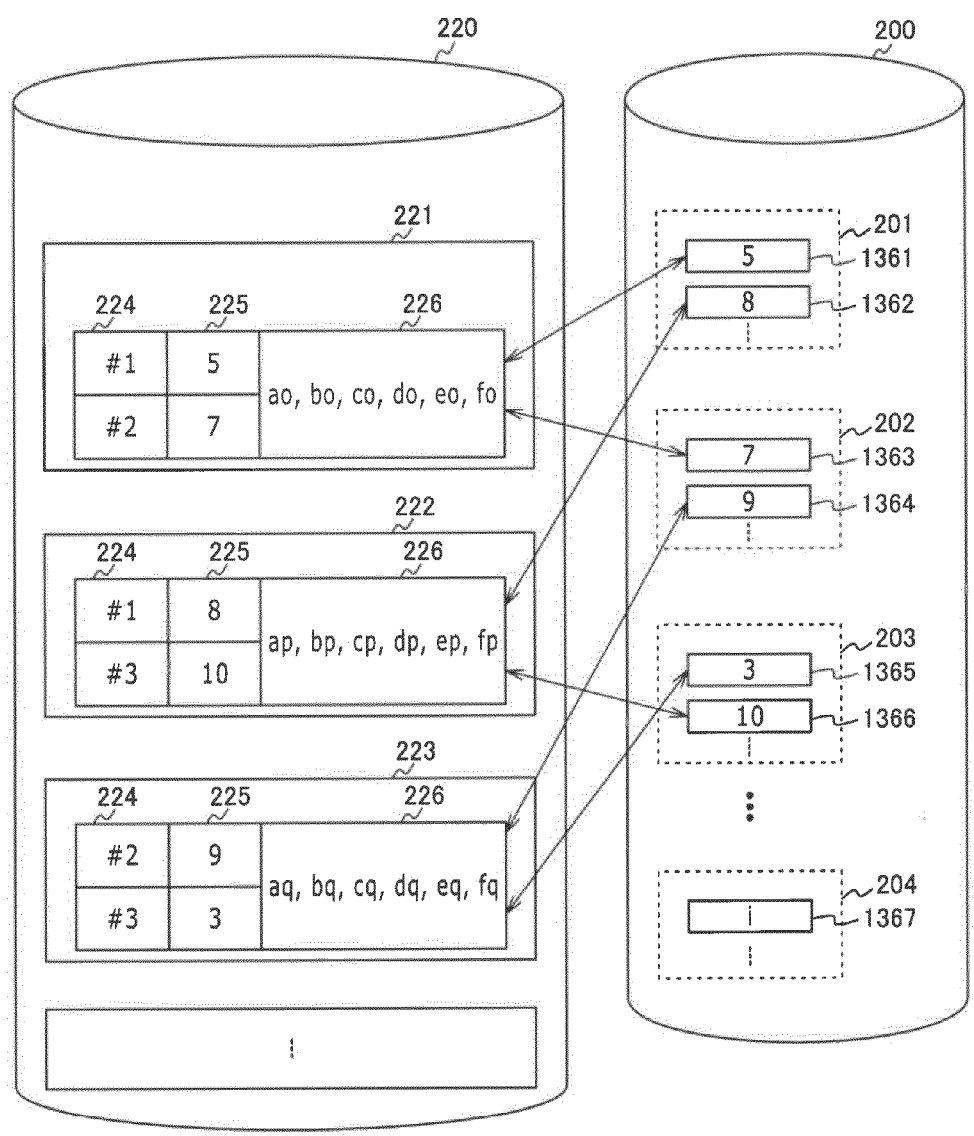
FIG. 29 is a view schematically showing files recorded in the dynamic picture storage section 200 and a relative relationship information storage section 220 in the embodiment of the present invention.

FIG. 29 is a view schematically showing files recorded in the dynamic picture storage section 200 and the relative relationship information storage section 220 in the embodiment of the present invention. In the present example, the dynamic picture files 201 to 204 stored in the dynamic picture storage section 200 and relative relationship metadata files 221 to 223 stored in an associated relationship with the dynamic picture files 201 to 204 in the relative relationship information storage section 220 are schematically illustrated. In the present example, an example is described wherein frames "5" 1361 and "8" 1362 which form the dynamic picture file (#1) 201, frames "7" 1363 and "9" 1364 which form the dynamic picture file (#2) 202 and frames "3" 1365 and "10" 1366 which form the dynamic picture file (#3) 203 are stored in an associated relationship with the relative relationship metadata files 221 to 223 stored in the relative relationship information storage section 220. It is to be noted that description of dynamic picture files stored in the dynamic picture storage section 200 is omitted here because they are the same as the dynamic picture files shown in FIG. 4.

In the relative relationship metadata files 221 to 223, a dynamic picture ID 224, a frame number 225 and an affine transformation parameter 226 are stored in an associated relationship with each other.

The dynamic picture ID 224 is a dynamic picture ID applied to two dynamic picture files corresponding to two images which individually include at least three coincident points, and, for example, in the relative relationship metadata file 221, "#1" applied to the dynamic picture file 201 and "#2" applied to the dynamic picture file 202 are stored.

The frame number 225 is a serial number of two frames corresponding to two images including at least three coincident points, and, for example, in the relative relationship metadata file 221, the frame number "5" of the frame which forms a dynamic picture of the dynamic picture file 201 and the frame number "7" of a frame which forms a dynamic picture of the dynamic picture file 202 are placed.

The affine transformation parameter 226 indicates affine transformation parameters calculated for at least two images corresponding to the dynamic picture ID 224 and the frame number 225, and, for example, in the relative relationship metadata file 221, "ao, bo, co, do, eo, fo" are placed as affine transformation parameters corresponding to the frame "5" which forms a dynamic picture of the dynamic picture file 201 and the frame "7" which forms a dynamic picture of the dynamic picture file 202. It is to be noted that, in the embodiment of the present invention, the affine transformation parameter 226 indicates affine transformation parameters in a case wherein an image corresponding to a frame number on the lower side shown in FIG. 29 from between the corresponding dynamic picture ID 224 and frame number 225 is determined as a reference image and another frame number of the upper side is determined as an object image. For example, the affine transformation parameter 226 placed in the relative relationship metadata file 221 indicates affine transform parameters for the frame "7" 1363 which forms a dynamic picture of the dynamic picture file (#2) 202 of the frame "5" 1361 which forms a dynamic picture of the dynamic picture file (#1) 201.

Figure 30:
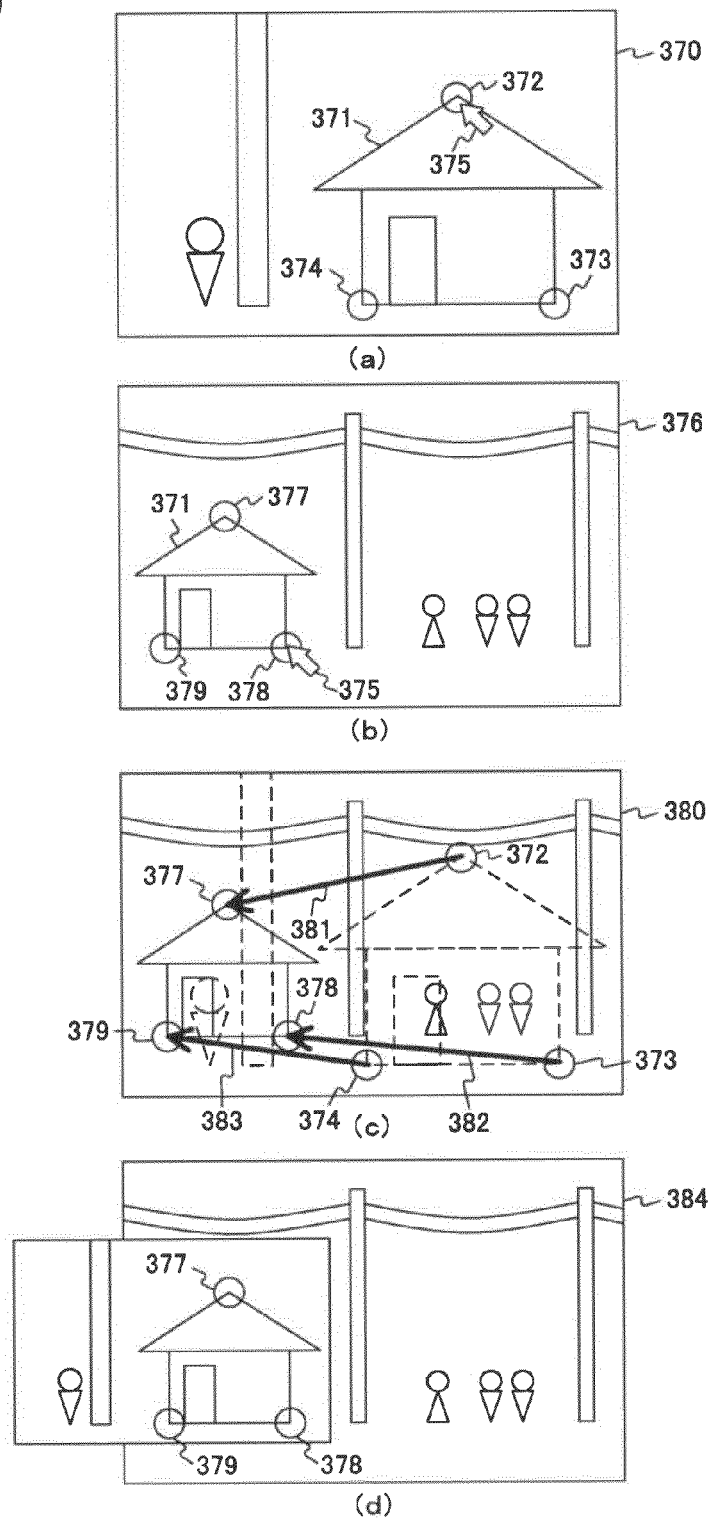
FIG. 30 is views schematically illustrating an affine transformation parameter calculation method for calculating an affine transformation parameter regarding two images by selecting a coincident point included in the images and synthesis of the two images based on the selected coincident point.

FIG. 30 is views schematically illustrating an affine transformation parameter calculation method for calculating affine transformation parameters regarding two images by selecting coincident points included in the images and synthesis of the two images based on selected coincident points. (a) of FIG. 30 shows an image 370 which is an example of a reference image which forms one dynamic picture which is used as a reference, and (b) of FIG. 30 shows an image 376 which is an example of a comparison object image which forms another dynamic picture which is used as an object of comparison. The images 370 and 376 shown in (a) and (b) of FIG. 30 are images illustrating a state wherein two dynamic pictures including one of the images 370 and 376 are stopped during reproduction on the display section 250. In the present example, a selection method wherein, in a state wherein the dynamic picture is stopped at the display section 250, a coincident point on the image displayed upon the stopping of the dynamic picture is designated manually is illustrated schematically. (c) of FIG. 30 illustrates an example of detection of an optical flow used when coincident points selected on the images 370 and 376 are used to calculate an affine transform parameter. Meanwhile, (d) of FIG. 30 illustrates an example wherein the images 370 and 376 are synthesized based on the coincident points selected on the images 370 and 376.

It is assumed that the images 370 and 376 shown in (a) and (b) of FIG. 30 include a house 371 which is the same object. Here, where relative relationship metadata files regarding the dynamic picture including the image 370 and the dynamic picture including the image 376 are to be produced by manual operation of a user, the user would reproduce the two dynamic pictures by manual operation so that images which include the same object are displayed on the display section 250. For example, the images 370 and 376 which include the house 371 which is the same object are displayed on the display section 250. In this instance, the two images of the images 370 and 376 may be displayed on the same screen of the display section 250, or one image may be displayed successively.

For example, in the state wherein the image 370 shown in (a) of FIG. 30 is displayed on the display section 250, the user would carry out an operation input on the operation acceptance section 165 to designate an upper portion 372 of the roof of the house 371 and corner portions 373 and 374 of the lower side of the house 371 using a cursor 375. The cursor 375 may be moved, for example, in response to an operation input from the cross button 162 or may be moved in response to an operation input from some other operation member. A desired portion can be designated, for example, by carrying out a designation operation in a state wherein the cursor 375 is superposed at the portion to be designated. Where the designation operation is carried out in this manner, for example, a round mark may be applied to a portion for which the designation operation is carried out as seen in (a) of FIG. 30 so that the user can recognize the portion. Also on the image 376 shown in (b) of FIG. 30, an upper portion 377 of the roof of the house 371 and corner portions 378 and 379 of the lower side of the house 371 are designated similarly. When the designation operations are carried out by the user, the coincident point selection section 260 selects the designated positions as coincident points on the images and outputs the selected positions of the coincident points and the order of such designation to the relative relationship information calculation section 270 together with the images.

As shown in (a) and (b) of FIG. 30, where three coincident points are selected individually on the two images 370 and 376, the relative relationship information calculation section 270 calculates vectors based on the coincident points and uses the calculated vectors to calculate affine transformation parameters. Each of the vectors is calculated, for example, as a combination of corresponding coincident points which are selected on the two images based on the order of the designated coincident points. For example, if a designation operation is carried out in order of the upper portion 372 of the roof of the house 371 of the image 370 and the corner portions 373 and 374 of the lower side of the house 371 and then a designation operation is carried out in order of the upper portion 377 of the roof of the house 371 of the image 376 and the corner portions 378 and 379 of the lower side of the house 371, then a vector is calculated with regard to the upper portion 372 of the image 370 and the upper portion 377 of the image 376 and a vector is calculated with regard to the corner portion 373 of the image 370 and the corner portion 378 of the image 376 and then a vector is calculated with regard to the corner portion 374 of the image 370 and the corner portion 379 of the image 376. In this manner, the vectors calculated based on the coincident points selected on the images 370 and 376 are indicated by arrow marks 381 to 383 in (c) of FIG. 30. It is to be noted that, on an image 380 shown in (c) of FIG. 30, a line included in the image 370 shown in (a) of FIG. 30 is indicated by a broken line, and a line included in the image 376 shown in (b) of FIG. 30 is indicated by a solid line. The vectors calculated in this manner are used to calculate affine transformation parameters. The calculation method of affine transformation parameters is similar to the calculation method illustrated in FIGS. 6 and 7. It is to be noted that, in the embodiment of the present invention, an example wherein affine transformation parameters corresponding to an inverse matrix to a matrix of affine transformation parameters calculated using coincident points are used as relative relationship parameters is described. In other words, affine transformation parameters to be used as relative relationship metadata are defined as affine transformation parameters corresponding not to an affine transformation matrix represented by vectors between two images whose coincident points are determined but to an affine matrix which represents, where one of two images is determined as a reference image, to which position the other image moves.

It is to be noted that the relative relationship information calculation section 270 may calculate affine transformation parameters without using the designated order. For example, a vector is calculated with regard to each of combinations of the three points selected as coincident points on the images. Where three coincident points are individually selected on the two images, six combinations are available as combinations of the coincident points of the images. Then, the vectors calculated with regard to the six combinations are used to calculate six affine transformation parameters. Then, determining one of the two images as a reference image while the other image is determined as a comparison object image, the six calculated affine transformation parameters are used to successively affine transform the comparison object image. Consequently, one reference image and six affine-transformed comparison object images are produced. Then, pixels existing in the inside of a triangle having apexes at the three coincident points of the reference image and pixels existing in the inside of a triangle having apexes at the three coincident points of the affine-transformed comparison object image are compared with each other to successively calculate the difference value in luminance value between the pixels existing in the inside of the triangles. Consequently, a total value of the square values of the six difference values corresponding to the six affine transformation parameters is calculated. Then, that affine transformation parameter which exhibits the lowest difference value is selected from among the thus calculated six difference values, and the selected affine transformation parameter is determined as an affine transformation parameter regarding the two images for which the coincident point designation operation has been carried out.

Further, for example, where the affine transformation parameters calculated based on the coincident points selected on the images 370 and 376 are used to affine transform and overwrite the image 370 on the image 376, an image 384 shown in (d) of FIG. 30 is produced. By synthesizing the images 370 and 376 using the calculated affine transformation parameters in this manner, a synthesized image in which the background around the house 371 is included over a wider range than the background of the images is produced.

Figure 31:
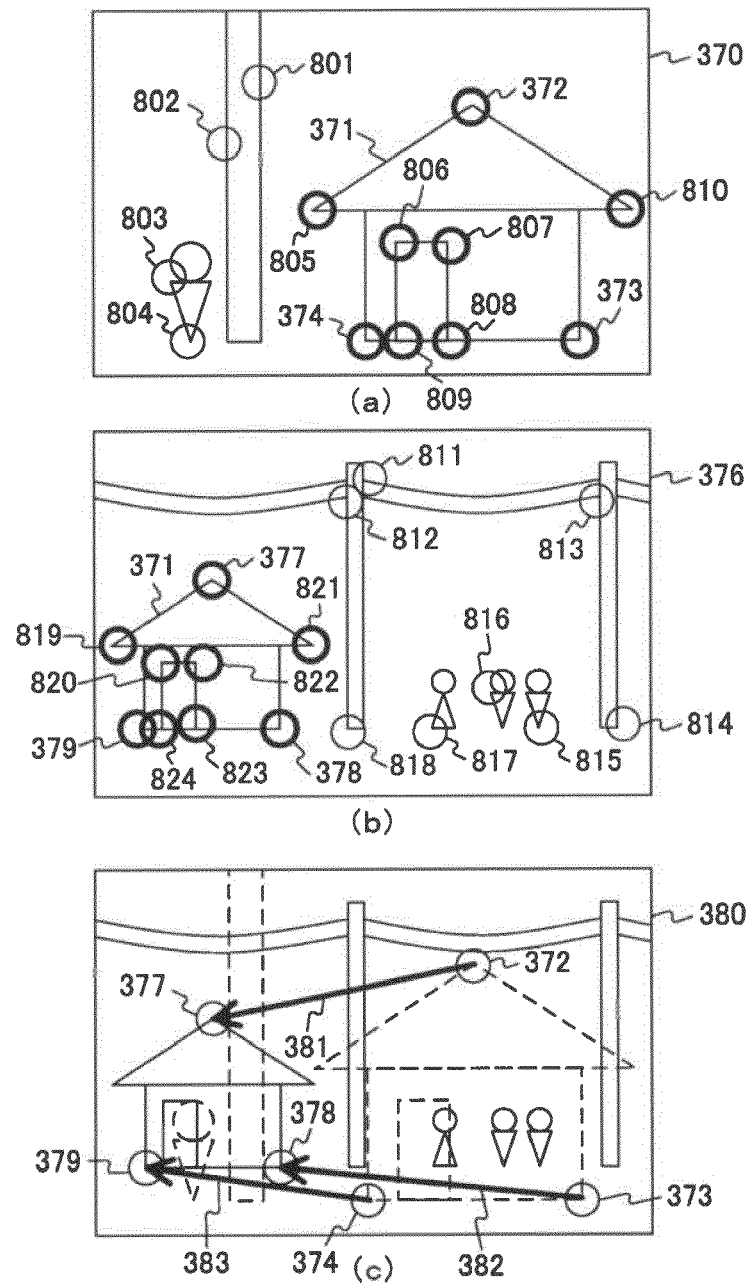
FIG. 31 is views schematically illustrating an affine transformation parameter calculation method for calculating an affine transformation parameter regarding two images by selecting a coincident point included in images.

FIG. 31 is views schematically showing an affine transformation parameter calculation method of calculating affine transformation parameters regarding two images by selecting coincident points included in the images. Here, an example wherein coincident points included in the images are searched for by the coincident point search section 340 shown in FIGS. 27 and 28 and the searched out coincident points are used to calculate affine transformation parameters regarding the two images is described. It is to be noted that images 370, 376 and 380 shown in (a) to (c) of FIG. 31 are the same as the images 370, 376 and 380 shown in (a) to (c) of FIG. 30 except that each of characteristic points searched out by the coincident point search section 340 is indicated by a round mark. As described hereinabove, the coincident point search section 340 calculates a partial coincidence degree between frames which form a dynamic picture and automatically associates the plural images with each other based on such calculated coincidence degrees. Where a search for coincident points between two dynamic pictures is carried out, for example, characteristic points 801 to 810 and 377 to 379 are extracted as characteristic points of the image 370 and characteristic points 811 to 823 and 377 to 379 are extracted as characteristic points of the image 376. Then, from among the extracted characteristic points, combinations of similar characteristic points of the images are selected. For example, on the images 370 and 376, the characteristic points 805 to 810 and 372 to 374 and the characteristic points 818 to 823 and 377 to 379 are selected. In (a) and (b) of FIG. 31, the matching characteristic points are indicated by a thick round mark. From among the characteristic points selected in this manner, three characteristic points to be used for calculation of affine transformation parameters are searched out as coincident points. For example, on the images 370 and 376, the characteristic points 372 to 374 and the characteristic points 377 to 379 are searched out as coincident points. The search for coincident points selects a combination of characteristic points which exhibit, for example, the highest score in similarity degree. Then, vectors are calculated based on the searched out coincident points, and affine transformation parameters are calculated based on the vectors. It is to be noted that the calculation of the affine transformation parameters is carried out by a method similar to the calculation method illustrated in FIG. 30.

FIG. 32 is views schematically illustrating an example of synthesis in a case wherein two dynamic pictures are synthesized. In this example, a case wherein images 501 to 514 which form a dynamic picture 500 and images 521 to 527 which form a dynamic picture 520 are synthesized is described. Further, it is assumed that images 508 and 524 indicated by oblique lines applied therein are images corresponding to frame numbers included in relative relationship metadata regarding the dynamic pictures 500 and 520.

In (a) of FIG. 32, a case wherein the images 501 to 514 which form the dynamic picture 500 are successively affine transformed using affine transformation parameters stored in an associated relationship with individual frames and synthesized on the image memory 180 is illustrated. For example, the image 501 which corresponds to the top frame is stored into the image memory 180 first. Then, the images 502 to 514 are successively affine transformed with reference to the image 501 and synthesized in the image memory 180. A flow of the current image by the affine transformation is indicated by an arrow mark 515. In other words, the images 501 to 514 are successively synthesized along the arrow mark 515.

In (b) of FIG. 32, a case wherein the images 521 to 527 which form the dynamic picture 520 are successively affine transformed using affine transformation parameters stored in an associated relationship with individual frames and synthesized on the image memory 180 is illustrated. Meanwhile, in (c) of FIG. 32, relative relationship positions of the image 508 and the image 524 in a case wherein the image 524 is affine transformed with reference to the image 501 with affine transformation parameters included in relative relationship metadata regarding the dynamic pictures 500 and 520 are shown. Here, the synthesized image shown in (b) of FIG. 32 shows an image synthesized from the images 521 to 527 with reference to the relative relationship positions of the image 508 and the image 524 shown in (c) of FIG. 32. A flow of the current image by the affine transformation in this instance is indicated by an arrow mark 528. In particular, the images 521 to 527 are successively synthesized along the arrow mark 528. An example of synthesis in a case wherein the synthesized image shown in (a) of FIG. 32 and the synthesized image shown in (b) of FIG. 32 are synthesized with reference to the relative relationship positions of the image 508 and the image 524 shown in (c) of FIG. 32. It is to be noted that, in the example shown in (d) of FIG. 32, an example wherein the images 508 and 524 are reproduced at the same time and the images reproduced at the same time are synthesized by overwriting the dynamic picture 520 on the dynamic picture 500 is illustrated.

Here, a particular calculation method regarding the storage positions of the individual dynamic pictures is described. First, the position of at least one dynamic picture which forms one of a plurality of dynamic pictures is determined. For example, the position of the image 501 which corresponds to the top frame which forms the dynamic picture 500 is determined. The thus determined position may be designated by the user through the operation acceptance section 160 or may be determined using a position calculated by the calculation described hereinabove. Then, the storage position of at least one of images which form the other dynamic picture is calculated. For example, matrices of affine transformation parameters associated with individual frames corresponding to the images 501 to 514 are represented by A1 to A14. Meanwhile, matrices of affine transformation parameters associated with frames corresponding to the images 521 to 527 are represented by B1 to B7. Further, a matrix of affine transformation parameters of relative relationship metadata stored in an associated relationship with the dynamic pictures 500 and 520 is represented by C1. Here, the reference image is the image 501. Where the storage position of the image 501 on the image memory 180 is determined as a reference, the storage position of the image 508 is calculated by multiplication of A1 to A8. In other words, the storage position of the image 508 is calculated using A1× ... ×A8. Meanwhile, where the storage position of the image 501 on the image memory 180 is determined as a reference, the storage position of the image 524 is calculated by multiplication of A1 to A8 and C1. In other words, the storage position of the image 501 is calculated using A1× ... ×A8×C1. Here, for example, where the storage position of the image 521 corresponding to the top frame of the dynamic picture 520 is to be calculated, it can be calculated by multiplication of A1 to A8 and C1 and an inverse matrix of B1 to B4. In other words, the storage position of the image 521 can be calculated using "A1× ... ×A8×C1×Inv(B1× ... ×B4)." Also the storage position of any other image which forms the dynamic picture 520 can be calculated using A1 to A8 and C1 and an inverse matrix of B1 to B4 or B5 to B7.

On the other hand, where an image which forms a dynamic picture other than the dynamic picture which includes the reference image is to be affine transformed, it is carried out using a matrix used for calculation of the storage position of the image corresponding to the top frame and affine transformation parameters associated with the image. For example, where the image 522 of the dynamic picture 520 is to be affine transformed, it is transformed with a matrix of "A1×...×A8×C1×Inv(B3×B4)" using a matrix B2 which corresponds to the image 522. Also where, for example, the image 523 of the dynamic picture 520 is to be affine transformed, it is transformed with the matrix of "A1× ... × A8×C1×Inv(B4)" similarly. Each image of the dynamic picture 520 is transformed similarly.

In the manner, where a plurality of dynamic pictures are to be synthesized and reproduced, after the position and the size of a reference image of one of the dynamic pictures on the image memory 180 is determined, the position and the size of each image can be calculated using metadata files individually associated with the dynamic pictures and relative relationship metadata files associated with the individual dynamic pictures. Therefore, where a plurality of dynamic pictures are to be synthesized and reproduced, it is possible to reproduce the dynamic pictures from any position. For example, an example wherein the image 521 which forms the dynamic picture 520 is synthesized after the images 501 to 504 which form the dynamic picture 500 are synthesized on the image memory 180 is illustrated in (d) of FIG. 32. In particular, the images 505 and 521 are synthesized simultaneously, and then the images 506 and 522 are synthesized simultaneously. Also thereafter, synthesis is carried out similarly. It is to be noted that, while this example illustrates an example wherein images reproduced at the same time are synthesized by overwriting the dynamic picture 520 on the dynamic picture 500, the dynamic picture to be overwritten may be designated through the operation acceptance section 165. Further, the display region is determined based on the current image of the reference dynamic picture.

Figure 33:
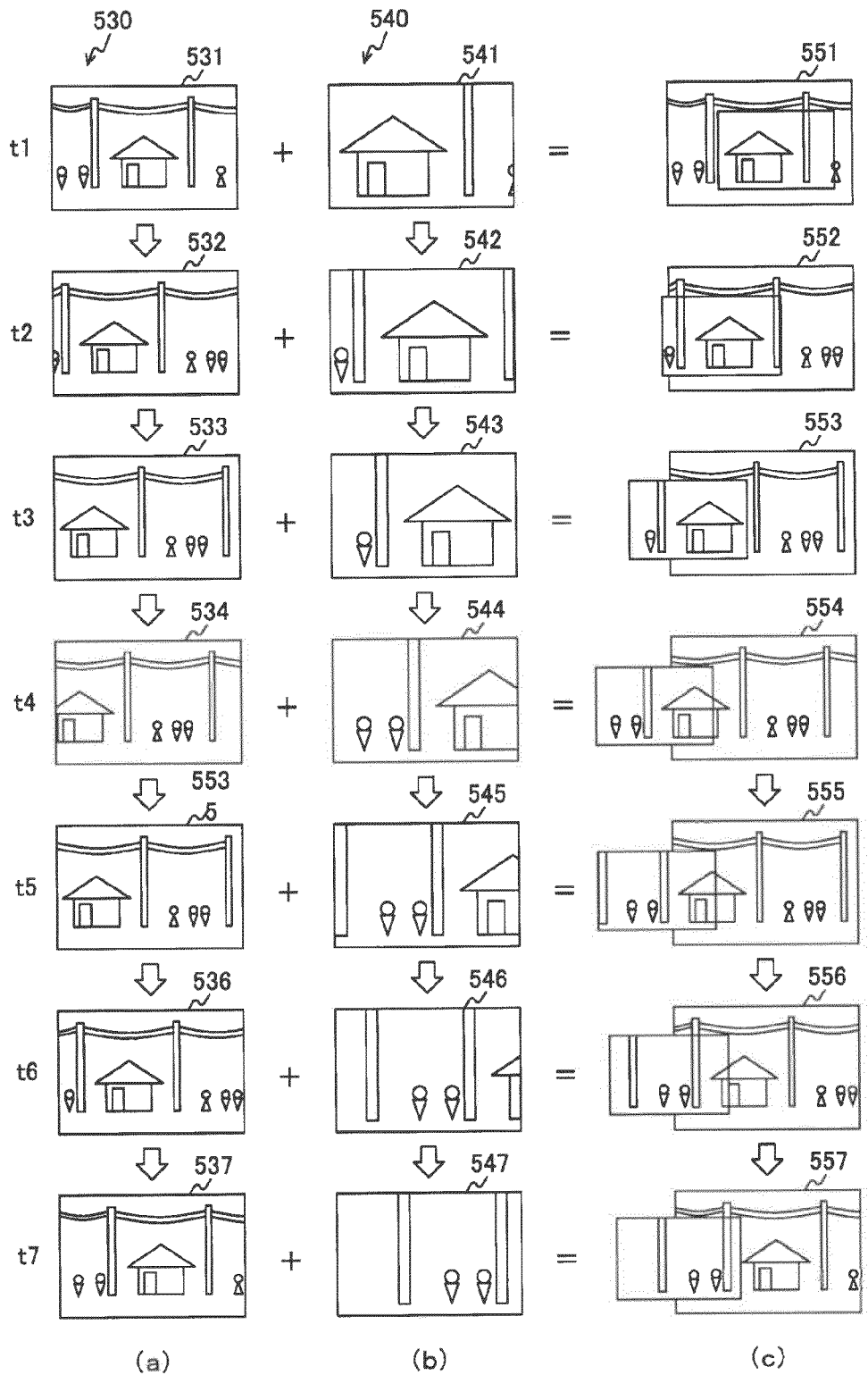
FIG. 33 is views schematically illustrating an example of synthesis where two dynamic pictures are synthesized.

FIG. 33 is views schematically illustrating an example of synthesis in a case wherein two dynamic pictures are synthesized. In (a) of FIG. 33, transition of images 531 to 537 which form a dynamic picture 530 is illustrated, and in (b) of FIG. 33, transition of images 541 to 547 which form another dynamic picture 540 is illustrated while (c) of FIG. 33 illustrates transition of images 551 to 557 which are synthesized images where the dynamic pictures 530 and 540 are synthesized. It is to be noted that it is assumed that the dynamic pictures 530 and 540 are dynamic pictures recorded at time t1 to time t7. Further, it is assumed that the images 533 and 543 at time t3 are images corresponding to the images 370 and 376 shown in FIG. 30 and a selection operation of coincident points shown in FIG. 30 has been carried out with regard to the images 533 and 543. Further, it is assumed that the dynamic pictures 530 and 540 are synthesized using relative relationship metadata calculated by the selection operation.

Figure 34:
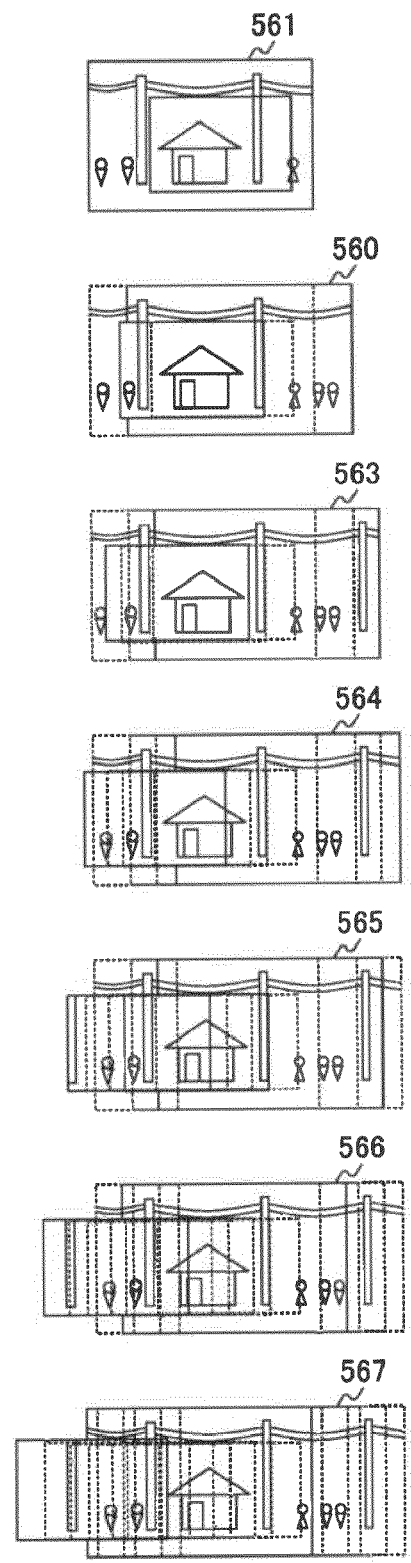
FIG. 34 is views illustrating display examples in a case wherein the synthesized image shown in FIG. 33 is displayed on a display section 250.

FIG. 34 is views illustrating an example of display in a case wherein the synthesized images shown in FIG. 33 are displayed on the display section 250. Images 561 to 567 are images representative of transition of the synthesized image synthesized from the dynamic pictures 530 and 540, and solid lines indicate a current image while broken lines indicate a region of each image preceding to the current image. As seen in FIG. 34, the background around the house 371 shown in FIG. 30 is displayed in an expanding fashion from the house 371. Where the dynamic pictures 530 and 540 picked up at a substantially same location are to be reproduced at the same time in this manner, by synthesizing the dynamic pictures 530 and 540, the two dynamic pictures can be reproduced and enjoyed while watching the background and so forth, which cannot usually be observed on an ordinary dynamic picture. Further, by synthesizing the dynamic pictures 530 and 540, the relative relationship of the image pickup locations of the dynamic pictures 530 and 540 can be grasped readily. While this example illustrates an example wherein, as regards images picked up at the same time, an image which forms the dynamic picture 540 is synthesized by overwriting on an image which forms the dynamic picture 530, which one of the images should be overwritten may be selected in response to an operation input from the operation acceptance section 165. Further, while an example wherein images of the same image pickup time are synthesized in accordance with the time has been described, this can be applied similarly also to a case wherein images of different time points are successively synthesized from a position corresponding to an operation input from the operation acceptance section 165.

While, in the foregoing description, an example wherein two dynamic pictures are reproduced while being synthesized using a relative relationship metadata file in which affine transformation parameters regarding the two dynamic pictures are stored is described, it is possible to store affine transformation parameters regarding three or more dynamic pictures in one relative relationship metadata file and use the affine transformation parameters to reproduce the three or more dynamic pictures while synthesizing them. In the following, an example wherein three or more dynamic pictures are reproduced while being synthesized is described in detail with reference to the drawings.

Figure 35:
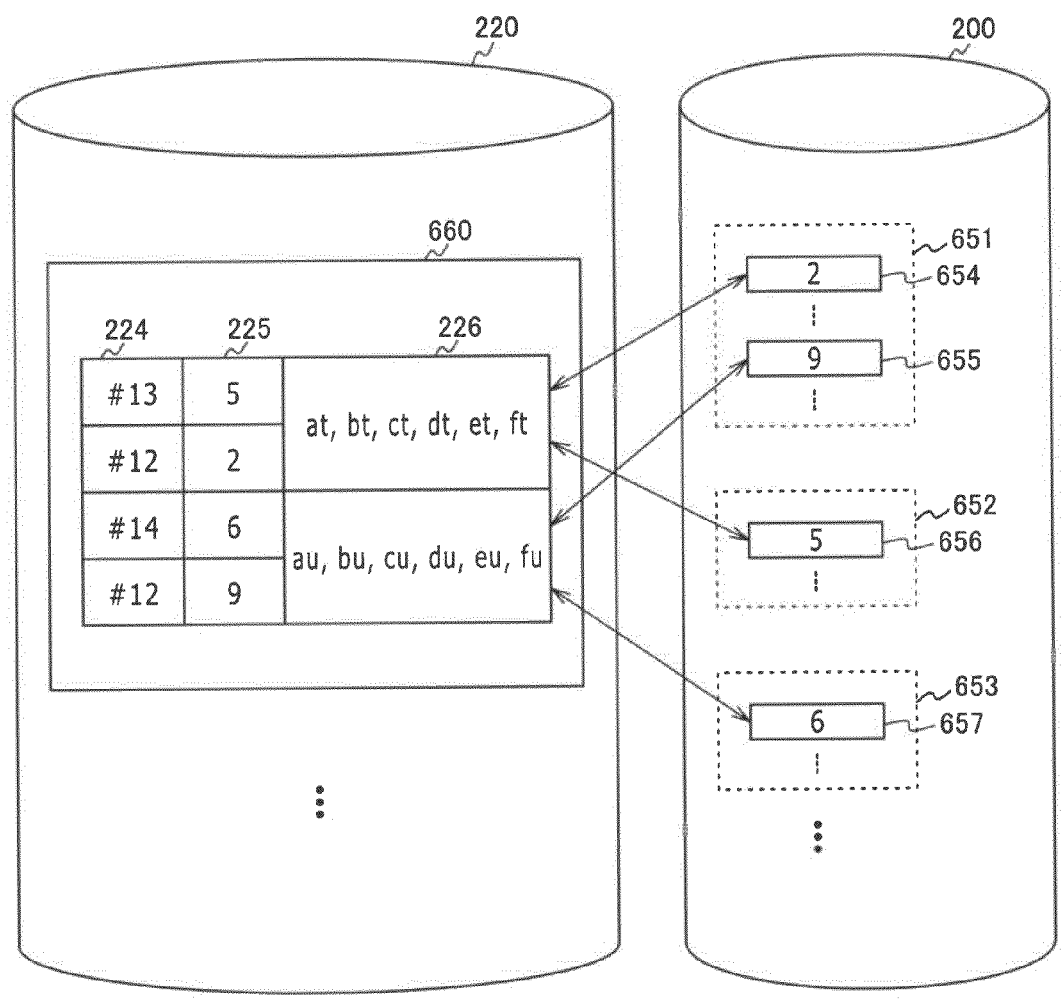
FIG. 35 is a view schematically illustrating files recorded in the dynamic picture storage section 200 and the relative relationship information storage section 220 in the embodiment of the present invention.

FIG. 35 is a view schematically showing files recorded in the dynamic picture storage section 200 and the relative relationship information storage section 220 in the embodiment of the present invention. FIG. 39 in this example is a view schematically showing dynamic picture files (#12) 651 to (#14) 653 stored in the dynamic picture storage section 200 and a relative relationship metadata file 660 stored in the relative relationship information storage section 220 in an associated relationship with the dynamic picture files (#12) 651 to (#14) 653. In this example, an example wherein affine transformation parameters regarding the three dynamic picture files (#12) 651 to (#14) 653 are stored in the one relative relationship metadata file 660 is described. It is to be noted that description of the configuration of the dynamic picture files stored in the dynamic picture storage section 200 is omitted here because the configuration is similar to that of the dynamic picture files shown in FIGS. 4 and 29 and so forth. Further, description of the configuration of the relative relationship metadata file stored in the relative relationship information storage section 220 is omitted here because the configuration is similar to that of the relative relationship metadata file shown in FIG. 29 except that affine transformation parameters regarding three or more dynamic pictures are stored in the one relative relationship metadata file.

In the relative relationship metadata file 660, a dynamic picture ID 224, a frame number 225 and an affine transformation parameter 226 are stored in an associated relationship with each other. Further, affine transformation parameters regarding a relative relationship of each two images among images which form the dynamic picture files (#12) 651 to (#14) 653 are stored in a relative relationship metadata file 630. In particular, affine transformation parameters "at, bt, ct, dt, et, ft" for calculating the position of the frame "5" 656 which forms the dynamic picture file (#13) 652 in a case wherein the frame "2" 654 which forms the dynamic picture file (#12) 651 is determined as a reference and affine transformation parameters "au, bu, cu, du, eu, fu" for calculating the position of the frame "6" 657 which forms the dynamic picture file (#14) 653 in a case wherein the frame "9" 655 which forms the dynamic picture file (#12) 651 is determined as a reference are stored in the relative relationship metadata file 630. Consequently, where three dynamic pictures are reproduced while being synthesized, the dynamic pictures can be reproduced with the relative relationship of the three dynamic pictures taken into consideration.

FIG. 36 is views showing images where coincident points included in images regarding three dynamic pictures are selected. It is to be noted that the images 370 and 376 shown in (a) and (b) of FIG. 36 are the same as the images 370 and 376 shown in (a) and (b) of FIG. 30, and it is assumed that the coincident points 1372 to 1374 and 1377 to 1379 are selected. Further, it is assumed that, in the image 376 shown in (b) of FIG. 36, as coincident points other than the coincident points 1372 to 1374, upper portions 671 to 673 of utility poles positioned on the right side of a house 371 are selected. It is assumed that, in an image 674 shown in (c) of FIG. 36, upper portions 675 to 677 of the utility posts are selected. It is to be noted that description of the selection of a coincident point on the images shown in (a) to (c) of FIG. 36 and the calculation of an affine transformation parameter is omitted here because they are similar to that of the method illustrated in FIG. 30.

Figure 37:
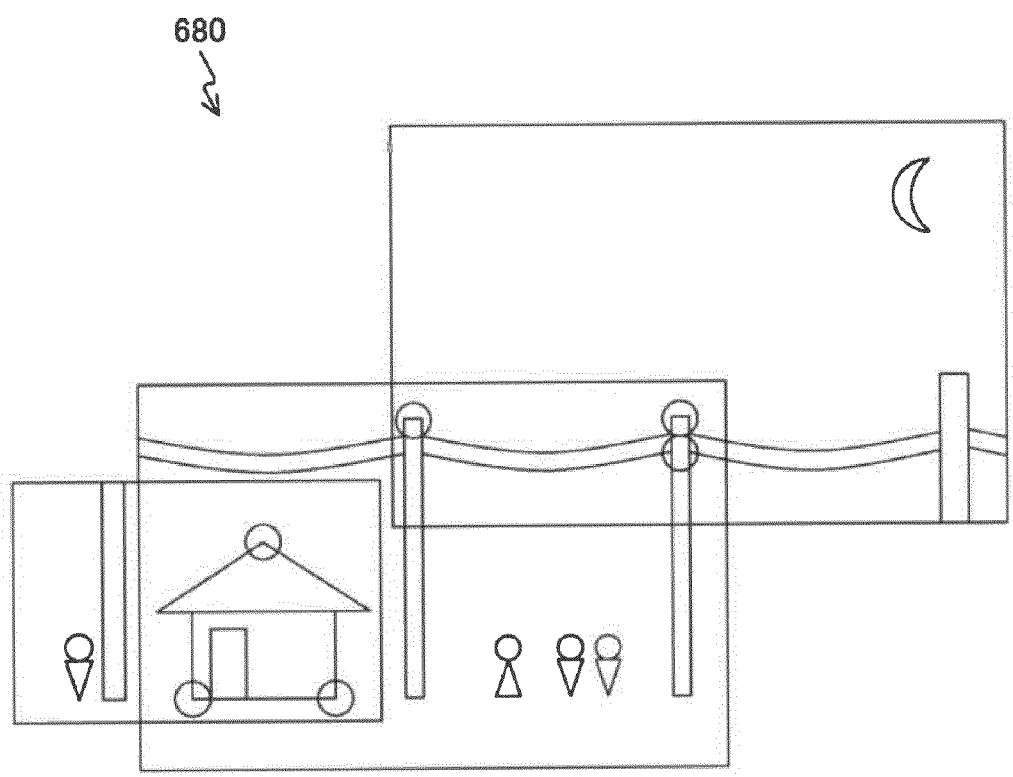
FIG. 37 is a view showing an example in a case wherein the three images are synthesized based on the coincident points selected on the images regarding the three dynamic pictures.

FIG. 37 is a view showing an example of a case wherein three images are synthesized based on coincident points selected on an image regarding three dynamic pictures. FIG. 37 shows a synthesized image 680 synthesized through affine transformation of the images 370, 376 and 674 using affine transformation parameters calculated based on coincident points selected on the images 370, 376 and 674 shown in (a) to (c) of FIG. 36. By synthesizing three dynamic pictures using calculated affine transformation parameters in this manner, the synthesized image 680 in which the background around the house 371 is included over a greater range than that of the background in each image is produced.

Figure 38:
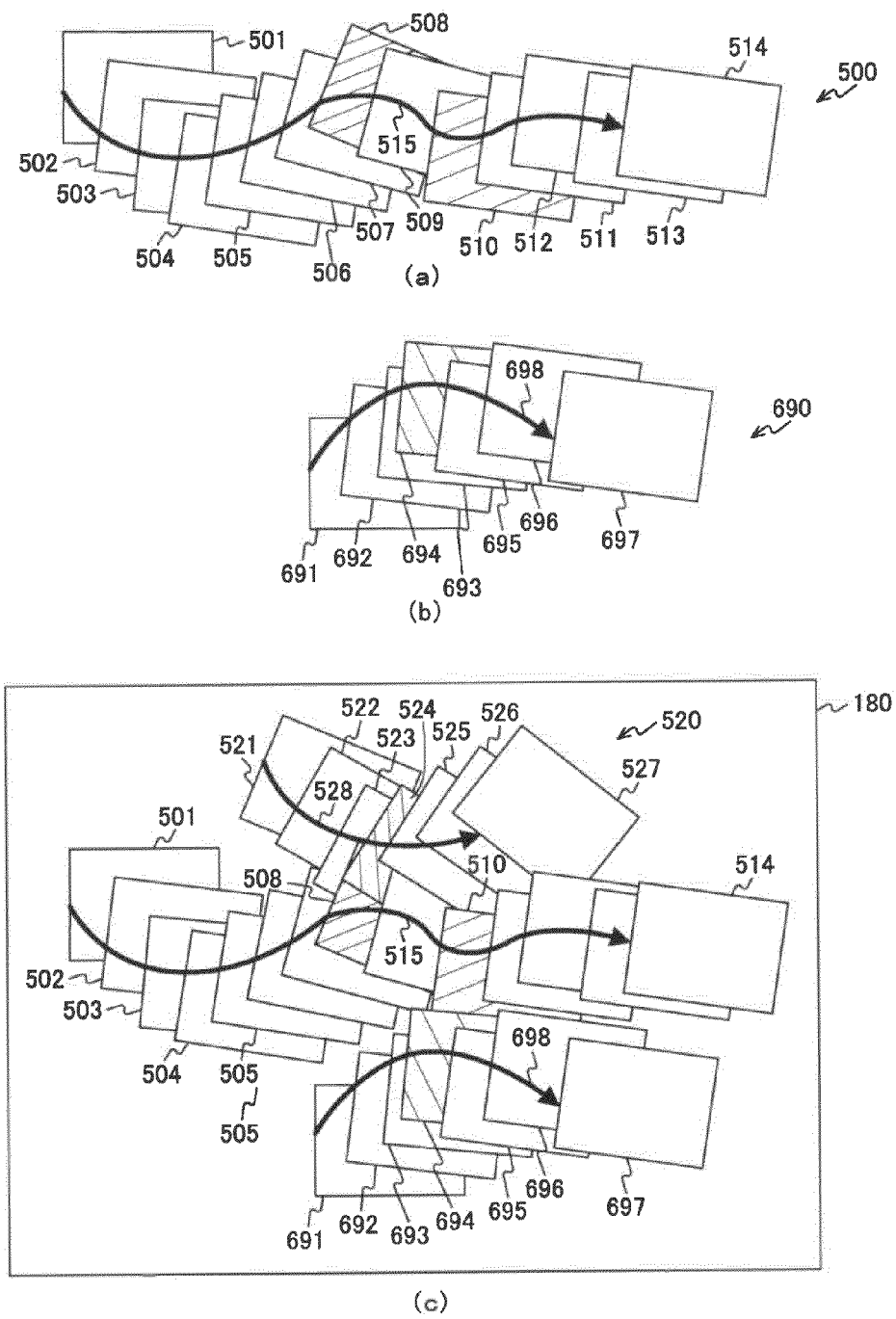
FIG. 38 is views schematically illustrating an example of synthesis where three dynamic pictures are synthesized.

FIG. 38 is views schematically illustrating an example of synthesis in a case wherein three dynamic pictures are synthesized. In this example, a case wherein images 501 to 514 which form a dynamic picture 500, images 521 to 527 which form another dynamic picture 520 and images 691 to 697 which form a further dynamic picture 690 are synthesized is described. It is to be noted that description of the images 501 to 514 which form the dynamic picture 500 and the images 521 to 527 which form the dynamic picture 520 is omitted here because they are the same as those shown in FIG. 32. Further, it is assumed that the images 508 and 524 indicated by slanting lines applied in the inside thereof are images corresponding to frame numbers included in the relative relationship metadata regarding the dynamic pictures 500 and 520, and similarly, the images 510 and 694 indicated by slanting lines applied in the inside thereof are images corresponding to frame numbers included in the relative relationship metadata regarding the dynamic pictures 500 and 690. The dynamic picture 500 shown in (a) of FIG. 38 is similar to the dynamic picture 500 shown in FIG. 32 except the image 510 indicated by slanting lines applied in the inside thereof.

(b) of FIG. 38 illustrates a case wherein the images 691 to 697 which form the dynamic picture 690 are successively affine transformed using affine transformation parameters stored in an associated relationship with individual frames and then are synthesized on the image memory 180. Here, the synthesized image shown in (b) of FIG. 38 is that in a case wherein the images 691 to 697 are synthesized with reference to relative relationship positions of the image 510 and the image 694. A flow of the current image by affine transformation in this instance is indicated by an arrow mark 698. In other words, the images 691 to 697 are successively synthesized along the arrow mark 698. An example of synthesis in a case wherein the synthesized image shown in (a) of FIG. 38, the synthesized image shown in (b) of FIG. 38 and the synthesized image shown in (b) of FIG. 32 are synthesized in this manner with reference to the relative relationship positions of the image 510 and the image 694 is shown in (c) of FIG. 38. It is to be noted that, in the example shown in (c) of FIG. 38, an example wherein the images 508 and 524 are reproduced at the same time and the images 510 and 694 are reproduced at the same time is illustrated, and an example wherein the images reproduced at the same time are synthesized such that the dynamic picture 520 is overwritten on the dynamic picture 500 and the dynamic picture 690 is overwritten on the dynamic picture 500 is illustrated. It is to be noted that, for a calculation method regarding particular storage positions of the dynamic pictures, a calculation method similar to the calculation method illustrated in FIG. 32 can be used. It is to be noted that, even in a case wherein relative relationship metadata regarding a plurality of dynamic pictures which make an object of reproduction does not exist, it is possible to use relative relationship metadata regarding other dynamic pictures to synthesize and reproduce the plural dynamic pictures of an object of reproduction. For example, where the dynamic picture 520 and the dynamic picture 690 from among the dynamic picture 500, dynamic picture 520 and dynamic picture 690 shown in (c) of FIG. 38 are to be synthesized, relative relationship metadata regarding the dynamic pictures 500 and 520 and relative relationship metadata regarding the dynamic pictures 500 and 690 can be used to calculate the position of any other dynamic picture where one of the dynamic picture 520 and the dynamic picture 690 is determined as a reference dynamic picture. For example, where the dynamic picture 520 is determined as a reference dynamic picture, the position of the image 508 which forms the dynamic picture 500 can be calculated using the relative relationship positions of the image 508 and the image 524. Further, the position of the image 510 can be calculated based on the image 508. Then, the position of the images which form the dynamic picture 690 in the case wherein the image 510 is determined as a reference can be calculated using the relative relationship positions of the image 510 and the image 694. In this manner, also the dynamic picture 520 and the dynamic picture 690 which do not have common relative relationship metadata can be synthesized and reproduced through the dynamic picture 500. This can be applied similarly also to a case wherein a plurality of dynamic pictures are synthesized and reproduced through two or more dynamic pictures.

FIG. 39 is views illustrating an example in a case wherein a still picture and a plurality of dynamic pictures are synthesized. (a) of FIG. 39 is a view illustrating a case wherein images 701 to 718 which are still pictures are stored in the image memory 180, and (b) of FIG. 39 is a view illustrating a case wherein dynamic pictures 500, 520 and 690 are synthesized by overwriting on the images 701 to 718 stored in the image memory 180. In the figures, framework lines of the images 701 to 718 are indicated by a thick line. As shown in the figures, still pictures can be synthesized together with a plurality of dynamic pictures. In this instance, affine transformation parameters regarding a relative relationship between the still pictures and at least one image which forms the dynamic pictures are stored as a relative relationship metadata file, and this relative relationship metadata file is used to carry out synthesis. Further, still pictures may be synthesized between images which form dynamic pictures, or still pictures may be synthesized on dynamic pictures.

Further, the image pickup apparatus 101 according to the embodiment of the present invention may be connected to a network such as the Internet such that dynamic pictures may be reproduced in combination with an image or a dynamic picture received through the network. For example, the image pickup apparatus 101 can receive a landscape image of a predetermined park through the Internet and reproduce a dynamic picture, in which an image of a child is picked up, while synthesizing the same on a background image which is the received landscape image of the park. By this, such an artificial reproduction image that the child moves in the park can be provided.

Now, a case wherein a characteristic point extraction process and an optical flow calculation process are carried out by a multi-core processor in the embodiment of the present invention is described in detail with reference to the drawings.

Figure 40:
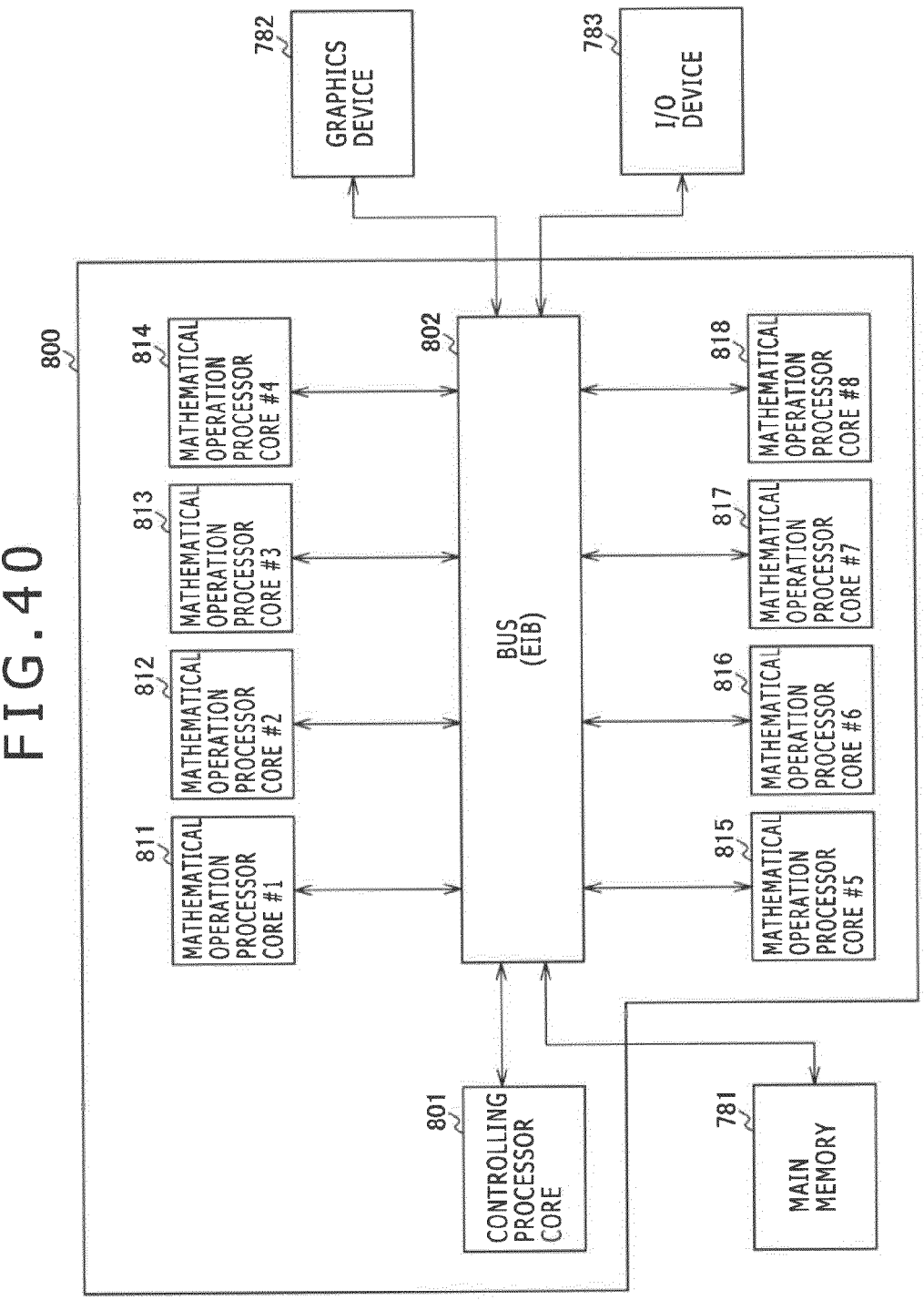
FIG. 40 is a view showing an example of a configuration of a multi-core processor 800 in the embodiment of the present invention.

FIG. 40 is a view showing an example of a configuration of a multi-core processor 800 in the embodiment of the present invention. The multi-core processor 800 is a processor wherein a plurality of processor cores of different types are incorporated in one CPU (Central Processing Unit) package. In particular, the multi-core processor 800 incorporates a plurality of processor cores of two different types including cores of one type corresponding to all uses (applications) and cores of another type optimized to some degree for a predetermined application in order to maintain the processing performance of each processor core item and achieve a simple configuration.

The multi-core processor 800 includes a controlling processor core 801, mathematical operation processor cores (#1) 811 to (#8) 818, and a bus 802, and is connected to a main memory 781. Further, the multi-core processor 800 is connected to other devices such as, for example, a graphics device 782 and an I/O device 783. As the multi-core processor 800, for example, the "Cell (cell: Cell Broadband Engine)" which is a microprocessor which has been developed by the assignee of the present invention and so forth can be adopted.

The controlling processor core 801 is a controlling processor core which principally carries out frequent thread changeover of an operating system or the like. It is to be noted that the controlling processor core 801 is described in detail with reference to FIG. 41.

The mathematical operation processor cores (#1) 811 to (#8) 818 are simple and small-sized mathematical operation processor cores which are good at processing of the multimedia type. It is to be noted that the mathematical operation processor cores (#1) 811 to (#8) 818 are described in detail with reference to FIG. 42.

The bus 802 is a high-speed bus called EIB (Element Interconnect Bus), and the controlling processor core 801 and the mathematical operation processor cores (#1) 811 to (#8) 818 are connected to each other by the bus 802 such that data accessing by each processor core is carried out through the bus 802.

The main memory 781 is connected to the bus 802 and is a main memory which stores various programs to be loaded into the processor cores and data necessary for processing of the processor cores and stores data processed by the processor cores.

The graphics device 782 is a graphics device connected to the bus 802, and the I/O device 783 is an external inputting/outputting device connected to the bus 802.

Figure 41:
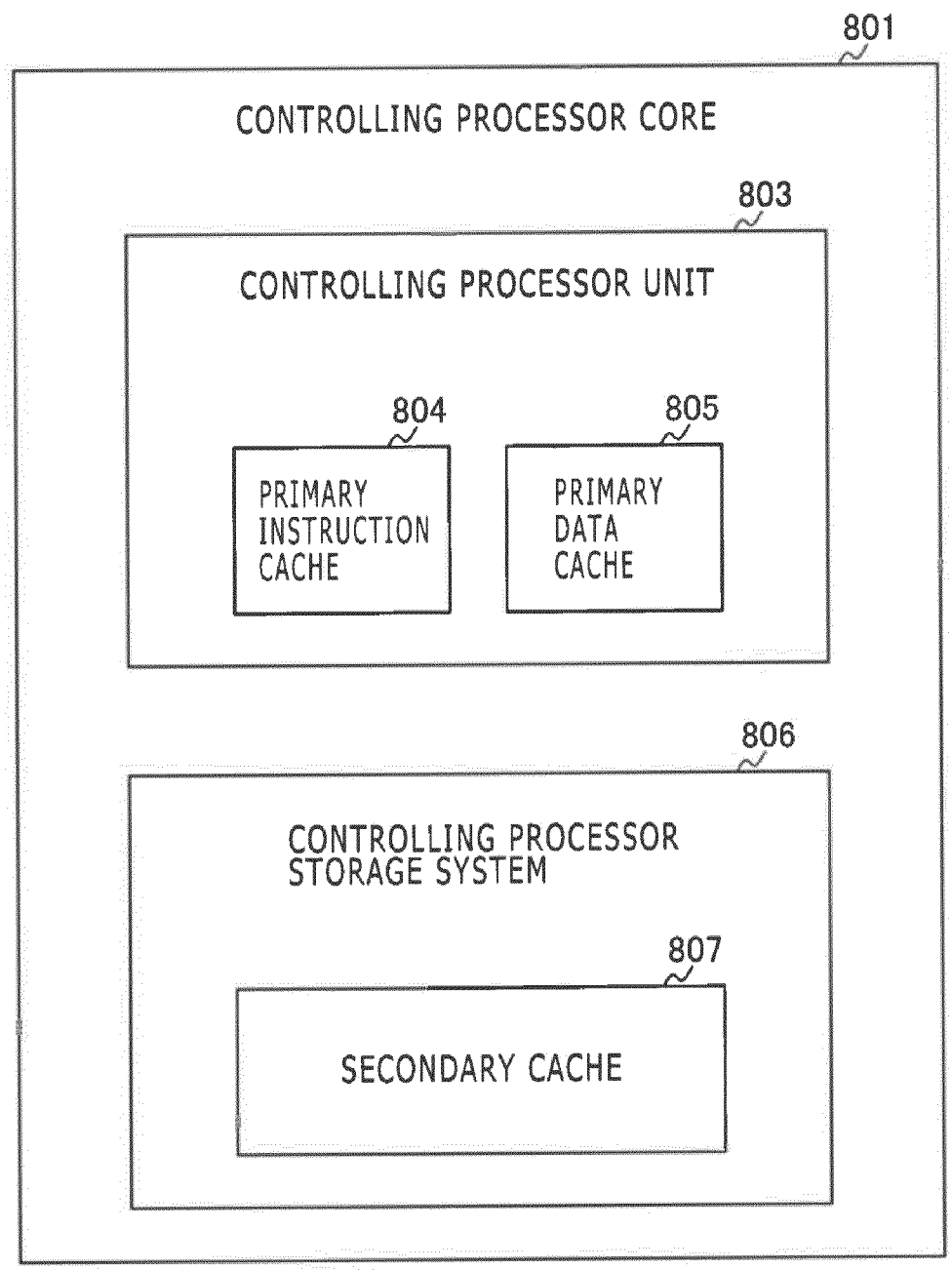
FIG. 41 is a view showing an example of a configuration of a controlling processor core 801 in the embodiment of the present invention.

FIG. 41 is a view showing an example of a configuration of the controlling processor core 801 in the embodiment of the present invention. The controlling processor core 801 includes a controlling processor unit 803 and a controlling processor storage system 806.

The controlling processor unit 803 is a unit which serves as a core for carrying out a mathematical operation process of the controlling processor core 801 and includes an instruction set based on an architecture of a microprocessor, and an instruction cache 804 and a data cache 805 are incorporated as primary caches in the controlling processor unit 803. The instruction cache 804 is an instruction cache of, for example, 32 KB, and the data cache 805 is a data cache of, for example, 32 KB.

The controlling processor storage system 806 is a unit for controlling data accessing to the main memory 781 from the controlling processor unit 803, and a secondary cache 807 of 512 KB is incorporated in the controlling processor storage system 806 in order to speed up memory accessing from the controlling processor unit 803.

Figure 42:
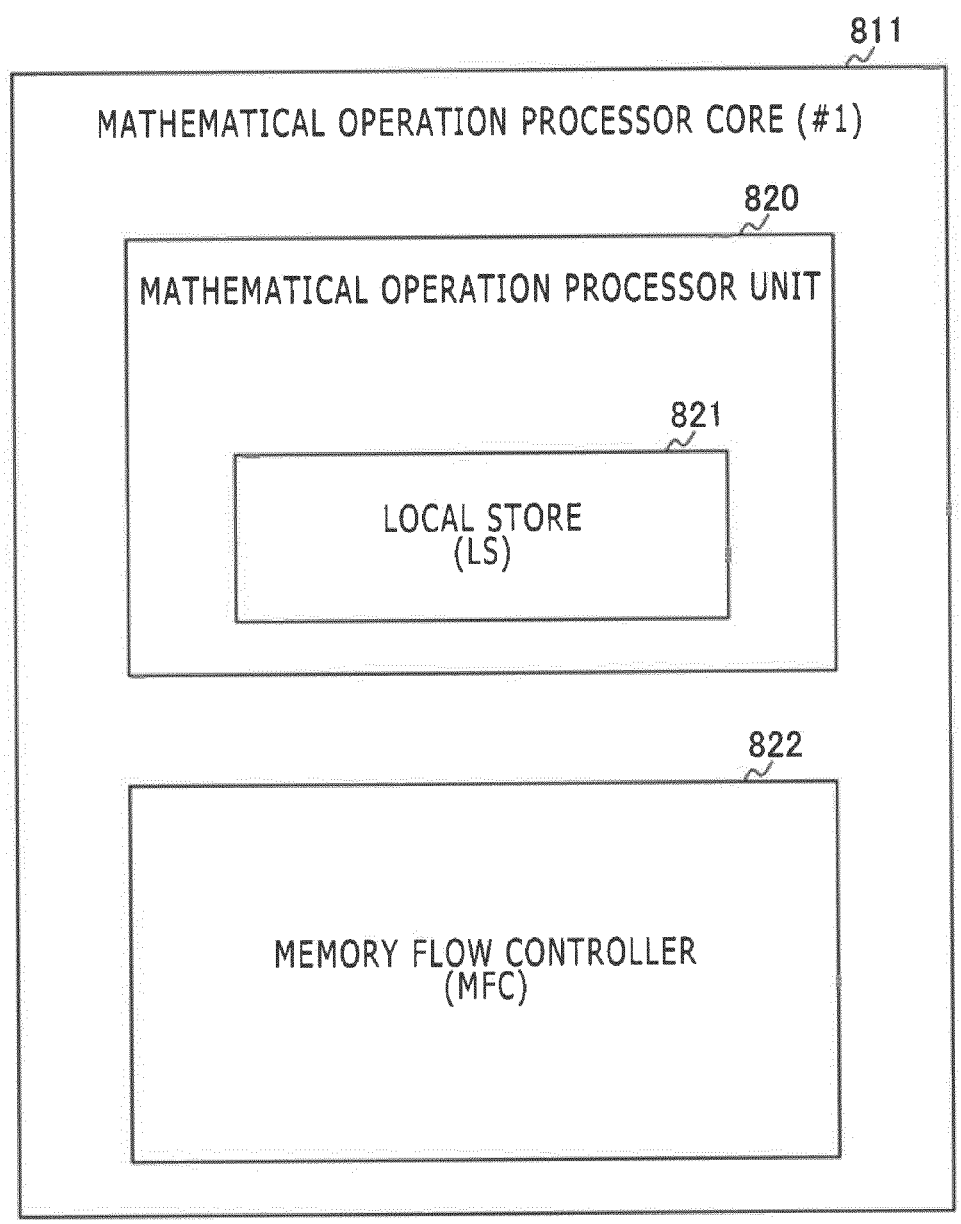
FIG. 42 is a view showing an example of a configuration of a mathematical operation processor core (#1) 811 in the embodiment of the present invention.

FIG. 42 is a view showing an example of a configuration of the mathematical operation processor core (#1) 811 in the embodiment of the present invention. The mathematical operation processor core (#1) 811 includes a mathematical operation processor unit 820 and a memory flow controller 822. It is to be noted that description of the mathematical operation processor cores (#2) 812 to (#8) 818 is omitted here because they have a configuration similar to that of the mathematical operation processor core (#1) 811.

The mathematical operation processor unit 820 is a unit which serves as a core for carrying out a mathematical operation process of the mathematical operation processor core (#1) 811 and includes a unique instruction set different from that of the controlling processor unit 803 of the controlling processor core 801. Further, a local store (LS: Local Store) 821 is incorporated in the mathematical operation processor unit 820.

The local store 821 is a memory for exclusive use for the mathematical operation processor unit 820 and is only one memory which can be referred to directly from the mathematical operation processor unit 820. As the local store 821, for example, a memory having a capacity of, for example, 256 Kbytes can be used. It is to be noted that, in order for the mathematical operation processor unit 820 to access a local store on the main memory 781 or the other mathematical operation processor cores (mathematical operation processor cores (#2) 812 to (#8) 818), it is necessary to utilize the memory flow controller 822.

The memory flow controller 822 is a unit for transferring data to and from the main memory 781, the other mathematical operation processor cores and so forth, and is a unit called MFC (Memory Flow Controller). Here, the mathematical operation processor unit 820 issues a request for data transfer or the like to the memory flow controller 822 through an interface called channel.

As a programming model of the multi-core processor 800 described above, various programming models have been proposed. As the most basic model among the programming models, a model wherein a main program is executed on the controlling processor core 801 and sub programs are executed on the mathematical operation processor cores (#1) 811 to (#8) 818 is known. In the embodiment of the present invention, a mathematical operation method of the multi-core processor 800 which uses this model is described in detail with reference to the drawings.

Figure 43:
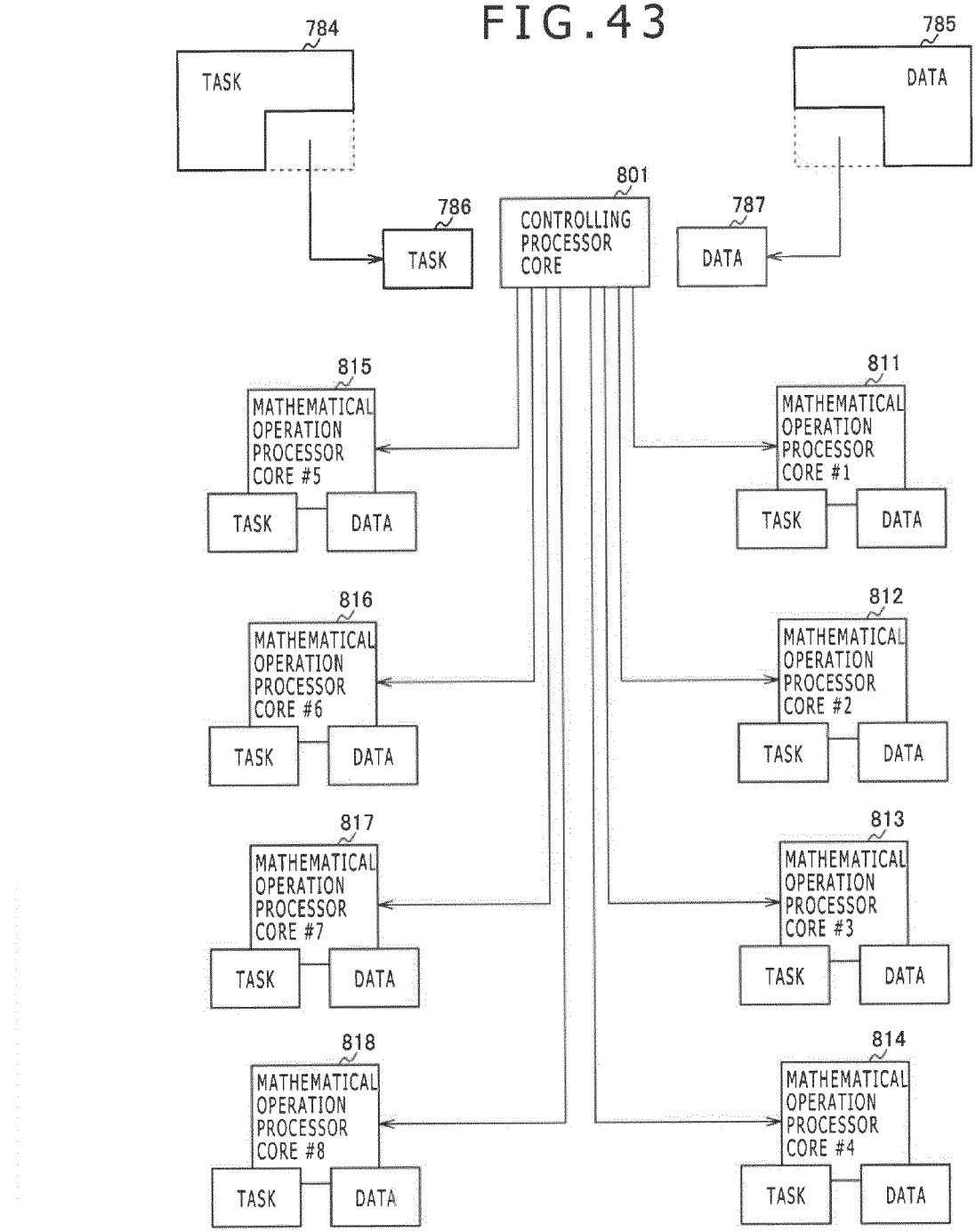
FIG. 43 is a view schematically illustrating a mathematical operation method of the multi-core processor 800 in the embodiment of the present invention.

FIG. 43 is a view schematically illustrating a mathematical operation method of the multi-core processor 800 in the embodiment of the present invention. In this example, a case wherein, where the controlling processor core 801 executes a task 784 using data 785, it uses data 787 (part of the data 785) necessary for processing of the task 784 which is part of the task 784 is described as an example.

As shown in the figure, where the controlling processor core 801 executes the task 784 using the data 785, it causes the mathematical operation processor cores to execute a task 786 using the data 787 (part of the data 785) necessary for processing of the task 786 which is part of the task 784. In the embodiment of the present invention, a mathematical operation process is carried out by each mathematical operation processor core for each of frames which form a dynamic picture.

Where the multi-core processor 800 carries out mathematical operation in such a manner as illustrated in the figure, a large amount of mathematical operation can be carried out in comparatively short time making use of the mathematical operation processor cores (#1) 811 to (#8) 818 in parallel, and a comparatively great number of mathematical operation processes can be carried out with a further reduced number of instructions making use of SIMD (Single Instruction/Multiple Data: single instruction/multiple data) mathematical operation on the mathematical operation processor cores (#1) 811 to (#8) 818. It is to be noted that the SIMD mathematical operation is described in detail with reference to FIGS. 47 to 50 and so forth.

Figure 44:
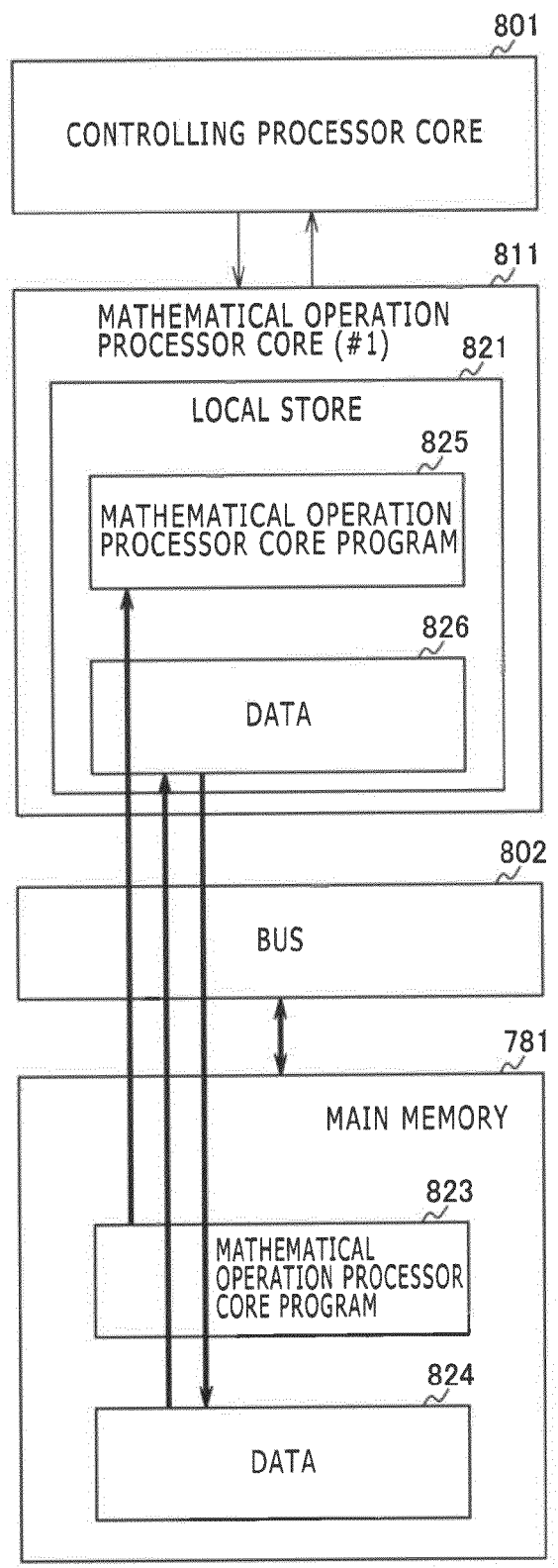
FIG. 44 is a view schematically illustrating flows of a program and data where mathematical operation is carried out by the multi-core processor 800 in the embodiment of the present invention.

FIG. 44 is a view schematically illustrating flows of programs and data in a case wherein mathematical operation is carried out by the multi-core processor 800 in the embodiment of the present invention. Here, while description is given taking the mathematical operation processor core (#1) 811 from among the mathematical operation processor cores (#1) 811 to (#8) 818 as an example, such mathematical operation as described above can be carried out similarly also by the mathematical operation processor cores (#2) 812 to (#8) 818.

First, the controlling processor core 801 sends an instruction to load a mathematical operation processor core program 823 stored in the main memory 781 into the local store 821 of the mathematical operation processor core (#1) 811 to the mathematical operation processor core (#1) 811. Consequently, the mathematical operation processor core (#1) 811 loads the mathematical operation processor core program 823 stored in the main memory 781 into the local store 821.

Then, the controlling processor core 801 issues an instruction to execute a mathematical operation processor core program 825 stored in the local store 821 to the mathematical operation processor core (#1) 811.

Thereafter, the mathematical operation processor core (#1) 811 transfers data 824 necessary for an execution process of the mathematical operation processor core program 825 stored in the local store 821 from the main memory 781 to the local store 821.

Then, the mathematical operation processor core (#1) 811 works data 826 transferred from the main memory 781 based on the mathematical operation processor core program 825 stored in the local store 821, executes a process in accordance with a condition and stores a result of the process into the local store 821.

Then, the mathematical operation processor core (#1) 811 transfers a result of the process executed based on the mathematical operation processor core program 825 stored in the local store 821 from the local store 821 to the main memory 781.

Thereafter, the mathematical operation processor core (#1) 811 issues a notification of an end of the mathematical operation process to the controlling processor core 801.

Now, SIMD mathematical operation carried out using the multi-core processor 800 is described in detail with reference to the drawings. Here, the SIMD mathematical operation is a mathematical operation method wherein a process for a plurality of data is carried out by one instruction.

(a) of FIG. 45 is a view schematically illustrating an outline of the mathematical operation method wherein a instruction for a plurality of data is carried out by an operation for each of the data. The mathematical operation method illustrated in (a) of FIG. 45 is an ordinary mathematical operation method and is called, for example, scalar mathematical operation. For example, a processing result of data "C1" is determined by an instruction to add data "A1" and data "B1." Also with regard to the other three mathematical operations, an instruction to add data "A2," "A3" and "A4" and data "B2," "B3" and "B4" in the same rows is carried out for each process similarly, and by this instruction, the values in the individual rows are subjected to addition processing and results of the processing are determined as data "C2," "C3" and "C4." In this manner, in the scalar mathematical operation, as regards processing for a plurality of data, it is necessary to carry out an instruction for each of them.

(b) of FIG. 45 is a view schematically illustrating an outline of the SIMD mathematical operation which is a mathematical operation method wherein a process for a plurality of data is carried out by a single instruction. Here, data brought together for SIMD mathematical operation (data surrounded by each of broken lines 827 and 828) are sometimes called vector data. Further, SIMD mathematical operation carried out using such vector data is sometimes called vector mathematical operation.

For example, by one instruction to add vector data "A1," "A2," "A3" and "A4" surrounded by the broken line 827 and vector data "B1," "B2," "B3" and "B4" surrounded by the broken line 828, processing results of "C1," "C2," "C3" and "C4" (data surrounded by a further broken line 829) are determined. Since, in the SIMD mathematical operation, a process for a plurality of data can be carried out by a single instruction in this manner, a mathematical operation process can be carried out rapidly. Further, the instruction regarding the SIMD mathematical operations is issued by the controlling processor core 801 of the multi-core processor 800, and the mathematical operation process of the plural data according to the instruction is carried out in parallel by the mathematical operation processor cores (#1) 811 to (#8) 818.

On the other hand, for example, processing to add the data "A1" and "B1," subtract the data "A2" and "B2," multiply by the data "A3" and "B3" and divide by the data "A4" and "B4" cannot be carried out by the SIMD mathematical operation. In other words, where different processes are to be carried out individually for a plurality of data, processing by the SIMD mathematical operation cannot be carried out.

Now, a particular mathematical operation method of the SIMD mathematical operation in a case wherein the characteristic point extraction process and the optical flow calculation process are carried out is described in detail with reference to the drawings.

Figure 46:
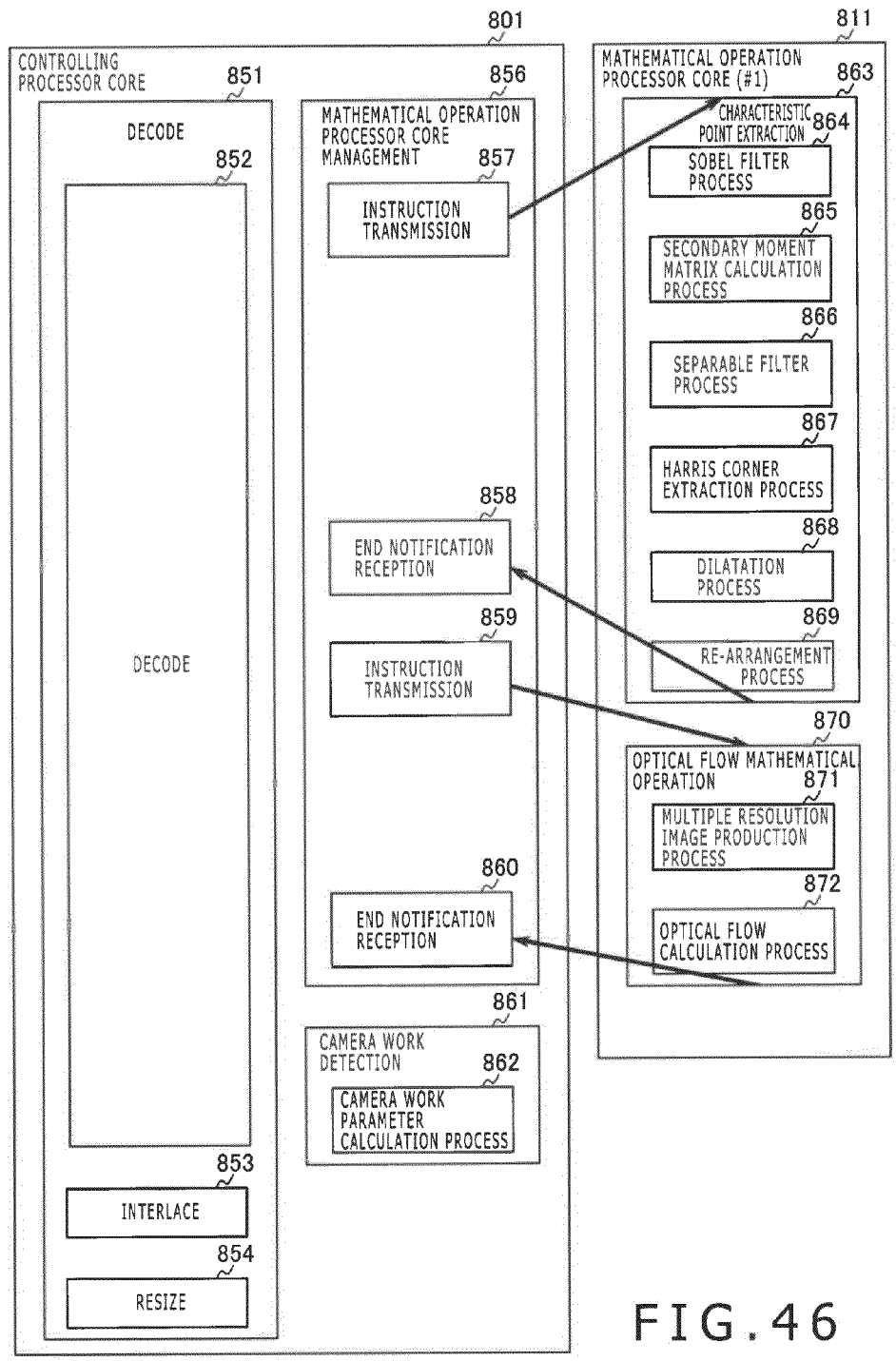
FIG. 46 is a view showing an example of a configuration of a program executed by the controlling processor core 801 or the mathematical operation processor core (#1) 811 in the embodiment of the present invention.

FIG. 46 is a view showing an example of a configuration of a program executed by the controlling processor core 801 or the mathematical operation processor core (#1) 811 in the embodiment of the present invention. While processing only by the mathematical operation processor core (#1) 811 is illustrated here, similar processing is carried out also by the mathematical operation processor cores (#2) 812 to (#8) 818.

The controlling processor core 801 executes, as a decode 851, a decode 852, an interlace 853 and a resize 854. The decode 852 is a process of decoding a dynamic picture file. The interlace 853 is a process of deinterlacing decoded frames. The resize 854 is a process of reducing the deinterlaced frames.

Further, the controlling processor core 801 executes, as mathematical operation processor core management 856, instruction transmission 857 and 859 and end notification reception 858 and 860. The instruction transmission 857 and 859 is a process of transmitting an execution instruction of SIMD mathematical operation to the mathematical operation processor cores (#1) 811 to (#8) 818, and the end notification reception 858 and 860 is a process of receiving an end notification of SIMD mathematical operation from the mathematical operation processor cores (#1) 811 to (#8) 818 responsive to the instruction described above. Further, the controlling processor core 801 executes, as camera work detection 861, a camera work parameter calculation process 862. The camera work parameter calculation process 862 is a process of calculating affine transformation parameters for each frame based on optical flows calculated by SIMD mathematical operation by the mathematical operation processor cores (#1) 811 to (#8) 818.

The mathematical operation processor core (#1) 811 executes, as a characteristic point extraction process 863, a Sobel filter (Sobel Filter) process 864, a second moment matrix (Second Moment Matrix) calculation process 865, a separable filter (Separable Filter) process 866, a Harris corner extraction (Calc Harris) process 867, a dilation process (Dilation) 868 and a re-arrangement section (Sort) 869.

The Sobel filter process 864 is a process of calculating a value dx in the x direction obtained using a filter of P2 (x direction) and a value dy in the y direction obtained using a filter in the Y direction. It is to be noted that the calculation of the value dx in the x direction is described in detail with reference to FIGS. 47 to 50.

The second moment matrix calculation process 865 is a process of calculating the values of $dx^2$, $dy^e$ and $dx \cdot dy$ using dx and dy calculated by the Sobel filter process 864.

The separable filter process 866 is a process of applying a Gaussian filter (shading process) to images of $dx^2$, $dy^2$ and $dx \cdot dy$ calculated by the second moment matrix calculation process 865.

The Harris corner extraction process 867 is a process of calculating a score of the Harris corner using the values of $dx^2$, $dy^2$ and $dx \cdot dy$ for which the shading process has been carried out by the separable filter process 866. The score S of the Harris corner is calculated, for example, in accordance with the following expression:

$$S=(dx^2 \times dy^2 - dx \cdot dy \times dx \cdot dy)/(dx^2+dy^2+\epsilon)$$

The dilation process 868 is a process of carrying out a shading process for an image configured with the score of the Harris corner calculated by the Harris corner extraction process 867.

The re-arrangement process 869 is a process of arranging pixels in the descending order of the Harris corner calculated by the Harris corner extraction process 867, picking up a predetermined number of the pixels having comparatively high scores and extracting the picked up points as characteristic points.

The mathematical operation processor core (#1) 811 executes, as an optical flow (Optical Flow) mathematical operation process 870, a multiple resolution image production (Make Pyramid Image) process 871 and an optical flow calculation (Calc Optical Flow) process 872. The multiple resolution image production process 871 is a process of successively producing images reduced to a predetermined number of stages from a picture size upon image pickup by an image pickup apparatus, and a produced image is called multiple resolution image.

The optical flow calculation process 872 is a process of calculating optical flows regarding the smallest image from among multiple resolution images produced by the multiple resolution image production process 871 and calculating optical flows again regarding an image of a resolution higher by one rank using a result of the calculation, and the series of processes is carried out repetitively until the largest image is reached.

In this manner, for example, as regards the characteristic point extraction process carried out by the characteristic point extraction unit 121 shown in FIG. 3 and so forth and the optical flow calculation process carried out by the optical flow calculation unit 122, a processing result can be determined by parallel processing by SIMD mathematical operation using the multi-core processor 800. It is to be noted that the characteristic point extraction process and the optical flow calculation process illustrated in FIG. 46 and so forth are an example, and SIMD mathematical operation by the multi-core processor 800 may be carried out using some other process which is configured from various filter processes, threshold value processes and so forth for images which form a dynamic picture.

FIG. 47 is a view schematically illustrating a data structure and a flow of processes in a case wherein a filtering process is carried out using the Sobel filter 830 for image data stored in the main memory 781 in the embodiment of the present invention (image data corresponding to one frame which forms a dynamic picture picked up by an image pickup apparatus). It is to be noted that image data stored in the main memory 781 in the figure are illustrated in a simplified form wherein the number of pixels in the horizontal direction is 32. Further, the Sobel filter 830 is a 3×3 edge extraction filter. As shown in the figure, a filtering process using the Sobel filter 830 is carried out for image data stored in the main memory 781, and a result of the filtering process is outputted. In this example, an example wherein four filtering results are obtained at a time using SIMD mathematical operation is described.

Figure 48:
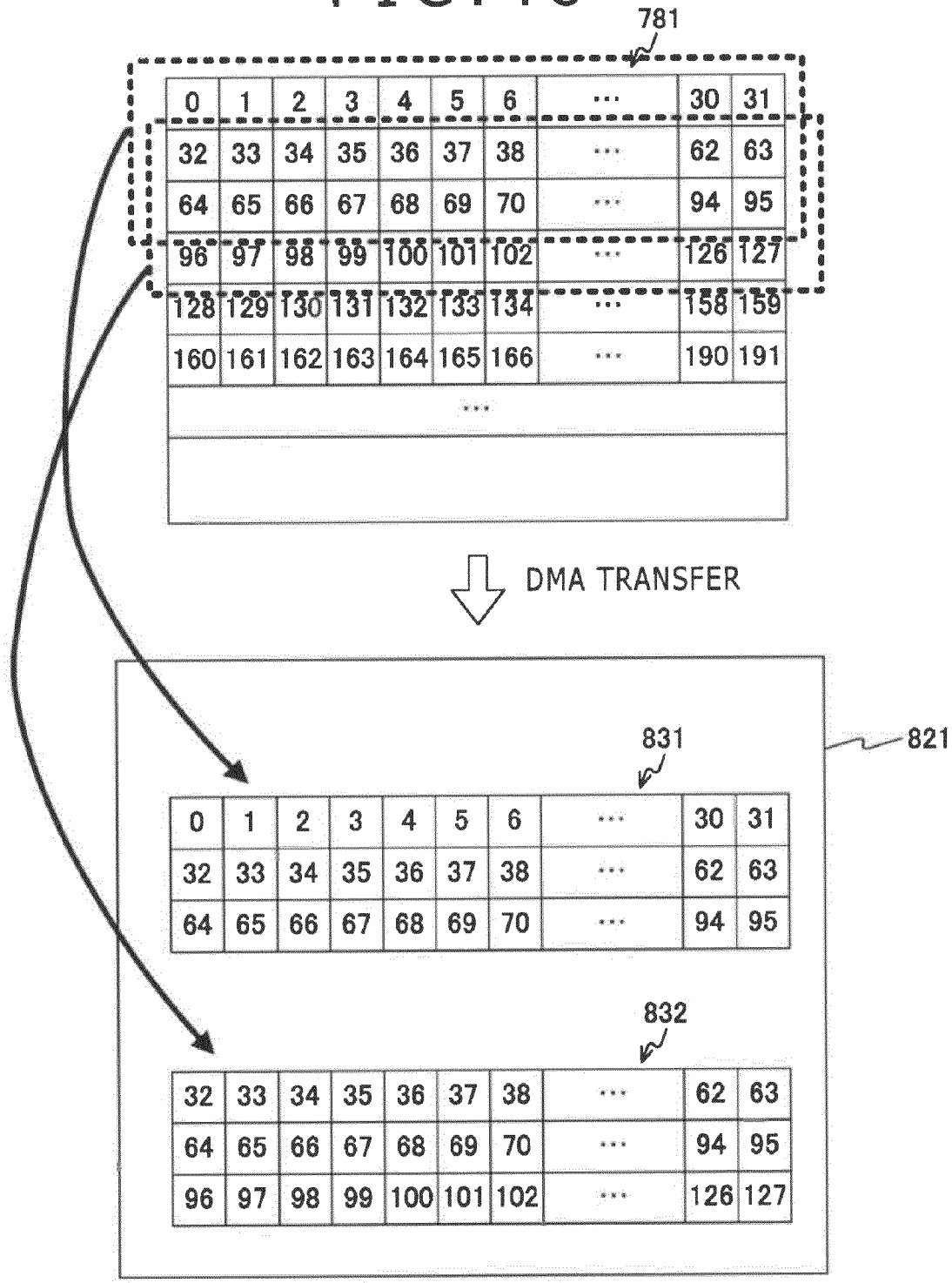
FIG. 48 is a view schematically illustrating a flow of data where SIMD mathematical operation is carried out for image data stored in the main memory 781 in the embodiment of the present invention using the Sobel filter 830.

FIG. 48 is a view schematically illustrating flows of data in a case wherein SIMD mathematical operation is carried out using the Sobel filter 830 for image data stored in the main memory 781 in the embodiment of the present invention. First, a predetermined number of lines (for example, three lines) including the first line of image data stored in the main memory 781 are DMA (Direct Memory Access) transferred to the first buffer 831 provided in the local store 821 of a mathematical operation processor core, and a predetermined number of lines displaced downwardly by one line from the lines DMA transferred to the first buffer 831 are DMA transferred to a second buffer 832. By using the double buffers in this manner, delay by the DMA transfer can be covered up.

Figure 49:
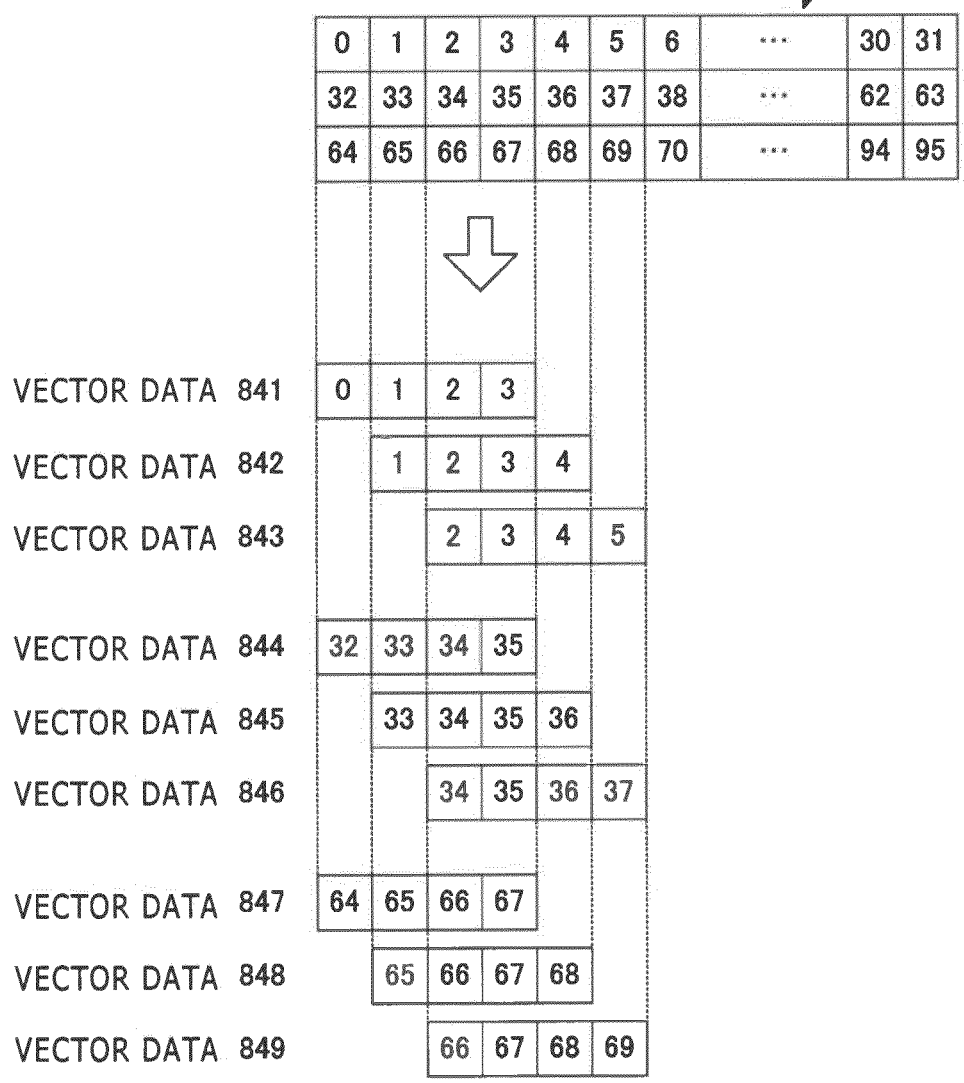
FIG. 49 is a view schematically illustrating a vector production method for producing nine vectors from image data stored in a first buffer 831 where a filtering process is carried out using the Sobel filter 830 in the embodiment of the present invention.

FIG. 49 is a view schematically illustrating a vector production method for producing nine vectors from image data stored in the first buffer 831 in a case wherein the Sobel filter 830 in the embodiment of the present invention is used to carry out a filtering process. After DMA transfer is carried out as illustrated in FIG. 48, nine vectors are produced from image data stored in the first buffer 831. In particular, vector data 841 is produced from four data from the left corner in one line of image data stored in the first buffer 831, and vector data 842 is produced from four data displaced by one to the right side from the four data. Similarly, vector data 843 is produced from four data displaced by one to the right side from the latter four data. Also in the second line and the third line, vector data 844 to 849 are produced each from four data similarly.

FIG. 50 is a view schematically illustrating a vector mathematical operation method for carrying out vector mathematical operation using a SIMD instruction with regard to the vector data 841 to 849 in a case wherein a filtering process is carried out using the Sobel filter 830 in the embodiment of the present invention. In particular, SIMD mathematical operation is carried out successively for the vector data 841 to 843 to determine a vector A. In this SIMD mathematical operation, SIMD mathematical operation of "'−1'×'vector data 841'" is executed first. Then, SIMD mathematical operation of "'0'×'vector data 842'" is executed, and then SIMD mathematical operation of "'1'×'vector data 843'" is executed. Here, "'0'×'vector data 842'" can be omitted because it is decided that the result of the mathematical operation is "0." Further, "'1'×'vector data 843'" can be omitted because it is decided that the result of the mathematical operation has a value equal to that of the "vector data 843."

Then, an addition process of a result of the mathematical operation of "'−1'×'vector data 841'" and a result of the mathematical operation of "'0'×'vector data 842'" is executed by SIMD mathematical operation, and then an addition process of a result of the addition process and a result of the mathematical operation of "'1'×'vector data 843'" is executed by SIMD mathematical operation. Here, mathematical operation of a data structure of, for example, "vector data 1"×"vector data 2"+"vector data 3" can be executed by SIMD mathematical operation. Therefore, in the mathematical operation of the vector A, for example, the SIMD mathematical operation of "'0'×'vector data 842'" and "'1'×'vector data 843'" may be omitted while "'−1'×'vector data 841'" +"vector data 843'" is executed by a single operation of SIMD mathematical operation.

Similarly, SIMD mathematical operation is carried out with regard to the vector data 844 to 846 to determine a vector B, and SIMD mathematical operation is carried out with regard to the vector data 847 to 849 to determine a vector C.

Then, SIMD mathematical operation is carried out with regard to the vectors A to C determined by the SIMD mathematical operation to determine a vector D. In this manner, by carrying out SIMD mathematical operation, a number of results equal to the number of vector components (in this example, four data) can be obtained at a time.

After the vector D is calculated, similar processing is repetitively executed while the position of data to be extracted from among image data stored in the first buffer 831 illustrated in FIG. 48 is successively shifted by one to the right side to successively carry out calculation of the vector D. Then, if the processing up to the right end of the image data stored in the first buffer 831 shown in FIG. 48 comes to an end, then results of the processing are DMA transferred to the main memory 781.

Then, the predetermined number of lines displaced by one line from the lines DMA transferred to the second buffer 832 from among the image data stored in the main memory 781 are DMA transferred to the first buffer 831, and the processing described above is carried out repetitively for the image data stored in the second buffer 832. Then, similar processing is carried out repetitively until the lower end line from among the lines of the image data stored in the main memory 781 is reached.

Similarly, speeding up of the processing for characteristic point extraction and optical flow calculation can be implemented by carrying out most part of the processing by SIMD mathematical operation.

Figure 51:
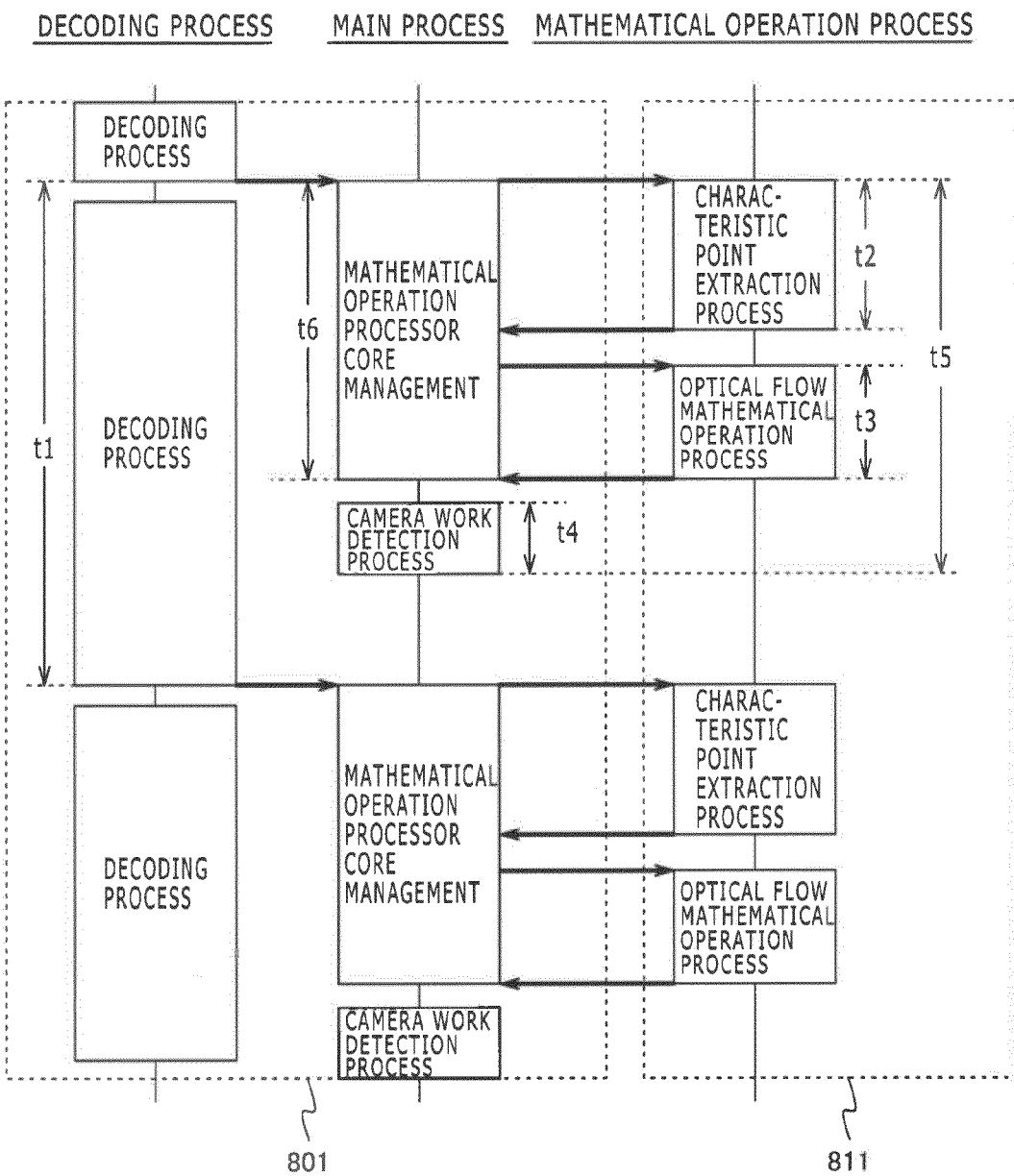
FIG. 51 is a view schematically illustrating a flow of a camera work parameter calculation process in the embodiment of the present invention in a time series.

FIG. 51 is a view schematically illustrating flows of a camera work parameter calculation process in the embodiment of the present invention in a time series. For example, by carrying out SIMD mathematical operation using the multi-core processor 800 as described above, decoding and analysis processes regarding a dynamic picture can be carried out in parallel. Therefore, it is possible to reduce the analysis time for one frame which forms a dynamic picture in comparison with the decoding time.

For example, in the figure, t1 denotes a period of time required for a decoding process of one frame, which forms a dynamic picture, by the controlling processor core 801, t2 a period of time required for a characteristic point extraction process of one frame, which forms a dynamic picture, by the mathematical operation processor cores (#1) 811 to (#8) 818, t3 a period of time required for an optical flow calculation process for one frame, which forms a dynamic picture, by the mathematical operation processor cores (#1) 811 to (#8) 818, and t4 a period of time required for a camera work detection process of one frame, which forms a dynamic picture, by the controlling processor core 801. It is to be noted that t5 denotes a period of time required for a camera work detection process for one frame, which forms a dynamic picture, by the controlling processor core 801 and the mathematical operation processor cores (#1) 811 to (#8) 818. Further, t6 denotes a period of time required for a process for managing the mathematical operation processor cores (#1) 811 to (#8) 818 by the controlling processor core 801. For example, t1 can be set to "25.0 ms," t2 to "7.9 ms," t3 to "6.7 ms," t4 to "1.2 ms," and t5 to "15.8 ms."

Now, a case wherein a dynamic picture content which uses a data file in the embodiment of the present invention is reproduced is described in detail with reference to the drawings.

Figure 52:
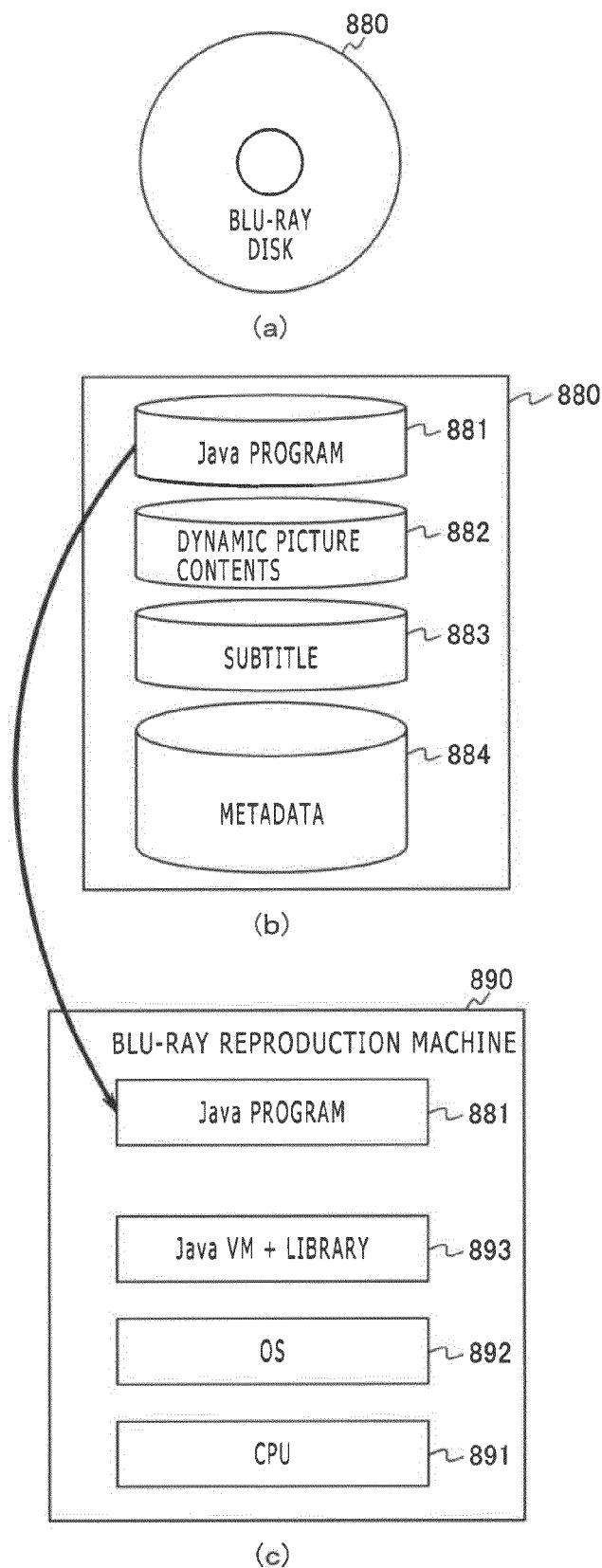
FIG. 52 is views schematically showing a blu-ray disk 880 which is an example of a recording medium, data 881 to 884 recorded on the blu-ray disk 880 and an internal configuration of a blu-ray reproduction machine 890 which can reproduce the blu-ray disk 880.

(a) of FIG. 52 is a top plan view schematically showing a blu-ray disk (Blu-ray Disc (registered trademark)) 880 which is an example of a recording medium, and (b) of FIG. 52 is a view schematically showing data 881 to 884 recorded on the blu-ray disk 880. On the blu-ray disk 880, for example, together with the dynamic picture content 882 which is a dynamic picture picked up by a camera or the like, the subtitle 883 of the dynamic picture content 882 and the metadata 884 obtained by analysis of the dynamic picture content 882 (for example, the metadata file illustrated in (b) of FIG. 4 and the relative relationship metadata file illustrated in FIGS. 29 and 35), the Java (registered trademark) program 881 for dynamic picture reproduction in the embodiment of the present invention is recorded.

(c) of FIG. 52 is a view schematically showing an internal configuration of a blu-ray reproduction machine (Blu-ray Disc Player) 890 which can reproduce the blu-ray disk 880. Here, since the blu-ray reproduction machine 890 which can reproduce a blu-ray disk incorporates a Java (registered trademark) VM (Java (registered trademark) virtual machine) and a library 893 as a standard function together with a CPU 891 and an OS 892, it can execute a Java (registered trademark) program. Therefore, if the blu-ray disk 880 is loaded into the blu-ray reproduction machine 890, then the blu-ray reproduction machine 890 can load and execute the Java (registered trademark) program 881. Consequently, in a case wherein the blu-ray reproduction machine 890 reproduces the dynamic picture content 882, the metadata 884 can be used to carry out dynamic picture production in the embodiment of the present invention. In other words, dynamic picture production in the embodiment of the present invention can be implemented on all blu-ray reproduction machines without using PC software for exclusive use or the like.

As described above, in the embodiments of the present invention, where one or a plurality of dynamic pictures are to be reproduced on an image pickup apparatus, since images corresponding to frames preceding to an image displayed currently are displayed while being synthesized with the current image, the user can access the background and so forth of an image picked up at least within part of a time zone in a bird-eye view fashion together with an object centered in the image pickup. In particular, where an image is expanded by a zooming out operation from an initial state in which an image is reproduced in a picture size same as that upon image pickup, since the entire current image becomes small and images corresponding to frames in the past are displayed around the current image, spatial zooming out can be implemented. Consequently, an image over a range greater than the picked up image size can be watched in a bird-eye view fashion.

Further, for example, where the user wants to watch the background or the like of an image picked up within at least part of a time zone, even if a rewinding operation, a search operation or the like is not carried out, if a zooming out operation is carried out, then the user can watch the background and so forth simultaneously with the image currently displayed. Consequently, when the user accesses a dynamic picture picked up by an image pickup apparatus, the user can readily grasp the contents of the dynamic picture. Further, for example, where dynamic pictures in which the same object is included are to be reproduced, since, at the location at which the object is included, the plural dynamic pictures are displayed in an overlapping relationship with each other, the user can grasp a relative relationship of the plural dynamic picture readily.

In particular, a plurality of dynamic pictures can be developed spatially and enjoyed making use of frames in the past. Consequently, since such an enjoying method as, for example, to complete a panorama image while a plurality of dynamic pictures are reproduced can be provided, the accessing person can enjoy the dynamic pictures with much interest. Further, since, as regards a current image, images in states before the current image is stored into the image memory 180 can be successively displayed, a comparatively clean image can be displayed.

Further, while, in the description of the embodiment of the present invention, an example wherein affine transformation parameters detected in advance are used to carry out reproduction and display is described, affine transformation parameters may be calculated upon reproduction such that the calculated affine transformation parameters are used for reproduction and display. For example, by calculating affine transformation parameters by SIMD mathematical operation using a multi-core processor, it is possible to calculate affine transformation parameters for one frame within processing time for decoding of one frame. Consequently, even where a dynamic picture with regard to which affine transformation parameters are not calculated is to be reproduced, it is possible to carry out dynamic picture reproduction while affine transformation parameters are calculated, and therefore, enjoyment in spatial development of a dynamic picture can be carried out rapidly.

Further, in the description of the embodiment of the present invention, an example is described wherein a plurality of dynamic picture files are stored into the dynamic picture storage section 200 and affine transformation parameters corresponding to the dynamic pictures are stored as a metadata file in an associated relationship with the corresponding dynamic pictures and frames into the metadata storage section 210 and besides relative relationship information regarding the plural dynamic pictures is stored into the relative relationship information storage section 220, a dynamic picture, affine transformation parameters corresponding to the dynamic picture and relative relationship information regarding the dynamic picture may be recorded in an associated relationship with each other as a dynamic picture file into a dynamic picture storage section such that, upon reproduction, the information is extracted from the dynamic picture file and used.

Further, while, in the embodiments of the present invention, an example wherein synthesis and reproduction are carried out in order from the top frame toward the last frame has been described, the present invention can be applied similarly also where synthesis and reproduction are carried out in order from the last frame toward the top frame. In this instance, affine transformation is carried out using an inverse matrix of affine transformation parameters associated with the frames.

Further, synthesized images synthesized by the image synthesis section may be recorded on a recording medium or the like such that they may be used for other reproduction and display. Further, while, in the embodiments of the present invention, description is given taking a dynamic picture as an example, for example, still pictures such as picked up images recorded successively can be synthesized and displayed similarly. In particular, the embodiments of the present invention can be applied to an image pickup apparatus such as a dynamic picture reproduction application of a personal computer, a digital still camera, a camcorder and a portable telephone set which have a reproduction function of a dynamic picture or a still picture and a function of changing the display magnification upon reproduction.

Further, while, in the description of the embodiment of the present invention, description is given taking an image pickup apparatus wherein an image synthesized by the image synthesis section is displayed on the display section as an example, the embodiment of the present invention can be applied to an image pickup apparatus which includes image outputting means for outputting image information for allowing the image synthesized by the image synthesis section to be displayed on another image display apparatus.

It is to be noted that the embodiment of the present invention indicates an example for carrying out the present invention and has a corresponding relationship to invention specifying matters in the claims as described below. However, the present invention is not limited to this, but various modifications can be applied without departing from the subject matter of the present invention.

In particular, in claim 1, the image pickup means corresponds, for example, to the image pickup section 110. Further, the transformation information calculation means corresponds, for example, to the camera work detection section 120. Further, the image storage means corresponds, for example, to the image memory 180. Further, the image transformation means corresponds, for example, to the image transformation section 150 and 151. Further, the image synthesis means corresponds, for example, to the image synthesis section 170 and 171. Further, the operation acceptance means corresponds, for example, to the operation acceptance section 160 and 165. Further, the control means corresponds, for example, to the display region extraction section 190 and display control section 240.

Further, in claim 7, the image pickup means corresponds, for example, to the image pickup section 110. Further, the transformation information calculation means corresponds, for example, to the camera work detection section 120. Further, the image storage means corresponds, for example, to the image memory 180. Further, the image transformation means corresponds, for example, to the image transformation section 150. Further, the image synthesis means corresponds, for example, to the image synthesis section 170. Further, the operation acceptance means corresponds, for example, to the operation acceptance section 160. Further, the control means corresponds, for example, to the display region extraction section 190 and display control section 240.

Further, in claim 8 or 9, the transformation information calculation step corresponds, for example, to the steps S903 to S913. Further, the step of causing image storage means to store the images as history images corresponds, for example, to the step S926. Further, the image transformation step corresponds, for example, to the step S926. Further, the operation acceptance step is carried out, for example, by the operation acceptance sections 160 and 165. Further, the control step corresponds, for example, to the steps S927 to S932.

It is to be noted that the processing procedure described in the description of the embodiment of the present invention may be grasped as a method which has the series of steps described above or may be grasped as a program for causing a computer to execute the series of steps or a recording medium on which the program is stored.

The invention claimed is:

1. An image pickup apparatus, comprising:
image pickup means for picking up an image pickup object to produce image data;
transformation information calculation means for calculating, based on a first picked up image which is an image corresponding to the image data and a second picked up image positioned later than the first picked up image on a time axis upon image pickup of the image data, transformation information regarding the first picked up image and the second picked up image;
image storage means for storing those images which are positioned prior to the second picked up image on the time axis as history images;
image transformation means for transforming the second picked up image based on the calculated transformation information;
image synthesis means for synthesizing the transformed second picked up image with the history images to form a synthesized image;
operation acceptance means for accepting a designation operation for designating a display magnification of the second picked up image; and
control means for determining a display region on the synthesized images stored in the image storage means based on the designated display magnification and causing the images included in the display region to be displayed successively, wherein
the control means determines the display region based on the calculated transformation information and the designated display magnification, and
the image synthesis means synthesizes the second picked up image prior to being transformed by the image transformation means by overwriting the second picked up image with the synthesized images included in the display region to form a display image.

2. The image pickup apparatus according to claim 1, wherein the control means determines, when a designation operation which designates a display magnification for reducing the second picked up image is accepted by the operation acceptance means, the display region which at least includes the transformed second picked up image in the synthesized images stored in the image storage means and those images which are around the second picked up image.

3. The image pickup apparatus according to claim 1, wherein
the control means transforms the images included in the display region in a direction opposite to the transformation direction of the second picked up image by the image transformation means based on the calculated transformation information, and
the image synthesis means synthesizes the second picked up image before transformed by the image transformation means by overwriting with the images included in the display region after the transformation to form the display image.

4. The image pickup apparatus according to claim 1, wherein
the image pickup means picks up an image pickup object to produce image data of a dynamic picture, and
the first picked up image and the second picked up image are picked up images which form the dynamic picture.

5. The image pickup apparatus according to claim 1, wherein
the operation acceptance means accepts a movement operation for moving the display region, and
the control means moves the display region on the synthesized images stored in the image storage means based on the accepted movement operation.

6. A controlling method implemented on an image pickup apparatus which includes image pickup means for picking up an image pickup object to produce image data, the method comprising:
a transformation information calculation step of calculating, based on a first picked up image which is an image corresponding to the image data and a second picked up image positioned later than the first picked up image on a time axis upon image pickup of the image data, transformation information regarding the first picked up image and the second picked up image;
a step of causing image storage means to store those images which are positioned prior to the second picked up image on the time axis as history images;
an image transformation step of transforming the second picked up image based on the calculated transformation information;
an image synthesis step of synthesizing the transformed second picked up image with the history images to form a synthesized image;
an operation acceptance step of accepting a designation operation for designating a display magnification of the second picked up image; and
a control step of determining a display region on the synthesized images stored in the image storage means based on the designated display magnification and causing the images included in the display region to be displayed successively, wherein the control step determines the display region based on the calculated transformation information and the designated display magnification, and the image synthesis step synthesizes the second picked up image prior to being transformed by the image transformation step by overwriting the second picked up image with the synthesized images included in the display region to form a display image.

7. A non-transitory computer readable storage medium having stored thereon a computer program for an image pickup apparatus which includes image pickup means for picking up an image pickup object to produce image data, the program, which when executed by a computer, causes the computer to perform a method comprising:

a transformation information calculation step of calculating, based on a first picked up image which is an image corresponding to the image data and a second picked up image positioned later than the first picked up image on a time axis upon image pickup of the image data, transformation information regarding the first picked up image and the second picked up image;

a step of causing image storage means to store those images which are positioned prior to the second picked up image on the time axis as history images;

an image transformation step of transforming the second picked up image based on the calculated transformation information;

an image synthesis step of synthesizing the transformed second picked up image with the history images to form a synthesized image;

an operation acceptance step of accepting a designation operation for designating a display magnification of the second picked up image; and a control step of determining a display region on the synthesized images stored in the image storage means based on the designated display magnification and causing the images included in the display region to be displayed successively, wherein the control step determines the display region based on the calculated transformation information and the designated display magnification, and the image synthesis step synthesizes the second picked up image prior to being transformed by the image transformation step by overwriting the second picked up image with the synthesized images included in the display region to form a display image.

8. An apparatus, comprising:

a transformation information calculation unit configured to calculate, based on a first picked up image which is an image corresponding to image data and a second picked up image positioned later than the first picked up image on a time axis upon image pickup of the image data, transformation information regarding the first picked up image and the second picked up image;

an image transformation unit configured to transform the second picked up image based on the calculated transformation information;

an image synthesis unit configured to synthesize the transformed second picked up image with a history image to form a synthesized image; and a control unit configured to determine a display region on the synthesized image based on designated display magnification and the calculated transformation information and configured to cause an image included in the display region to be displayed, wherein the image synthesis unit synthesizes the second picked up image prior to being transformed by the image transformation unit by overwriting the second picked up image with the synthesized image to form a display image.

9. A controlling method, implemented on an apparatus, comprising:

a transformation information calculation step of calculating, based on a first picked up image which is an image corresponding to image data and a second picked up image positioned later than the first picked up image on a time axis upon image pickup of the image data, transformation information regarding the first picked up image and the second picked up image;

an image transformation step of transforming the second picked up image based on the calculated transformation information;

an image synthesis step of synthesizing the transformed second picked up image with a history image to form a synthesized image; and a control step of determining a display region on the synthesized image based on designated display magnification and the calculated transformation information and configured to cause an image included in the display region to be displayed, wherein the image synthesis step synthesizes the second picked up image prior to being transformed by the image transformation step by overwriting the second picked up image with the synthesized image to form a display image.

10. A non-transitory computer readable storage medium having stored thereon a computer program for an apparatus which when executed by a computer causes the computer to perform a method comprising:

a transformation information calculation step of calculating, based on a first picked up image which is an image corresponding to image data and a second picked up image positioned later than the first picked up image on a time axis upon image pickup of the image data, transformation information regarding the first picked up image and the second picked up image;

an image transformation step of transforming the second picked up image based on the calculated transformation information;

an image synthesis step of synthesizing the transformed second picked up image with a history image to form a synthesized image; and a control step of determining a display region on the synthesized image based on designated display magnification and the calculated transformation information and configured to cause an image included in the display region to be displayed, wherein the image synthesis step synthesizes the second picked up image prior to being transformed by the image transformation step by overwriting the second picked up image with the synthesized image to form a display image.

* * * * *